(12) United States Patent
Nix

(10) Patent No.: US 11,909,870 B2
(45) Date of Patent: *Feb. 20, 2024

(54) ECDHE KEY EXCHANGE FOR MUTUAL AUTHENTICATION USING A KEY SERVER

(71) Applicant: IoT and M2M Technologies, LLC, Evanston, IL (US)

(72) Inventor: John A. Nix, Evanston, IL (US)

(73) Assignee: IoT and M2M Technologies, LLC, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,953

(22) Filed: Mar. 24, 2023

(65) Prior Publication Data

US 2023/0231702 A1 Jul. 20, 2023

Related U.S. Application Data

(63) Continuation of application No. 17/717,101, filed on Apr. 10, 2022, now Pat. No. 11,626,979, which is a (Continued)

(51) Int. Cl.
*H04L 9/08* (2006.01)
*H04L 9/30* (2006.01)
*H04L 9/32* (2006.01)

(52) U.S. Cl.
CPC .......... *H04L 9/0841* (2013.01); *H04L 9/0825* (2013.01); *H04L 9/3066* (2013.01); *H04L 9/3242* (2013.01); *H04L 9/3252* (2013.01)

(58) Field of Classification Search
CPC ... H04L 9/0841; H04L 9/0825; H04L 9/3066; H04L 9/3242; H04L 9/3252;
(Continued)

(56) References Cited

U.S. PATENT DOCUMENTS 8,761,401 B2 6/2014 Sprunk et al.
8,782,774 B1 7/2014 Pahl et al.
(Continued)

OTHER PUBLICATIONS

GSM Association, "iUICC POC Group Primary Platform requirements", Release 1.0, May 17, 2017 (Entire Document).
(Continued)

*Primary Examiner* — Techane Gergiso
(74) *Attorney, Agent, or Firm* — GrowIP Law Group LLC

(57) ABSTRACT

A server can record a device static public key (Sd) and a server static private key (ss). The server can receive a message with (i) a device ephemeral public key (Ed) and (ii) a ciphertext encrypted with key K1. The server can (i) conduct an EC point addition operation on Sd and Ed and (ii) send the resulting point/secret X0 to a key server. The key server can (i) perform a first elliptic curve Diffie-Hellman (ECDH) key exchange using X0 and a network static private key to derive a point/secret X1, and (ii) send X1 to the server. The server can conduct a second ECDH key exchange using the server static private key and point X0 to derive point X2. The server can conduct an EC point addition on X1 and X2 to derive X3. The server can derive K1 using X3 and decrypt the ciphertext.

11 Claims, 13 Drawing Sheets

Related U.S. Application Data continuation of application No. 17/254,849, filed as application No. PCT/US2019/039380 on Jun. 27, 2019, now Pat. No. 11,316,672.

(60) Provisional application No. 62/691,255, filed on Jun. 28, 2018.

(58) Field of Classification Search
CPC ... H04L 9/0844; H04L 9/3073; H04L 9/3013; H04L 9/30; H04L 9/08; H04L 9/14; H04L 9/3273; G06F 7/725; G06F 21/30; G06F 21/445
See application file for complete search history.

(56) References Cited

U.S. PATENT DOCUMENTS

| | | | |
|---|---|---|---|
| 8,996,873 B1 | 3/2015 | Pahl et al. | |
| 9,485,092 B2 | 11/2016 | Smets | |
| 9,531,685 B2 | 12/2016 | Gero et al. | |
| 9,553,856 B2 | 1/2017 | Pahl et al. | |
| 9,628,268 B2 | 4/2017 | Klang et al. | |
| 9,705,854 B2 | 7/2017 | Kazan et al. | |
| 10,129,223 B1* | 11/2018 | Bhattacharyya | H04L 9/0861 |
| 10,129,224 B2 | 11/2018 | Pahl et al. | |
| 11,228,448 B2 | 1/2022 | Nix | |
| 2008/0130895 A1* | 6/2008 | Jueneman | H04L 9/3236 380/28 |
| 2009/0185677 A1* | 7/2009 | Bugbee | H04L 9/0841 380/28 |
| 2012/0087493 A1* | 4/2012 | Chidambaram | H04L 9/0841 713/182 |
| 2012/0221858 A1 | 8/2012 | Struik | |
| 2014/0010371 A1 | 1/2014 | Khazan et al. | |
| 2015/0067338 A1 | 3/2015 | Gero et al. | |
| 2015/0372811 A1* | 12/2015 | Le Saint | H04L 63/068 705/76 |
| 2016/0014114 A1 | 1/2016 | Pahl et al. | |
| 2017/0111179 A1 | 4/2017 | Gero et al. | |
| 2017/0237571 A1 | 8/2017 | Pahl et al. | |
| 2018/0026784 A1* | 1/2018 | Ward | H04L 9/0844 713/171 |
| 2018/0205561 A1 | 7/2018 | Le Saint | |
| 2019/0089532 A1* | 3/2019 | Lambert | H04W 8/24 |
| 2019/0372759 A1* | 12/2019 | Rix | H04L 9/0838 |
| 2021/0021993 A1* | 1/2021 | Yang | H04W 12/0433 |
| 2021/0092603 A1* | 3/2021 | Yang | H04W 12/122 |
| 2021/0218560 A1 | 7/2021 | Nix | |
| 2022/0239474 A1 | 7/2022 | Nix | |

OTHER PUBLICATIONS

European Technical Standards Institute (ETSI), "Meeting #81 document SCP(17)000188", Dec. 5, 2017. (Entire Document).
Wikipedia, "Elliptic Curve Diffie-Hellman", Mar. 9, 2018. (Entire Document).
National Institute of Standards and Technology (NIST) document "NIST SP 800-56A, Recommendation for Pair-Wise Key Establishment Schemes Using Discrete Logarithm Cryptography", Mar. 2007 (Entire Document).
WiFi Alliance, Device Provisioning Protocol Specification Version 1.0, Apr. 9, 2018, pp. 1-124.
Blake-Wilson et al., "Key Agreement Protocols and their Security Analysis", Sept. 9, 1997, Sixth IMA International Conference on Cryptography and Coding. (Entire Document).
Putman, "ECDH-based Authentication using Pre-Shared Asymmetric Keypairs for (Datagram) Transport Layer Security (D)TLS) Protocol version 1.2", IETF TLS Working Group, Nov. 30, 2017. (Entire Document).
Turner et al., "Use of Elliptic Curve Cryptography (ECC) Algorithms in Cryptographic Message Syntax (CMS)", IETF RFC 5753, Jan. 2010. (Entire Document).
Wikipedia, "Elliptic curve point multiplication", May 15, 2018 (Entire Document).
PCT/US2019/039380, International Search Report, dated Sep. 26, 2019 (Entire Document).

* cited by examiner

Figure 1c

Device 103 (1) w/ ID.device 103i-1

| Key ID | Network 105 | ID.server 101i | Sn 102a-1 | Ss 101a-1 |
|---|---|---|---|---|
| 1 | A | Server.A.net | )M[a2D.*2Br6xZf[ | *c2GW)ouc2tQ_[qW |
| 2 | A | Backup.A.net | #w-?dRL7fz=UpUP^ | !wE0/$)a|ugv1<bS |
| 3 | B | Server.B.net | &~^GB?%c.N^hztm69 | vMSDqs~i]sxHr&]9 |

Shared Network Public Keys 102z
Unique Network Public Key 102v (per device)

Network Pub. Key Table 103t
Shared Server Public Keys 101z
Unique Server Public Keys 101v (per device)

Device 103 (2) w/ ID.device 103i-2

| Key ID | Network 105 | ID.server 101i | Sn 102a-2 | Ss 101a-2 |
|---|---|---|---|---|
| 1 | A | Server.A.net | )M[a2D.*2Br6xZf[ | *c2GW)ouc2tQ_[qW |
| 2 | A | Backup.A.net | #w-?dRL7fz=UpUP^ | d9hTMcp.?15tag2M |
| 3 | B | Server.B.net | +,K8Ka%pq0WXPNQt | fKk?74?>d)rY~^#; |

Shared Network Public Key 102z
Unique Network Public Key 102v (per device)

Network Pub. Key Table 103t
Shared Server Public Keys 101z
Unique Server Public Key 101v

Device 103 (3) w/ ID.device 103i-3

| Key ID | Network 105 | ID.server 101i | Sn 102a-3 | Ss 101a-3 |
|---|---|---|---|---|
| 1 | A | Server.A.net | )M[a2D.*2Br6xZf[ | .:3$.YGqL/[?=^-O |
| 2 | A | Backup.A.net | #w-?dRL7fz=UpUP^ | d9hTMcp.?15tag2M |
| 3 | B | Server.B.net | ->%LR!rFb}Lm9C.^Dp | T[okv/p9g/4U*W.m |

Unique Network Public Keys 102v (per device)

Network Pub. Key Table 103t

Server Database 101d

PKI Key Table 101da

| Row | ID-token.device 103o | ID Device 103i | H(Sd) 250 | H(Sn) 251 | Sd 103c | Ed 103a | Ss 101a | ss 101b | Sn 102a | ID key-server 102i |
|---|---|---|---|---|---|---|---|---|---|---|
| 1 | 103o-1 | 103i-1 | | | 103c-1 | 103a-1 | 101a-1 | 101b-1 | 102a-1 | 102i-1 |
| 2 | | 103i-2 | 250-2 | | 103c-2 | 103a-2 | 101a-1 | 101b-1 | 102a-1 | 102i-1 |
| 3 | 103o-3 | 103i-3 | | 251-1 | 103c-3 | 103a-3 | 101a-3 | 101b-3 | 102a-1 | 102i-1 |
| 4 | | 103i-4 | 250-4 | 251-4 | 103c-4 | 103a-4 | 101a-4 | 101b-4 | 102a-4 | 102i-1 |
| 5 | 103o-5 | 103i-5 | 250-5 | 251-5 | 103c-5 | 103a-5 | 101a-5 | 101b-5 | 102a-5 | 102i-2 |

Device Table 101db

| Row | ID-Device 103i | Random 1 203a | Parameters 104a | Source IP:Port 299p | Random 2 211a | X0 213a | X1 216a | X2 218a | X3 207a | K1 206a |
|---|---|---|---|---|---|---|---|---|---|---|
| 1 | 103i-1 | 202a-1 | 104a-1 | 203a-1 | 211a-1 | 213a-1 | 216a-1 | 218a-1 | 207a-1 | 206a-1 |
| 2 | 103i-2 | 202a-2 | 104a-1 | 203a-2 | 211a-2 | 213a-2 | 216a-2 | 218a-2 | 207a-2 | 206a-2 |
| 3 | 103i-3 | 202a-3 | 104a-1 | 203a-3 | 211a-3 | 213a-3 | 216a-3 | 218a-3 | 207a-3 | 206a-3 |
| 4 | 103i-4 | 202a-3 | 104a-2 | 203a-4 | 211a-4 | 213a-4 | 216a-4 | 218a-4 | 207a-4 | 206a-4 |
| 5 | 103i-5 | 202a-3 | 104a-4 | 203a-5 | 211a-5 | 213a-5 | 216a-5 | 218a-5 | 207a-5 | 206a-5 |

Figure 3

Cryptographic Parameters 104

| Set 104a | PKI Key Length 104b | Curve 104c | Hash 104d | Symmetric Ciphering Key Length 104e | Symmetric Ciphering Parameters 104f | Random Length 104g |
|---|---|---|---|---|---|---|
| A | 256 | p256 | SHA-256 | 128 | C1 | 128 |
| B | 384 | p384 | SHA-384 | 192 | C2 | 192 |
| C | 512 | secp521r1 | SHA-512 | 256 | C3 | 256 |
| D | 256 | Curve25519 | SHA-3 | 128 | C4 | 128 |
| E | 448 | Curve448 | SHA-3 | 192 | C5 | 192 |
| ⋮ | | | | | | |

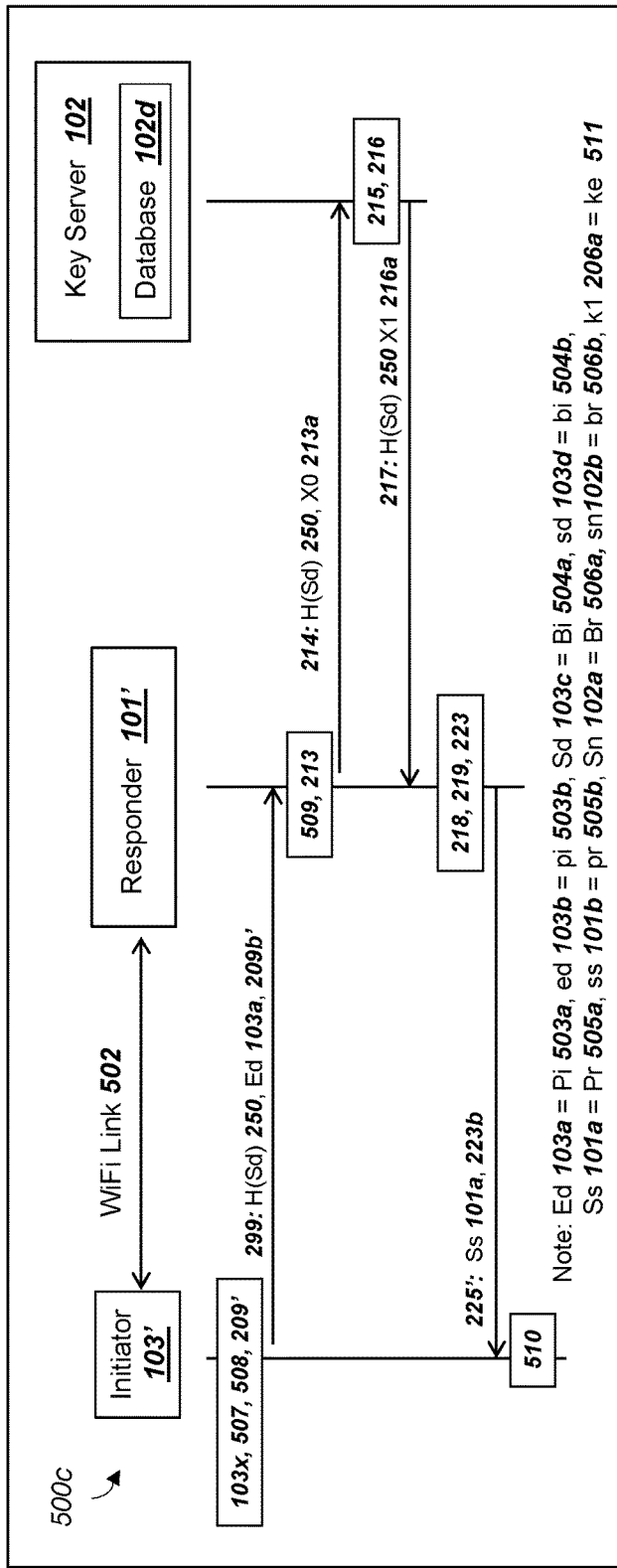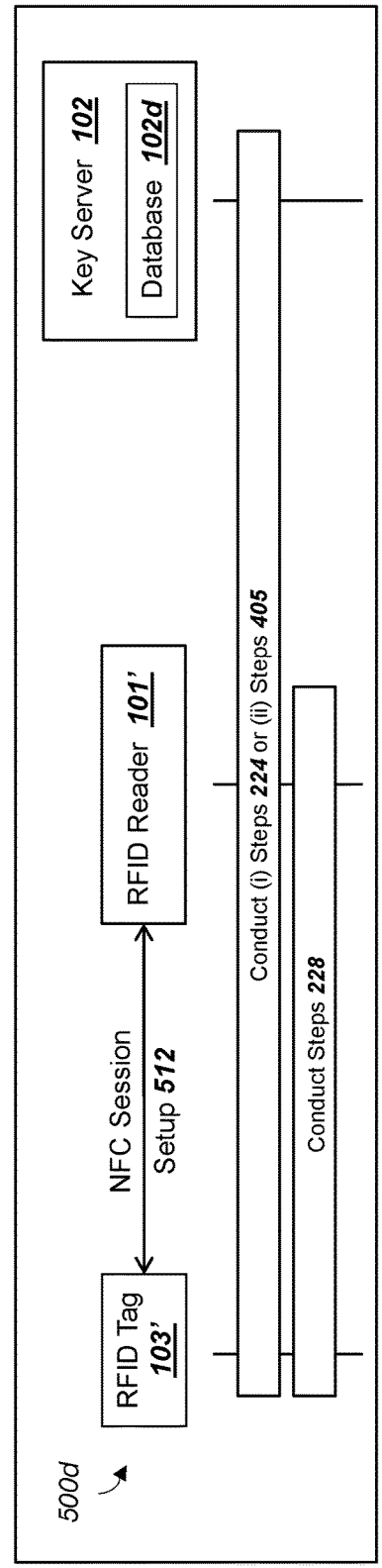

ECDHE KEY EXCHANGE FOR MUTUAL AUTHENTICATION USING A KEY SERVER

CROSS-REFERENCE TO RELATED APPLICATIONS

This U.S. Non-provisional Application is a continuation of U.S. Non-provisional application Ser. No. 17/717,101, filed on Apr. 10, 2022, that claims the benefit of the filing date of U.S. Non-provisional application Ser. No. 17/254,849, filed on Dec. 21, 2020, that claims the benefit of the filing date of International PCT application Serial No. PCT/US19/39380, filed Jun. 27, 2019, that claims the benefit of the filing date of U.S. Provisional Patent Application Ser. No. 62/691,255, filed Jun. 28, 2018, which are hereby incorporated by reference in their entirety.

BACKGROUND

Technical Field

The present systems and methods relate to conducting an ephemeral elliptic curve Diffie Hellman key exchange (ECDHE) with authentication and multiple parties, and more particularly to communications between a computing device, a server, and a key server over a network in order for the computing device and the server to mutually derive a symmetric ciphering key with mutual authentication.

Description of Related Art

The use of elliptic curve cryptography (ECC) for computing devices has expanded over the past decade and is also expected to continue to grow. Many applications use or propose using ephemeral elliptic curve Diffie Hellman (ECDHE) key exchanges in order to derive a symmetric ciphering key. Prominent examples today include embedded universal integrated circuit cards (eUICCs) also known as embedded SIMs, Transport Layer Security (TLS) version 1.3 from the Internet Engineering Task Force (IETF), and the Device Provisioning Protocol (DPP) from the WiFi Alliance™. Other examples are expected in the future as well, such as the use of ECDHE in order to protect the Subscription Permanent Identifier (SUPI) for 5G mobile networks, where the SUPI is equivalent to an International Mobile Subscriber Identity (IMSI). ECDHE can be considered a subset of elliptic curve Diffie-Hellman key exchanges (ECDH), where ECDHE key exchanges use at least one ephemeral or short-term elliptic curve PKI key pair. Applications use ECDHE key exchanges in order for two nodes to mutually derive a symmetric ciphering key and a message authentication code (MAC) key using a key derivation function. The symmetric ciphering key can subsequently be used with a symmetric ciphering algorithm such as the Advanced Encryption Standard (AES) and the MAC key can be used to verify message integrity. In this manner, secure communication can be established between two nodes.

ECDHE key exchanges depend on a first node deriving a first ephemeral private and public key pair and a second node deriving or using a second private and public key, where the public key infrastructure (PKI) keys use a common elliptic curve. The elliptic curve can be specified in parameters that define a named curve such as secp256r1 (p256), secp256k1, secp385r1, etc., and many other possibilities exist as well for named curves, include curve 25519. ECDHE key exchanges have multiple benefits over older generation technology such as Diffie Hellman key exchanges. With ECDHE, elliptic curve cryptography can be utilized with shorter keys and faster processing times compared to previous technology, for the equivalent level of security or bit length of keys. For example, a 256 bit ECC PKI key pair can be used to obtain a comparable level of security as that obtained from using a 3072 bit RSA based PKI key pair. Calculation or processing time for conducting an ECDHE key exchange can also be faster than a traditional Diffie Hellman key exchange for the same level of security, as defined by the resulting key length of a derived shared secret from the key exchange.

Although the use of ECDHE key exchanges is growing rapidly, improvements can be made for ECDHE key exchanges in order to further enhance security and also leverage existing keys that may be recorded by the nodes participating in an ECDHE key exchange. As one example, an ECDHE key exchange as contemplated for (a) the exemplary applications and standards from two paragraphs above do not normally (b) provide authentication of either node. Separate steps than an ECDHE key exchange have to be conducted in order to authenticate endpoints, such as using an elliptic curve digital signature algorithm (ECDSA) with static or long-term ECC PKI keys recorded by the nodes. ECDSA algorithms also have challenges, where the reuse of a value k for two different signatures can reveal the private key. As another example and related to the authentication issue above, an ECDHE is susceptible to "man in the middle" attacks, where an intermediate node or different node than the intended node can perform the ECDHE key exchange instead of the intended node. Thus, although ECDHE can securely establish a symmetric ciphering key for confidentiality of data communications, the confidentiality could be established with a party or node that is not the intended recipient of the confidential communications. Consequently, a need exists in the art for the intended two nodes for confidential communications to use an ECDHE key exchange in a manner where the two nodes can be mutually authenticated.

A primary goal of ECDHE key exchanges is also to obtain forward secrecy, where an ECDHE key exchange can periodically be re-conducted in order to rotate or re-establish a new symmetric ciphering key. In this manner, if a private key is compromised then only the subset of historical data encrypted using the compromised private key is subject to decryption by third parties, and other communications using a different private key can remain secured. An authenticated ECDH key exchange can be conducted using at least one static PKI key pair (e.g. not an ephemeral key exchange with ephemeral PKI keys), but without the benefits of forward secrecy. A need exists in the art where two parties can conduct an authenticated ECDHE key exchange (e.g. by using ephemeral PKI keys) in order to obtain the benefits of forward secrecy.

The use of ECDH key exchanges (e.g. with at least one static PKI key pair) is also subject to greater security risks over time, where repeated use of one static PKI key pair is subject to cryptographic analysis and "leakage" of equivalent bits of security over time. Further, the use of ECDH key exchanges with one static PKI key pair and one ephemeral PKI key pair is more subject to risks of attacks from specifically chosen ephemeral PKI keys, such as ephemeral public keys that are either (i) not on the curve or (ii) specifically selected to expose information about the static private key. Thus, (a) repeated use of ECDHE key exchanges over time with different ephemeral PKI keys, compared to (b) using an ECDH key exchange with one static PKI key pair will result in greater security regarding confidentiality of communications. A need exists in the art where the greater security of ECDHE key exchanges can be obtained while also using static ECC PKI keys recorded by at least one of the nodes deriving a symmetric ciphering key using the ECDHE key exchange.

Many applications or new standards such as TLS version 1.3, DPP version 1.0 and 5G network standards from the 3$^{rd}$ Generation Partnership Project (3GPP) implement ECDHE key exchanges in order to quickly establish confidentiality early in the communications between two nodes. As noted above, a traditional ECDHE key exchange establishes confidentiality without authentication, and authentication must be obtained through other means, such as ECDSA or DSA, message digest, etc. However, the nodes participating in communications with the above standards typically have access to other, secure and previously recorded PKI keys besides the ephemeral PKI keys derived in order to conduct the ECDHE key exchange. A need exists in the art for a node to use the previously recorded PKI keys for (a) a new ECDHE key exchange in order to establish an authenticated key exchange without (b) the risks of ECDH key exchanges for static PKI keys as discussed above.

Solutions have been proposed in the art for an authenticated Diffie-Hellman or elliptic curve Diffie-Hellman key exchange using ephemeral keys and static keys. Blake-Wilson et al in the paper "Key Agreement Protocols and their Security Analysis", which is herein incorporated by reference, propose the use of both long-term static keys and short-term ephemeral keys with a DH key exchange in order to conduct the key exchange in an authenticated manner in order to address some needs in the art mentioned above. Likewise, the Internet Engineering Task Force (IETF) proposes the use of elliptic curve ephemeral and static PKI keys in the "Request for Comments" (RFC) 5753 document "Use of Elliptic Curve Cryptography (ECC) Algorithms in Cryptographic Message Syntax (CMS)", which is also hereby incorporated by reference.

However, the methods described for Blake-Wilson, RFC 5753, and related systems depend on (a) the recipient/responder of an ephemeral ECC public key from a sender/initiator to (b) also to record or operate with the static private ECC key corresponding to the static public key recorded by the sender. This can reduce scalability of a system with (i) a plurality of sendors/initiators and (ii) a plurality of recipients/responders receiving ephemeral ECC public keys for ECDHE key exchanges, since each recipient/responder also needs to record and operate on the static ECC private key corresponding to the static ECC public key recorded by the sender/initiator. The overall security of a system can be decreased for a system of potentially millions of devices and several servers, where the servers need to record server static private ECC keys corresponding to server static public ECC keys recorded by devices. A need exists in the art for (a) a recipient/responder to support authenticated ephemeral ECDH key exchanges without (b) the recipient/responder also recording the static ECC private key corresponding to the static ECC public key recorded by the sender/initiator.

Other proposed solutions contemplate (i) the use of both ECDHE key exchanges and (ii) pre-shared PKI key pairs between two nodes for conducting an ECDHE key exchange with mutual authentication. An example would be the draft IETF RFC document "ECDH-based Authentication using Pre-Shared Asymmetric Keypairs for (Datagram) Transport Layer Security ((D)TLS) Protocol version 1.2", which is hereby incorporated by reference. Benefits of this and similar proposed systems is that mutual authentication and forward secrecy can be obtained. However, the system as presented requires that the server also record and operate with a static private key corresponding to the static public key recorded by the client (which could be a device).

Recording a static private key in a server communicating with devices or clients through the public Internet has security drawbacks, especially for single server public keys recorded and used with devices designed to be operational for a decade or longer. A need exists in the art to support mutual authenticated ECDHE key exchanges where the server communicating with the client does not record or operate with a static private key corresponding to the server static public key recorded by the client. A need exists in the art where a plurality of different server static public keys could be recorded by a plurality of different devices, such that compromise of a single server static private key only potentially compromises a single device.

The draft IETF RFC discussed in the paragraph above also solved problems for resource constrained devices, where the use of digital signature algorithms can be bypassed because ECDHE key exchanges that also use static public keys can provide mutual authentication (thereby bypassing the need for recording an operating digital signature algorithms). However, a significant drawback for devices deployed for a decade or longer is (a) the risk that server static private key is compromised, or (b) the server recording or having access to the server static private key is no longer authenticated. For the system in the draft IETF RFC and related systems, there is no method or contemplation for a "key revocation" both (i) after deployment of devices/clients with a server static public key and (ii) from a "parent" authority over the server (but without direct control of the server).

As one example for needs in the art, a device owner could own but not operate a device, and an example could be a leasing or rental company, where a user under contract with the device owner may operate the device. The device owner may not operate or control a server the device/client communicates with, and the server could be specified by the user. If the device owner wishes to terminate service for the device, the device owner may not be able to directly stop communications between the deployed device/client and the server. A need exists in the art for a device to record an additional static public key (in addition to the server static public key) that are required for use with an ECDHE key exchange, in order for a "parent authority" to participate in the key exchange and control the device, or effectively perform revocation of the ability to communicate with a server. A need exists in the art for the server communicating with the device to not record or operate with (a) the corresponding additional static private key for the (b) additional static public key recorded in the device.

Although the use of a key server with DH key exchanges has been deployed for different networking environments, they have not been extended to conducting an ECDHE key exchange. The company Cloudflare® has promoted the use of a key server for TLS version 1.2 operations and DH key exchanges, where the private key for a network could be operated by a network to either (i) conduct an asymmetric decryption of a master secret sent by a client or (ii) perform a digital signature operation for a Diffie Hellman key exchange. As of mid-2018, the product is called "Keyless SSL". This, and other examples of conducting networking, transport, or application layer security have not suggested how a private key for a network could be recorded and used by a key server for conducting a mutually authenticated ECDHE key exchange. Additional steps using a different cryptographic framework (e.g. mutually authenticated ECDHE key exchanges) than conventional technology (e.g. "one-way" or server authenticated key exchanges) would need to be conducted in a coordinated manner between the server and a key server. There is no teaching or suggestion for these additional steps with conventional technology using key servers.

A need exists in the art for using a key server recording and operating with private keys in a manner that supports a separate server conducting an ECDHE key exchange with mutual authentication. A need exists in the art for operating a server in an insecure location, such that static private keys associated with the server (or the network operating the server) can be recorded in a different, secured location than the server. In addition, with the continued development of quantum computers, a need exists in the art for a device and a server to securely derive a symmetric ciphering key in a manner that is resistant to quantum computers feasibly solving elliptic curve Diffie Hellman problems and/or discrete logarithm problems.

Many other examples exist as well for needs in the art to conduct an ECDHE key exchange in a secure manner where the two nodes can be mutually authenticated, and the above are examples are just a few and intended to be illustrative instead of limiting.

SUMMARY

Methods and systems are provided for a server to conduct a mutually authenticated ephemeral elliptic curve Diffie-Hellman key exchange (ECDHE) with a device and using a key server. The device and the server can record and operate a set of compatible values and algorithms for a key pair generation algorithm, an ECDH key exchange algorithm, a key derivation function, a symmetric ciphering algorithm, and a random number generator, and a set of cryptographic parameters.

The device can comprise a computing device with a network interface to communicate with the server via an IP network. The device can comprise a transducer device for operating a transducer and communicating the transducer data with the server via secured communications. The device can comprise a device for "the Internet of Things", a mobile phone, a tracking device, a security system, a remote server on user premises, a module, a WiFi client, a WiFi access point, or similar devices. The server can comprise a computing device with a network interface to communicate with (i) the device via the IP network and (ii) the key server via a private network. The device can record a domain name service (DNS) name or uniform resource locator (URL) for the server. The key server can record a network static private key. The server can record and operate a server database. The device can be one of a plurality of different devices communicating with the server.

Before distribution to an end user of the computing device, a device manufacturer or a device distributor or a device owner could record a set of data in nonvolatile memory for the device. In addition to regular operating data and programs for the device, such as an operating system and a transducer driver, the data recorded in device before distribution could include (i) a network static public key, (ii) a server static public key, (iii) a device static public key, (iv) a set of cryptographic parameters associated with the static public keys, and (v) a device identity for the computing device. For a first exemplary embodiment, the network static public key can be unique for the device and not shared with other devices. For a second exemplary embodiment, the network static public key can be shared across a set of devices and thus the network static public key would not be uniquely recorded in an individual device, but the network static public key could be recorded in a set of devices. For a third exemplary embodiment, the server static public key can be unique for the device and not shared with other devices. For a fourth exemplary embodiment, the server static public key can be shared across a set of devices and thus the server static public key would not be uniquely recorded in an individual device, but the sever static public key could be recorded in a set of devices.

After power up and/or connecting with the IP network, the device can use the random number generator, the cryptographic parameters, and the key pair generation algorithm to derive a device ephemeral private key and a device ephemeral public key. The device can conduct a first ECDH key exchange using the device static private key, the device ephemeral private key, the server static public key, and the network static public key. The output from the first ECDH key exchange can comprise a shared secret or point X3. The device can derive a symmetric ciphering key using shared secret X3 and a key derivation function. The device can generate a first random number (different than the random number which could comprise the device ephemeral private key). The device can process a first ciphertext that contains or includes at least the first random number, where the ciphertext is encrypted with the derived symmetric ciphering key. The device can send the device ephemeral public key, the first ciphertext, identification information, and the associated set of cryptographic parameters to the server in a first message using the recorded DNS name or a URL for the server.

The device can also optionally send a device identity or a secure hash value for the network static public key to the server, in order for the server to identify the device or set of devices. Identification information for the device in the first message can comprise the device identity or secure hash value, although other values for the device identification information are possible as well. In some exemplary embodiments, the identity of the device and also the secure hash value can be omitted from the first message and the server identifies the group of devices by a particular IP address and port number and/or URL and/or DNS name used by the server and receiving data from devices. In other words, without identifying data for the device in the first message, (X) a subset of devices sending data to the server where the server uses a particular name, URL, or IP address and/or port number can be identified by (Y) the server receiving data from the devices using the IP address and port number and/or URL and/or DNS name.

The server can receive the first message and process the first message. The server can use the received set of cryptographic parameters to conduct an ECC point validation step to verify that the received ECC public key comprises a point on a named curve specified by the set of cryptographic parameters. The server can also verify that the received set of cryptographic parameters is valid or acceptable, such as using an acceptable named curve and also supporting a sufficient level of security such as an exemplary 256 bit long keys, although other values for key lengths are possible as well. The server can use identification information for the device from the first message to select PKI keys for the device from a server database. The selected PKI keys can comprise a device static public key and a server static private key. The server can also select a key server for use with communications and authentication with the device. The server can also select a device identity from the server database using the identification information for the device, for embodiments where the identification information in the first message comprises other information than a device identity for the device.

In order to select a key server, the server could use several different methods based on the identifying information of the device in the first message. The identifying information from the first message for the device used to select a key server could comprise any of the following in the first message: (i) an optional identity of the device, (ii) an optional secure hash value over a unique public key recorded by the device and the server database, (iii) the use of a particular set of cryptographic parameters, where the set of cryptographic parameters are associated with a particular key server, or (iv) the server can operate such that a particular URL or IP address and port number as a destination address is mapped to a particular key server.

The server can operate or be associated with a server database in order to record data for the server communicating with a plurality of different devices, such that different keys for different devices could be tracked by the server. In exemplary embodiments the first message is received with a random number generated by the device (in the first ciphertext) and also a source IP address and port number, and the server records the source IP address and port number for the first message in the server database. The server can conduct a first elliptic curve (EC) point addition operation using the received device ephemeral public key and the selected device static public key to derive a point X0 using the set of cryptographic parameters.

The server can record the name, address, or URL for a key server and communicate with the key server through a private network. The server can establish a secure session with the key server. The server can send the key server the point X0 in a second message. The second message can optionally include the set of cryptographic parameters, although the device, server, and key server could agree on the use of a particular set of cryptographic parameters before the device sends the first message.

The key server can receive the second message from the server over the secure connection. The second message can include point X0, the set of cryptographic parameters, and the device identity. The key server can select or read the network static private key using the second message received from the server (including possibly identifying information of the device in order to select a specific network static private key for the device). The network static private key can comprise a secret key corresponding to the network static public key recorded by the device. The key server can conduct a second ECDH key exchange using (i) the selected network static private key for the device and the received point X0 and (ii) the set of cryptographic parameters in order to derive a second shared secret, which can comprise a point X1. The key server can send a response to the second message in the form of a third message to the server, where the third message includes the derived point X1 and a device identity.

The server can receive the third message with the point X1 and the device identity. The server can conduct a third ECDH key exchange using the set of cryptographic parameters, the derived point X0 and the selected server static private key in order to derive a point X2. The server can conduct a key derivation step in order to mutually derive the symmetric ciphering key which was also previously derived by the device. The key derivation step used by the server can comprise (i) an EC point addition operation on the derived point X2 and the received point X1 from the key server, which results in the point X3 also derived by the device from the first ECDH key exchange, and (ii) input of the point X3 into the same key derivation function used by the device. The output of the key derivation function (KDF) in the key derivation step can comprise the mutually derived symmetric ciphering key. In exemplary embodiments the derived symmetric ciphering key can comprise a first portion for encrypting and decrypting data sent from the server to the device and a second, different portion for encrypting and decrypting data from sent from the device and to the server.

The server can then use a decryption step with the symmetric ciphering key in order to read plaintext from the first ciphertext received in the first message from the device. The plaintext read can include the first random number generated by the device. The successful decryption of the first ciphertext can indicate that the device is authenticated, since the server could only feasibly decrypt the ciphertext from the first message if the device conducted the first ECDH key exchange with the device static private key which corresponds to the device static public key used by the server and key server in the second and third ECDH key exchanges (in the form of point X0). The plaintext from the first message can comprise a first random number generated by the device and also optionally include device data.

The server can encrypt (i) a second random number generated by the server, (ii) the first random number received by the device, and (iii) a response to the device data received in the first message. The encryption step used by the server can include encryption using the mutually derived symmetric ciphering key. The output of the encryption step can comprise a second ciphertext. The server can send the device a fourth message, where the fourth message includes the device ephemeral public key and the second ciphertext.

The server could conduct additional steps such as (i) deriving server ephemeral private and public keys, (ii) deriving a second symmetric ciphering key using at least the device ephemeral public key and server ephemeral private key (possibly also with the server static private key and device static public key), and (iii) encrypting a third ciphertext with the second symmetric ciphering key. The third ciphertext could be internal or external to the second ciphertext. In exemplary embodiments, the fourth message includes at least the second ciphertext and may optionally also include the third ciphertext.

The device can receive the fourth message from the server and take steps to process the message. The device can decrypt the second ciphertext using the symmetric ciphering key derived by the device using the first ECDH key exchange. The device can read the plaintext from the second ciphertext. The device can confirm that the plaintext from the second ciphertext received in the fourth message includes the first random number. Successful decryption of the second ciphertext and reading the first random number from the second ciphertext, which could be sent by the device in the first ciphertext, can confirm that the server and/or network is authenticated.

In other words, the server and/or network could only feasibly successfully encrypt the second ciphertext if the server and/or network record and operate with both the server static private key and the network static private key which correspond to the server static public key and the network static public key recorded by the device and used in the first ECDH key exchange. The plaintext from the second ciphertext received by the device can also include the response from the server. The device can process the response and perform steps or instructions based on the plaintext response from the server.

The systems and methods described above can also be used with various implementations for the computing device and the server. A 5$^{th}$ generation or 6$^{th}$ generation wireless WAN network, such as based on standards from 3GPP, could utilize the steps above in order to conduct an ECDHE key exchange with mutual authentication and a key server. For this embodiment, the computing device could comprise a wireless device or wireless terminal, including a mobile phone or smart phone. The server could comprise a "g Node B" for "next generation node b", or gNb, which provides equivalent functionality of a base transceiver station and manages the radio-frequency communications with the wireless device. The key server could comprise a secured server (i) operating within the authentication function of a wireless network or (ii) associated with the authentication function of a wireless network for a mobile network operator. For the embodiment in this paragraph, the cryptographic parameters could comprise the values for curve 25519, although other ECC curves could be utilized as well.

The systems and methods described above can also be used with a device provisioning protocol. The computing device as described above can comprise an initiator according to the Device Provisioning Protocol specification version 1.0 from the WiFi Alliance®. The server can comprise a responder according to the same specification. Subsequent versions of the specification can utilize the methods and systems described herein as well. The device can receive and record the network static public key in the form of a responder bootstrap public key. A key server could record the network static private key in the form of a responder bootstrap private key.

The responder/server can receive the first message with (a) the device ephemeral public key from the initiator/device along with (b) a secure hash value of the responder bootstrap public key, and (c) an initial ciphertext. The responder/server can use the secure hash value of the responder bootstrap public key to select the key server for the device. The responder/server can forward the device ephemeral public key (as a point X0 which also combined the initiator bootstrap public key) to the selected key server. The key server can (i) conduct the second ECDH key exchange with the point X0 and the responder bootstrap private key and (ii) send the shared secret point X3 to the responder/server. The responder/server can use the second shared secret point X3 to decrypt the initial ciphertext received with the first message.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1c is an illustration of exemplary network static public keys and server static public keys recorded by a plurality of devices, in accordance with exemplary embodiments;

FIG. 2f is an illustration of an exemplary server database, in accordance with exemplary embodiments;

FIG. 3 is an illustration of an exemplary set of cryptographic parameters, in accordance with exemplary embodiments;

FIG. 5c is a simplified message flow diagram illustrating an exemplary system with exemplary data sent and received by an initiator, a responder, and a key server, in accordance with exemplary embodiments; and FIG. 5d is a simplified message flow diagram illustrating an exemplary system with exemplary data sent and received by a radio-frequency identification (RFID) tag, a RFID reader, and a key server, in accordance with exemplary embodiments.

DETAILED DESCRIPTION

FIG. 1a

Figure 1A:
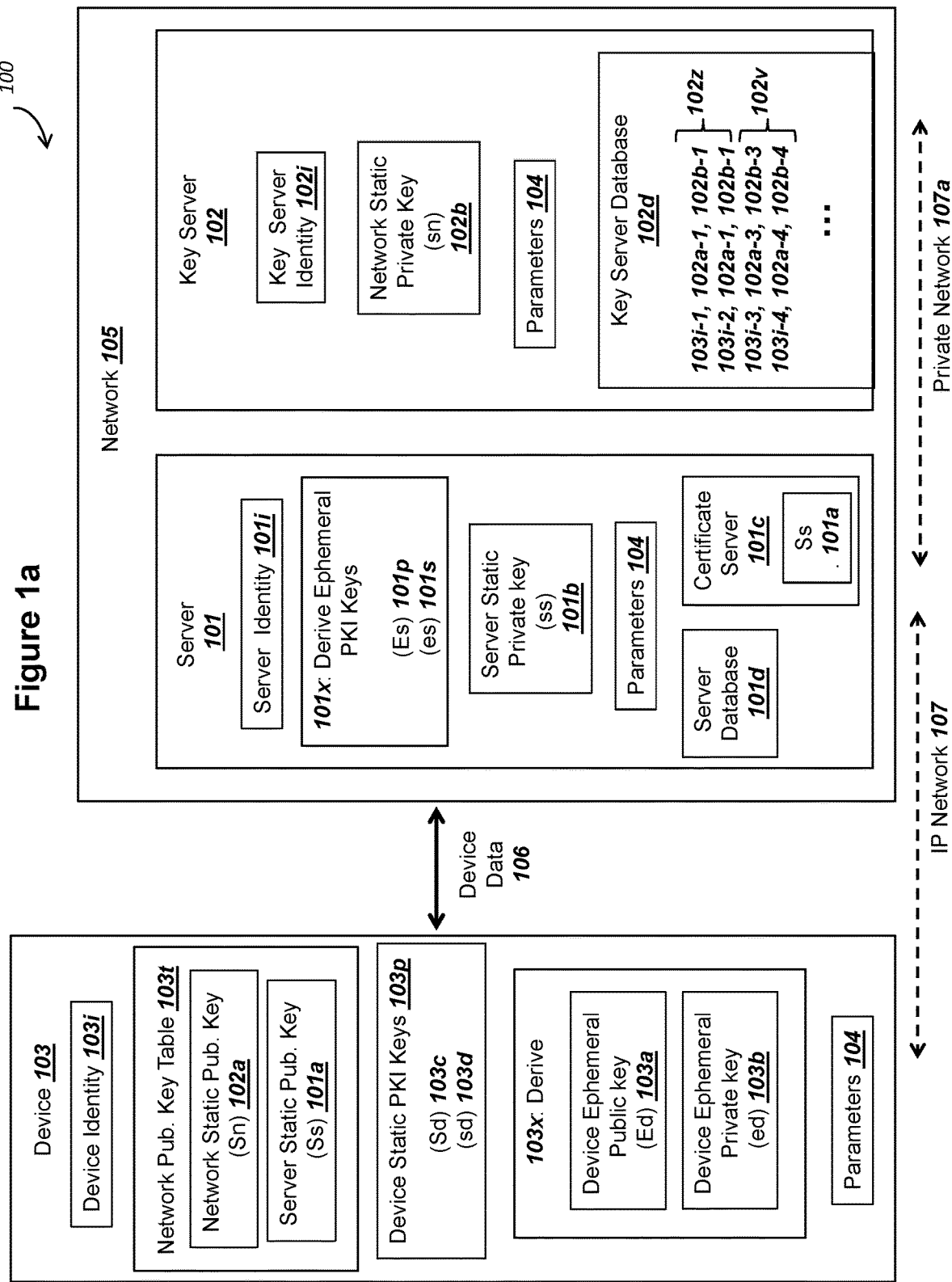
FIG. 1a is a graphical illustration of an exemplary system, where device communicates data with a network in order to conduct a key exchange, in accordance with exemplary embodiments.

FIG. 1a is a graphical illustration of an exemplary system, where device communicates data with a network in order to conduct a key exchange, in accordance with exemplary embodiments. The system 100 can include a device 103 and a network 105, where the nodes can communicate data 106 over an Internet Protocol (IP) network 107. Network 105 can comprise a plurality of servers supporting communication such as data 106 with a plurality of devices 103. In exemplary embodiments, network 105 can include a server 101 and a key server 102. The exemplary servers shown for network 105 in system 100 can be either different physical computers such as rack-mounted servers, or different logical or virtual servers or instances operating in a "cloud" configuration. Or, server 101 and key server 102 could represent different logical "server-side" processes within a network 105, including different programs running on a server that listen and communicate using different IP port numbers within one physical server.

In exemplary embodiments, server 101 and key server 102 can operate using the physical electrical components depicted and described for a server 101 in FIG. 1b below. Other possibilities exist as well for the physical embodiment of server 101 and key server 102 without departing from the scope of the present disclosure, including exemplary embodiments depicted and described in connection with FIG. 5a through FIG. 5d below. In exemplary embodiments, server 101 can be described as a "first server" and key server 102 can be described as a "second server". Further, the combination of a first server 101 and a second server 102 can comprise a network 105. The combination of a first server 101 and a second server 102 can also comprise a "set of servers".

Although server 101 and key server 102 are depicted in FIG. 1a as belonging to the same network 105, server 101 and key server 102 could be associated with different networks and communicate in a secure manner. Secure sessions between server 101 and key server 102 could be established over IP network 107 using methods including a physical wired connection via a local area network (LAN), transport layer security (TLS), a virtual private network (VPN), and IP Security (IPSEC), a secure shell (SSH) tunnel, and other possibilities exist as well. As depicted in FIG. 1a, server 101 and key server 102 could communicate over a private network 107a, where the private network 107a could be established using the methods for a secure session in the previous sentence.

Device 103 can be a computing device for sending and receiving data. Device 103 can take several different embodiments, such as a general purpose personal computer, a mobile phone based on the Android® from Google® or the IOS operating system from Apple®, a tablet, a device with a sensor or actuator for the "Internet of Things", a module for "machine to machine" communications, a device that connects to a wireless or wired Local Area Network (LAN), an initiator according to the Device Provisioning Protocol specification (DPP) from the WiFi alliance, a router, and/or a server, and other possibilities exist as well without departing from the scope of the present disclosure. Exemplary electrical components within a device 103 can be similar to the electrical components for a server 101 depicted and described in FIG. 1b below, where device 103 can use electrical components with smaller capacities and lower overall power consumption, compared to the capacity and power consumption for the same electrical components in a server 101.

Device 103 can include a device identity 103i, which could comprise a string or number to uniquely identify device 103 with network 105 and/or server 101 and server 102. Device identity 103i could comprise a medium access control (MAC) address for a physical interface such as Ethernet or WiFi, a Subscription Permanent Identifier (SUPI) with 5G networks, an international mobile subscriber identity (IMSI) or international mobile equipment identity (IMEI) with 2G/3G/4G networks, and other possibilities exist as well without departing from the scope of the present disclosure. In exemplary embodiments, device identity 103i can be written to hardware in device 103 and operate as a unique, long-term identity for device 103.

Device 103 can record at least one elliptic curve cryptography (ECC) static public key for network 105 comprising network static public key Sn 102a. Device 103 can record at least one elliptic curve cryptography (ECC) static public key for server 101 comprising server static public key Ss 101a. Network static public key Sn 102a and server static public key Ss 101a could be recorded in nonvolatile or volatile memory within device 103. For embodiments where keys 102a and/or 101a are recorded in nonvolatile memory, keys 102a and/or 101a could be recorded by a device manufacturer or device distributor. Or, key 102a could be recorded by a device owner before device 103 connects with network 105, and key 101a could be recorded by a device distributor or device manufacturer. Other possibilities exist as well for the source and secure recording of keys 102a and 101a without departing from the scope of the present disclosure.

As contemplated in the present disclosure, the use of a capital letter as the first character for a PKI key can represent a public key, the use of a lower case letter as the first character for a PKI key can represent a private key. The use of a character "S" or "s" for the first character in a key can represent a static key and the use of a character "E" or "e" for the first character can represent an ephemeral key. In some embodiments, an ephemeral key can be referred to as a protocol key or a temporary key. As contemplated in the present disclosure, the second letter for a PKI key can represent the entity the key is associated with or belongs to (e.g. "d" for device 103 and "s" for server 101 and "n" for network 102). Thus, using the notation described in the previous three sentences, the corresponding private key for network static public key Sn 102a can comprise network static private key ss 102b. Likewise, a key "es" would represent an ephemeral private key for a server, while key "Es" would represent an ephemeral public key for a server. Similarly, "Ed" would represent an ephemeral public key for a device 103 and "sd" would represent a static private key for a device 103, etc.

For embodiments where public keys Sn 102a and Ss 101a are recorded in volatile memory, device 103 could obtain keys 102a and 101a from a different server than server 101 for network 105 before sending data 106, such as device 103 obtaining keys 102a and/or via a secure session from a different server before sending data 106. A device 103 can record a plurality of different network static public keys Sn 102a and server static public keys Ss 101a in a network public key table 103t. Different keys 102a in a table 103t could be associated with different networks 105 that device 103 communicates with over time. Or (i) a first set of keys 102a and 101a could be used with a first network, and (ii) a second, different set of keys 102a and 101a in a table 103t could be used as a backup or failover second set of keys 102a and 101a for the first network, and (iii) a third set of keys 102a and 101a could be used with a second network. Exemplary data for a network public key table 103t for device 103 is depicted and described in connection with FIG. 1c below. The different keys 102a and/or 101a can be associated with network names and/or Uniform Resource Locators (URLs) or domain names, such that device 103 can select the network static public key 102a and/or 101a based on a URL or domain name where device 103 will send data 106.

Network static public key Sn 102a and server static public key Ss 101a can be obtained by device 103 before conducting an elliptic curve Diffie-Hellman (ECDH) key exchange or an ephemeral elliptic curve Diffie-Hellman (ECHDE) key exchange. Network static public key 102a and/or server static public key Ss 101a could be obtained by device 103 in several different ways. Network static public key 102a and/or server static public key 101a could be written into memory by a manufacturer, distributor, or owner of device 103 before device 103 connects with server 101 or a network 107. Keys 102a and 101a could be received by device 103 over an IP network 107 via a secured session, such as a TLS, IPSec, or VPN connection before sending data 106 to server 101. In exemplary embodiments, network static public key 102a and server static public key 101a are recorded in device 103 in a secured and authenticated manner, such that device 103 can trust network static public key 102a.

As one exemplary embodiment, network static public key 102a and/or server static public key 101a could be public keys within different certificates, where the public keys 102a and/or 101a are signed by a certificate authority. Although not depicted in FIG. 1a, device 103 could also record a certificate authority root certificate or public key, and device 103 could (a) verify the signature of a certificate authority in a certificate for the public key 102a and/or 101a using (b) the recoded root certificate or public key for the certificate authority (and any intermediary parent certificates). Network static public key 102a and server static public key 101a could be processed or formatted according to a set of cryptographic parameters 104, and network static public key 102a and server static public key 101a could also be compatible with parameters 104.

Although public keys 102a and 101a are described as "static" herein, the key could change over time such as with the expiration of a validity date when recorded in a certificate. Public keys 102a and 101a could remain static over the period of time for device 103 to conduct at least two separate ECDHE key exchanges, where one ECDHE key exchange uses an ephemeral or derived ECC PKI keys for device 103. Public keys 102a and 101a could comprise a long-term public key for use by device 103 or a plurality of devices 103 when communicating with network 107. Although the use of a certificate for public keys 102a and 101a is described in the paragraph above for public keys 102a and 101a, the use of a certificate is not required. In an embodiment depicted in FIG. 5c below, (i) public key 102a could comprise a responder bootstrap public key and (ii) device 103 could comprise an initiator according to the DPP standard, which is also depicted and described in connection with FIG. 5c below.

Cryptographic parameters 104 can specify values or settings for (i) conducting an ECDH or ECDHE key exchange, (ii) mutually deriving a symmetric ciphering key through a key derivation function and/or a secure hash algorithm, and (iii) using a symmetric ciphering algorithm. As contemplated herein, cryptographic parameters 104 may also be referred to as parameters 104. Each of device 103, server 101, and key server 102 can record at least one compatible subset of parameters within a set of cryptographic parameters 104. Parameters 104 can specify values for an elliptic curve cryptography (ECC) curve name, key length, key formatting (e.g. compressed or uncompressed), encoding rules, etc.

As contemplated herein, the parameters 104 and cryptographic algorithms used with ECC PKI keys and a key exchange in the present disclosure can be compatible and substantially conform with ECC algorithms and keys as specified in (i) the IETF Request for Comments (RFC) 6090 titled "Fundamental Elliptic Curve Cryptography Algorithms", and (ii) IETF RFC 5915 titled "Elliptic Curve Private Key Structure", and also subsequent and related versions of these standards. Other possibilities exist as well for cryptographic parameters 104 without departing from the scope of the present disclosure.

For use of ECC algorithms, parameters 104 can specify elliptic curve names such as, but not limited to NIST P-256, sect283k1, sect283r1, sect409k1, sect409r1, and other possibilities exist as well. Further, elliptic curves that do not depend on curves currently specified by the National Institute of Standards and Technology (NIST) could be utilized as well, such as, but not limited to, Curve22519, curve448, or FourQ. Parameters 104 can specify domain parameters for nodes in system 100 to calculate values or numbers in a compatible manner, such as common base point G for use with ECC PKI key pairs and a defining equation for an elliptic curve. An exemplary set of cryptographic parameters 104 is depicted and described in connection with FIG. 3 below.

Device 103 can include an ECC key pair generation algorithm 103x and server 101 can include a compatible ECC key pair generation algorithm 101x. A key pair generation algorithm 103x or 101x can use (i) a random number generator in order to derive the ephemeral PKI private key and (ii) a selected set of cryptographic parameters 104 in order to calculate the ephemeral PKI public key. In exemplary embodiments, a random number for the ephemeral PKI private key multiplies the base point G from the parameters 104 in order to obtain the corresponding ephemeral PKI public key. An ECDH key exchange or key derivation step can conduct an elliptic curve point multiplication with a scalar value (e.g. a private key) and a point. Other possibilities exist as well for the algorithms 103x and 101x to derive an ephemeral ECC PKI key pair without departing from the scope of the present disclosure. A key pair generation algorithm 103x for device 103 can output an ephemeral ECC PKI pair comprising device ephemeral public key Ed 103a and device ephemeral private key ed 103b. A key pair generation algorithm 101x for server 101 can output an ephemeral ECC PKI pair comprising server ephemeral public key Es 101a and server ephemeral private key es 101b.

Device 103 can also record a device static PKI key pair 103p in nonvolatile memory or within a secure processing environment within device 103. The key pair 103p can be either (i) generated by device 103 during device manufacturing or device distribution, or (ii) generated externally from device 103 and written to device 103 in a secure manner during device manufacturing or device distribution. The PKI key pair 103p can comprise a device static private key sd 103d and a device static public key Sd 103c. The keys sd 103d and Sd 103c could be formatted and compatible with a selected subset of cryptographic parameters 104a from set of cryptographic parameters 104. In exemplary embodiments, public key Sd 103c can be recorded in an X.509 certificate from a certificate authority.

In some embodiments, device 103 could renew static key Sd 103c and sd 103d, or possibly record a plurality of the values upon manufacturing or distribution. Device 103 could switch from using a first pair of static device PKI keys to a second pair of static device PKI keys over time. In addition, a first pair of device static PKI keys could be associated with a first set of cryptographic parameters 104a and a second pair of static PKI keys (e.g. key 103c and key 103d) could be associated with a second set of cryptographic parameters 104a. Thus, device 103 could record a plurality of different device static PKI key pairs 103p associated with different parameters 104a, and select the PKI key pair 103p based on the parameters 104a for use with data 106.

As depicted in FIG. 1a, server 101 can include a server identity 101i, a key pair generation algorithm 101x, a set of cryptographic parameters 104, a server database 101d, a server certificate 101c, and at least one server static private key ss 101b. Server identity 101i can comprise a name or number to uniquely identify server 101 in network 105 and/or IP network 107. In exemplary embodiments, server identity 101*i* can comprise a domain name service (DNS) name, which could comprise a string of characters and/or numbers. Server identity 101*i* could also comprise a realm portion of a network access identifier. Server identity 101*i* could be associated with an IP address, such that the exemplary data 106 from device 103 could be routed to server 101 via the IP network 107. Server identity 101*i* could also comprise a MAC address, and a server identity 101*i* could comprise multiple different values such as all of (i) a MAC address, (ii) a DNS name, (iii) and virtual instance identity if server 101 operates as a virtual server.

In summary, server identity 101*i* can allow (a) a plurality of different devices 103 to (b) select and route data 106 to server 101 from a potential plurality of different servers and nodes. Other possibilities exist as well for the format, structure, or value for a server identity 101*i* without departing from the scope of the present disclosure. Server identity 101*i* could also comprise a server name indication (SNI) value.

The set of cryptographic parameters 104 for server 101 can be equivalent to or a superset of the cryptographic parameters 104 used by device 103. The description above for a set of parameters 104 used by a device 103 is also applicable to a set of parameters 104 used by a server 101. Cryptographic parameters 104 and a subset of cryptographic parameters 104*a* are depicted and described in connection with FIG. 3 below.

Server database 101*d* for server 101 can comprise a database or memory recording data for server 101 to communicate with both a plurality of devices 103 and also at least one server static private key ss 102*b*. An exemplary server database 101*d* is depicted and described in connection with FIG. 2*f* below. Server database 101*d* can record values for PKI keys, selected parameters 104*a* for use with PKI keys, derived shared secrets, derived symmetric ciphering keys, random numbers used in secure sessions, and related values in order to support the communications with both device 103 and server 102, as well as a plurality of different devices 103. Server certificate 101*c* can comprise a certificate formatted according to the X.509 family of standards and include a static server 101 public key Ss 101*a*. Server certificate 101*c* can include a signature from a certificate authority for server public key Ss 101*a*.

As depicted in FIG. 1*a*, server 101 can also record and operate with a private key corresponding to public key Ss 101*a*, where the server static private key ss 101*b* can is depicted in FIG. 1*a*. Note that a server 101 could operate with a plurality of different pairs of PKI keys comprising public key Ss 101*a* and private key ss 101*b* in order to support communications with a plurality of different devices 103. The use of different values for keys Ss 101*a* and ss 101*b* with different devices 103 is depicted and described in connection with FIG. 2*f* below, such as a first pair 101*a*-1, 101*b*-1 with a first device identity 103*i*-1 and a second pair 101*a*-3, 101*b*-3 with a second device identity 103*i*-3.

As depicted in FIG. 1*a*, key server 102 can include a key server identity 102*i*, a set of cryptographic parameters 104, a network static private key sn 102*b*, and a key server database 102*d*. Key Server identity 102*i* can comprise a name or number to uniquely identify key server 102 in network 105 and/or IP network 107. Key Server identity 102*i* can be similar to server identity 101*i*, except using a different value, name, or number in order to uniquely identify key server 102 within network 105. The set of cryptographic parameters 104 for server 102 can be equivalent to or a superset of the cryptographic parameters 104 used by device 103 and parameters 104 was also described above for device 103.

In exemplary embodiments, the parameters 104 used by both key server 102 and server 101 can be fully compatible, such as using the same ECC named curve, key lengths, encoding rules, etc. Server database 102*d* for key server 102 can comprise a database or memory recording data for key server 102 to (i) communicate with a plurality of servers 101 and (ii) support server 101 communicating with a plurality of devices 103. Key server database 102*d* can be similar to server database 101*d* depicted in FIG. 2*f*, except that key server database 102*d* can record values and data calculated by key server 102. Key server database 102*d* can record values for PKI keys, derived shared secrets, and related values in order to support the communications between (i) network 105 and/or server 101 and (ii) device 103.

As depicted in FIG. 1*a*, key server database 102*d* can record sets of data for different devices 103, where each set can comprise a row in a table with a device identity 103*i*, the network static public key value Sn 102*a*, and the network static private key sn 102*b*. In exemplary embodiments, a key server database 102*d* can also include secure hash values for the network static public key Sn 102*a*, and key server 102 could select the network static private key sn 102*b* using the secure hash value for the network static public key Sn 102*a*. Or, key server 102 could select the network static private key sn 102*b* using the network static public key Sn 102*a*.

As depicted for a key server database 102*d* in FIG. 1*a*, some devices 103 could share the same keys 102*a* and 102*b*, which could comprise shared keys 102*z* for the devices 103 as depicted and described in connection with FIG. 1*c* below. Other devices 103 could record unique keys 102*v*, where devices 103 record a value for the network static public key Sn 102*a* that is uniquely recorded in each device. A key server database 102*d* could record and track the associated network private and public keys for each device. In other exemplary embodiments, a key server 102 could omit recording device identities 103*i* in a database 102*d*, and key server 102 could associate and use a network static private key sn 102*b* with a particular server 101 (e.g. all data from a server 101 could use or be associated with the private key sn 102*b*).

Other possibilities exist as well for the mapping of network static private keys to either servers 101 or devices 103 without departing from the scope of the present disclosure. Also, although a single value for sn 102*b* is depicted as associated with a device 103 using a device identity 103*i* in a key server database 102*d*, a key server 102 could also record and use multiple different values of network static private key sn 102*b*, such as (i) different values for sn 102*b* for different parameters 104 (e.g. different named curves), or (ii) separate values for sn 102*b* for digital signatures and ECDH key exchanges. In other words, a device 103 could also record the corresponding different multiple values for Sn 102*a*, and select and use the public keys depending on requirements such as parameters 104 used or if the network public key will be used for verifying digital signatures or conducting ECDH key exchanges. The use of multiple different values for Sn 102*a* by device 103 for a network 105 is also depicted and described in connection with FIG. 1*c* below.

Key server 102 can record at least one network static private key sn 102*b*, which can be the private key corresponding to the network static public key Sn 102*a* recorded by a set of devices 103 and described above for device 103. In exemplary embodiments and as depicted in FIG. 1*a* and also FIG. 2a below, key server 102 may not communicate with device 103 directly, but rather communicates with server 101 through a private network 107a. Although not depicted in FIG. 1a, a network 105 could operate a firewall in order to prevent packets or data from the public Internet (other than server 101) from reaching key server 102. In this manner by isolating key server 102 from IP network 107, security for the key server 102 and the network static private key sn 102b can be enhanced, since only authenticated and authorized nodes within network 105 and connected to private network 107a could communicate with key server 102.

IP network 107 could be either a Local Area Network (LAN) or a Wide Area Network (WAN), or potentially a combination of both. IP network 107 could include data links supporting either IEEE 802.11 (WiFi) standards. Device 103 also utilize a variety of WAN wireless technologies to communicate data 106 with server 101, including Low Power Wide Area (LPWA) technology, 3rd Generation Partnership Project (3GPP) technology such as, but not limited to, 3G, 4G Long-Term Evolution (LTE), or 4G LTE Advanced, NarrowBand-Internet of Things (NB-IoT), LTE Cat M, proposed 5G networks, and other examples exist as well. Server 101 can connect to the IP network 107 via a wired connection such as, but not limited to, an Ethernet, a fiber optic, or a Universal Serial Bus (USB) connection (not shown).

IP network 107 could also be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 107 could utilize globally routable IP addresses. Private IP network 107a could utilize private IP addresses which could also be referred to as an Intranet. Other possibilities for IP Network 107 and Private Network 107a exist as well without departing from the scope of the disclosure.

FIG. 1b

Figure 1B:
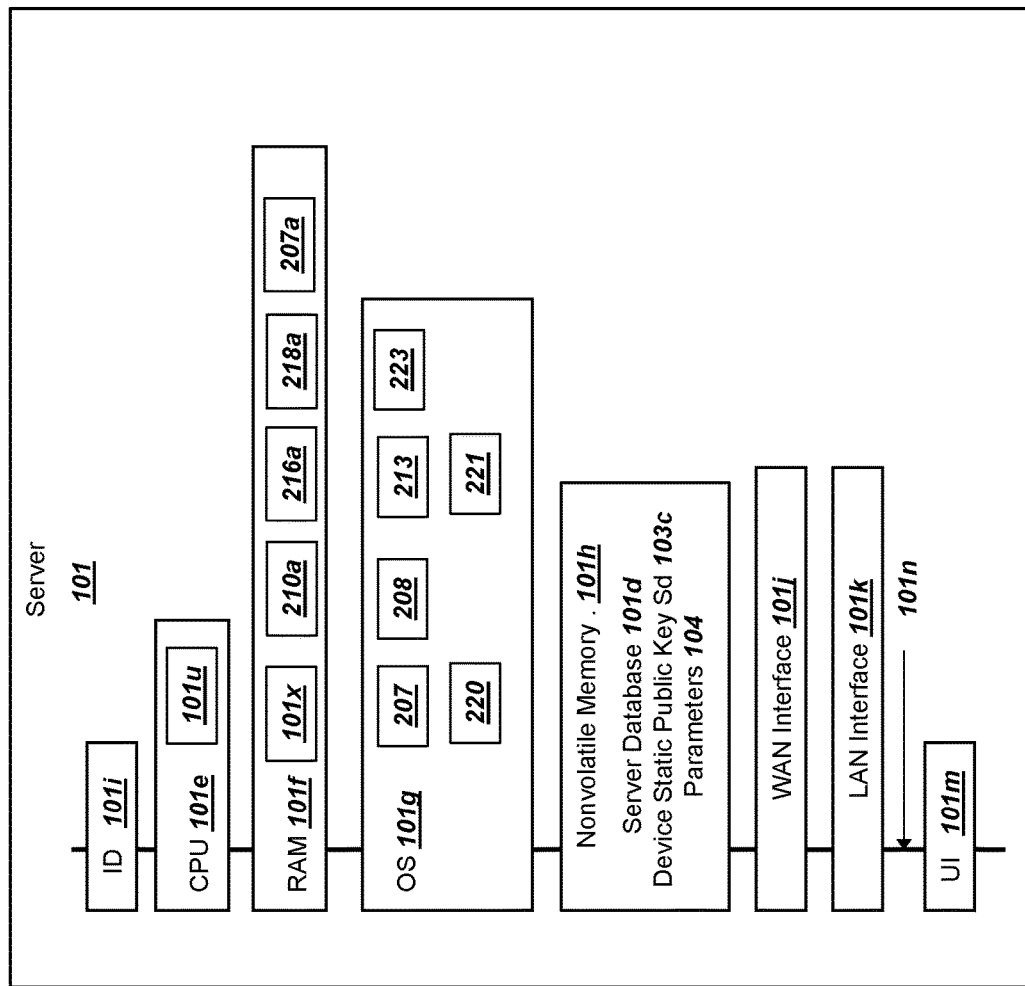
FIG. 1b is a graphical illustration of hardware, firmware, and software components for a server, in accordance with exemplary embodiments.

FIG. 1b is a graphical illustration of hardware, firmware, and software components for a server, in accordance with exemplary embodiments. FIG. 1b is illustrated to include several components that can be common within a server 101. Server 101 may consist of multiple electrical components in order to communicate with a plurality of devices 101 and at least one key server 102. In exemplary embodiments and as depicted in FIG. 1b, server 101 can include a server identity 101i, a processor 101e (depicted as "CPU 101e"), random access memory (RAM) 101f, an operating system (OS) 101g, storage memory 101h (depicted as "nonvolatile memory 101h"), a Wide Area Network (WAN) interface 101j, a LAN interface 101k, a system bus 101n, and a user interface (UI) 101m.

Server identity 101i could comprise a preferably unique alpha-numeric or hexadecimal identifier for server 101, such as an Ethernet MAC address, a domain name service (DNS) name, a Uniform Resource Locator (URL), an owner interface identifier in an IPv6 network, a serial number, an IP address, or other sequence of digits to uniquely identify each of the many different possible nodes for a server 101 connected to an IP network 105. Server identity 101i can preferably be recorded in a non-volatile memory and recorded by a network 105 upon configuration of a server 101. Server identity 101i may also be a number or string to identify an instance of server 101 running in a cloud or virtual networking environment.

In exemplary embodiments, server 101 can operate with multiple different server identities 101i, such as a first server identity 101i comprising a DNS name and a second server identity 101i comprising an IP address and a port number. A different server 101 could be associated with a different IP address and port number for a network 105. In exemplary embodiments, a first server 101 with a first server identity 101i can operates with a first Internet Protocol address and port (IP:port) number with a first server static private key ss 101b, and a second server 101 with a second server identity 101i can operate with a second IP:port number and a second server static private key ss 101b.

The CPU 101e can comprise a general purpose processor appropriate for higher processing power requirements for a server 101, and may operate with multiple different processor cores. CPU 101e can comprise a processor for server 101 such as an ARM® based process or an Intel® based processor such as belonging to the XEON® family of processors, and other possibilities exist as well. CPU 101e can utilize bus 101n to fetch instructions from RAM 101f and operate on the instruction. CPU 101e can include components such as registers, accumulators, and logic elements to add, subtract, multiply, and divide numerical values and record the results in RAM 101f or storage memory 101h, and also write the values to an external interface such as WAN interface 101j and/or LAN interface 101k. In exemplary embodiments, CPU 101e can perform the mathematical calculations for a key pair generation step 101x and also an ECDH key exchange algorithm 220 depicted in FIG. 2a, FIG. 2d, etc., below.

Figure 2A:
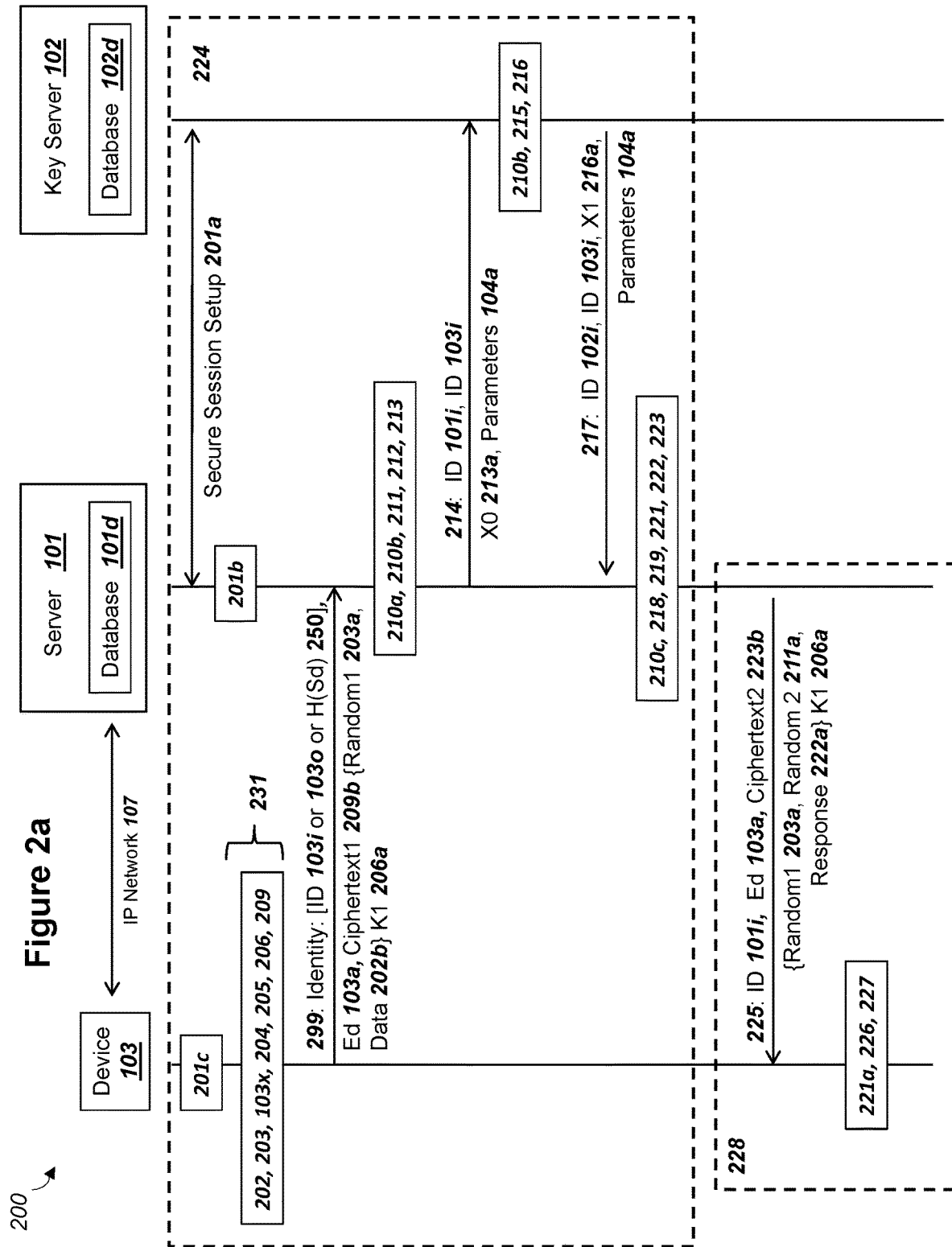
FIG. 2a is a simplified message flow diagram illustrating an exemplary system with exemplary data sent and received by a device, a server, and a key server, in accordance with exemplary embodiments.
Figure 2B:
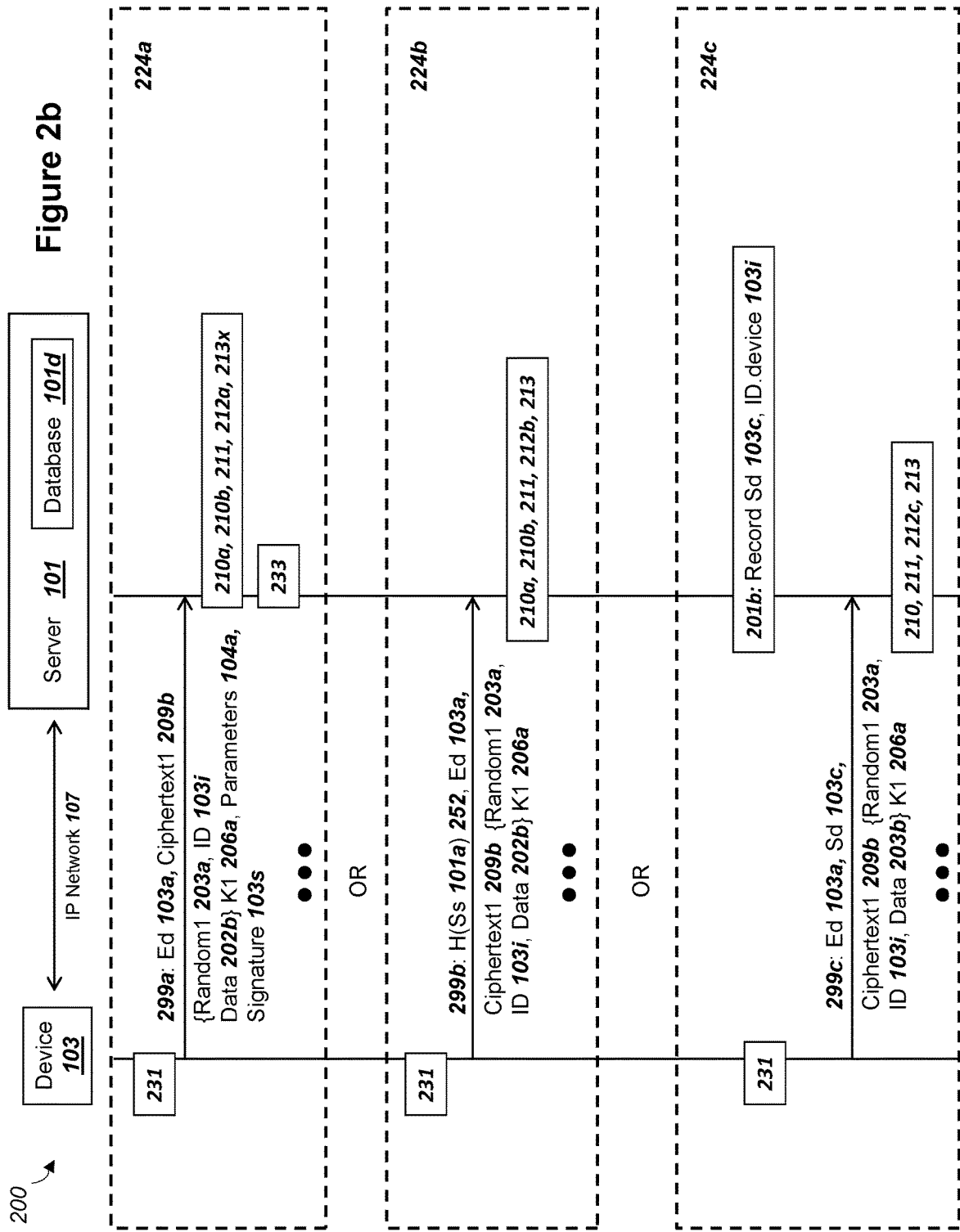
FIG. 2b is a simplified message flow diagram illustrating an exemplary messages transmitted from a device to a server, in accordance with exemplary embodiments.
Figure 2C:
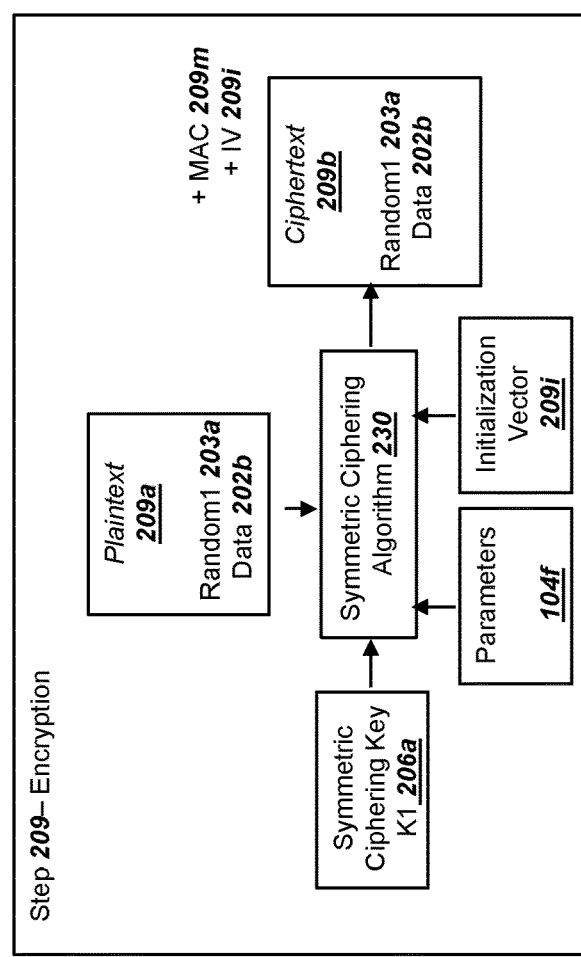
FIG. 2c is a flow chart illustrating exemplary steps for conducting a key exchange using PKI keys in order to derive a shared secret key, and for using the derived shared secret key to encrypt and decrypt data, in accordance with exemplary embodiments.
Figure 2C:
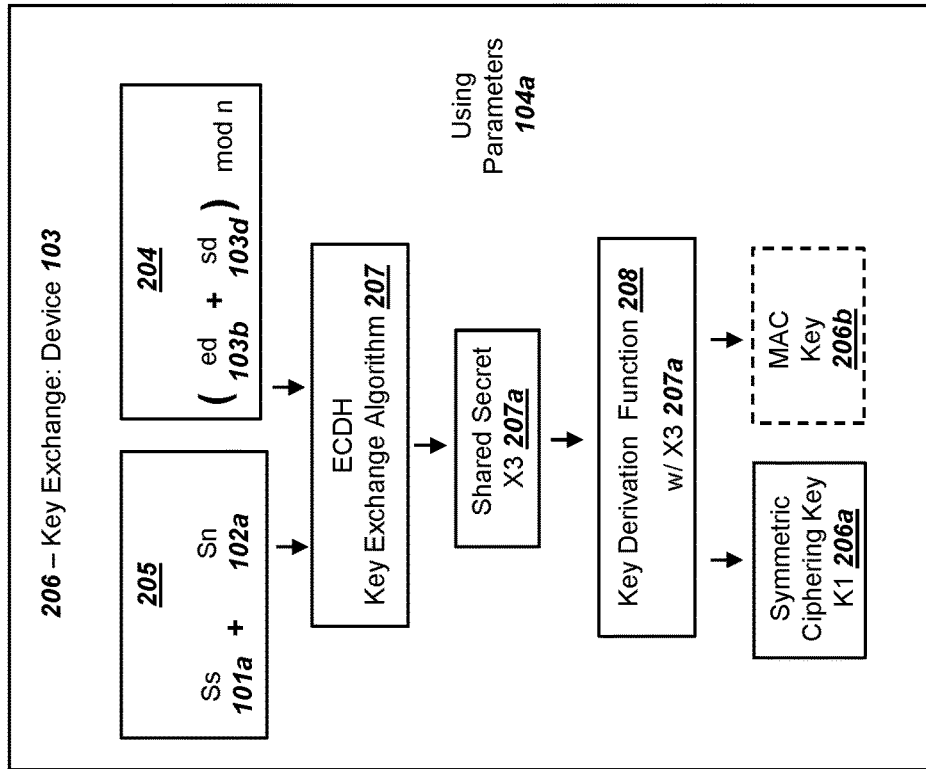
Figure 2D:
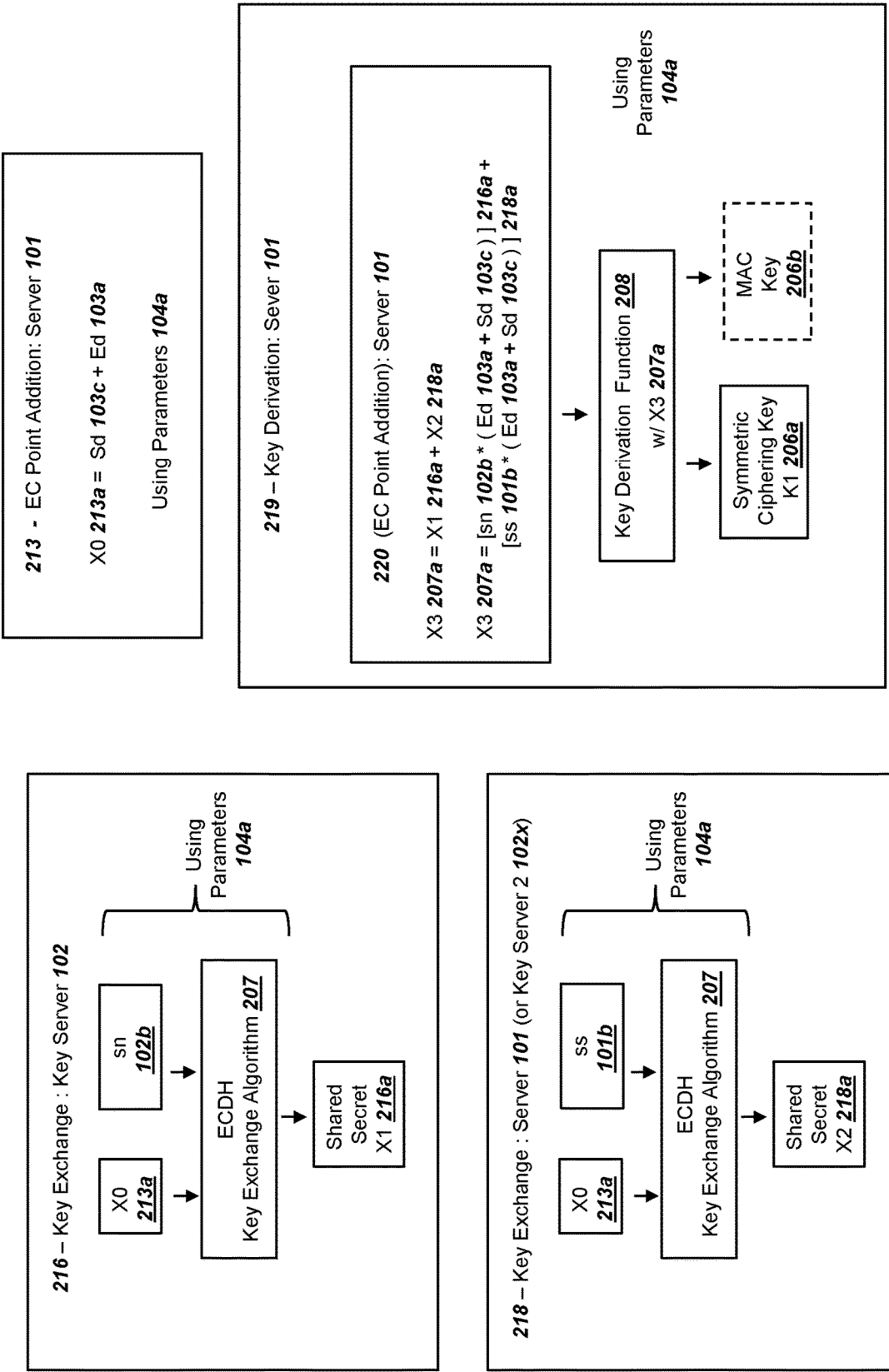
FIG. 2d is a flow chart illustrating exemplary steps for conducting an elliptic curve (EC) point addition operation to combine public keys, for conducting a key exchange using PKI keys in order to derive shared secrets, and for conducting a key derivation function using the derived shared secrets, in accordance with exemplary embodiments.

CPU 101e can also contain a secure processing environment (SPE) 101u in order to conduct elliptic curve cryptography (ECC) operations and algorithms, such as EC point addition steps 213 and 220 as depicted in FIG. 2d below, as well as deriving ephemeral ECC PKI keys such as with key generation step 101x depicted and described in connection with FIG. 1a above. SPE 101u can comprise a dedicated area of silicon or transistors within CPU 101e in order to isolate the ECC operations from other programs or software operated by CPU 101e, including many processes or programs running operating system 101g. SPE 101u could contain RAM memory equivalent to RAM 101f and nonvolatile memory equivalent to storage memory 101h, as well as a separately functioning processor on a smaller scale than CPU 101e, such as possibly a dedicated processor core within CPU 101e. SPE 101u can comprise a "secure enclave" or a "secure environment", based on the manufacturer of CPU 101e. In some exemplary embodiments, an SPE 101u can be omitted and the CPU 101e can conduct ECC operations or calculations without an SPE 101u.

RAM 101f may comprise a random access memory for server 101. RAM 101f can be a volatile memory providing rapid read/write memory access to CPU 101e. RAM 101f could be located on a separate integrated circuit in server 101 or located within CPU 101e. The RAM 101f can include data recorded in server 101 for the operation when communicating with a plurality of devices 103 or a key server 102. The system bus 101n may be any of several types of bus structures including a memory bus or memory controller, a peripheral bus, and a local bus using any of a variety of bus architectures including a data bus. System bus 101n connects components within server 101 as illustrated in FIG. 1b, such as transferring electrical signals between the components illustrated. Server 101 can include multiple different versions of bus 101n to connect different components, including a first system bus 101n between CPU 101e and RAM 101f (which could be a memory bus), and a second system bus 101n between CPU 101e and WAN interface 101j or LAN interface 101k, which could be an I2C bus, an SPI bus, a PCI bus, or similar data busses.

In exemplary embodiments, RAM 101f operating with server 101 can record values and algorithmic steps or computer instructions for conducting an ECDH key exchange, including a key pair generation step 101x. Additional shared secret values or points on an elliptic curve can be recorded in RAM 101f as well, such as the values or points depicted and described in connection with FIG. 2d below, which could comprise a point X0 213a, a secret X1 216a, secret X2 218a, and a secret X3 207a. The depicted values and algorithms can be recorded in RAM 101f so that CPU 101e can conduct ECC operations and calculations quickly using the values. The depicted values could also be recorded in other locations for longer-term or nonvolatile storage, such as within a server database 101d. Additional or other values besides the ones depicted in FIG. 1b can also be recorded in RAM 101f in order to support server 101 conducting the communications, steps, and message flows depicted in FIG. 2a and FIG. 4 below, and also other Figures herein.

The operating system (OS) 101g can include Internet protocol stacks such as a User Datagram Protocol (UDP) stack, Transmission Control Protocol (TCP) stack, a domain name system (DNS) stack, a TLS stack, a DPP stack, etc. The operating system 101g may include timers and schedulers for managing the access of software to hardware resources within server 101, where the hardware resources managed by OS 101g can include CPU 101e, RAM 101f, nonvolatile memory 101h, and system bus 101n, and well as connections to the IP network 107 via a WAN interface 101j. The operating system shown of 101g can be appropriate for a higher power computing device with more memory and CPU resources (compared to a device 103). Example operating systems 101g for a server 101 includes Linux or Windows® Server, and other possibilities exist as well. Although depicted as a separate element within server 101 in FIG. 1b, OS 101g may reside in RAM 101f and/or nonvolatile memory 101h during operation of server 101.

As depicted in FIG. 1b, OS 101g in FIG. 1b can contain algorithms, programs, or computer executable instructions (by processor 101e or SPE 101u) for an ECDH key exchange algorithm 207 (depicted and described in FIG. 2d below), a key derivation function (KDF) 208 (depicted and described in FIG. 2d below), and also EC point addition operations 213 and 220. ECC point addition operation 213 and 220 are depicted and described in connection with FIG. 2d below. OS 101g could also record and operate a decryption step 221 and an encryption step 223, as depicted and described below in FIG. 2e. The steps or algorithms could be included either (i) within the kernel of OS 101g, or (ii) as a separate program or process loaded by OS 101g and operated by OS 101g. OS 101g can also read and write data to a secure processing environment SPE 101u, if CPU 101e contains SPE 101u.

Nonvolatile memory 101h or "storage memory" 101h (which can also be referred to herein as "memory 101h") within server 101 can comprise a non-volatile memory for long-term storage of data, including times when server 101 may be powered off. Memory 101h may be a NAND flash memory or a NOR flash memory and record firmware for server 101, such as a bootloader program and OS 101g. Memory 101h can record long-term and non-volatile storage of data or files for server 101. In an exemplary embodiment, OS 101g is recorded in memory 101h when server 101 is powered off, and portions of memory 101h are moved by CPU 101e into RAM 101f when server 101 powers on.

Memory 101h (i) can be integrated with CPU 101e into a single integrated circuit (potentially as a "system on a chip"), or (ii) operate as a separate integrated circuit or a removable card or "disk", such as a solid state drive (SSD). Storage memory 101h can also comprise a plurality of spinning hard disk drives in a redundant array of independent disks (RAID) configuration. Memory 101h may also be referred to as "server storage" and can include exemplary file systems of FAT16, FAT 32, NTFS, ext3, ext4, UDF, or similar file systems. As contemplated herein, the terms "memory 101h", "storage memory 101h", and "nonvolatile memory 101h" can be considered equivalent.

As depicted in FIG. 1b, non-volatile memory 101h can record a server database 101d, at least one device static public key Sd 103c, and cryptographic parameters 104. Exemplary data within a server database 101d is depicted and described in connection with FIG. 2f below. Although depicted in FIG. 1b as recorded within memory 101h, a server database 101d could also operate as a separate server than server 101 in a network 105, and server 101 could query the server database 101d using a private network 107a. The device static public key Sd 101c could be received by server 101 from a device manufacturer or a device owner, or directly from device 103 through IP network 107 (preferably in a secured manner). In addition, as depicted in FIG. 1b, memory 101h can record the parameters 104 which were depicted and described in connection with FIG. 1a above and also FIG. 3 below.

Server 101 can include a WAN interface 101j to communicate with IP network 107 and a plurality of devices 103, as depicted in FIG. 1a above (where FIG. 1a depicts a single device 103). WAN interface 101j can comprise either a wired connection such as Ethernet or a wireless connection. For wireless configurations of server 101, then WAN interface 101j can comprise a radio, which could connect with an antenna in order to transmit and receive radio frequency signals. For a wireless configuration of server 101, WAN interface 101j within server 101 can provide connectivity to an IP network 107 through 3GPP standards such as 3G, 4G, 4G LTE, and 5G networks, or subsequent and similar standards.

In some exemplary embodiments, server 101 can comprise a "g node b" or gNb in a 5G network (or equivalent functionality in 6G or subsequent networks), and WAN interface 101j can comprise a 5G radio access network (RAN) interface. WAN interface 101j can also comprise a wired connection such as digital subscriber line (DSL), coaxial cable connection, or fiber optic connection, and other possibilities exist as well without departing from the scope of the present disclosure.

Server 101 may also operate a LAN interface 101k, where LAN interface 101k can be used to connect and communicate with other servers in a network 105, such as key server 102 through private network 107a. LAN interface 101k can comprise a physical interface connected to system bus 101n for server 101. In exemplary embodiments, LAN interface 101k can comprise an Ethernet or fiber optic wired connection. In other words, (i) LAN interface 101k can connect server 101 to private network 107a (which could comprise an IP network with private IP addresses that are not globally routable), and (ii) WAN interface 101j can comprise an interface for communicating with a plurality of devices 103 through insecure networks such as the globally routable public Internet. The use of a separate WAN interface 101j and LAN interface 101k can increase the security of operation for server 101. However, the use of separate physical interfaces for LAN interface 101k and WAN interface 101j can be omitted, and a single physical interface such as Ethernet or fiber-optic could be used by server 101 to communicate with both devices 103 and key server 102. Server 101 may also optionally include user interface 101m which may include one or more sub-servers for receiving inputs and/or one or more sub-servers for conveying outputs. User interfaces are known in the art and may be simple for many servers 101 such as a few LED lights or and LCD display, and thus user interfaces are not described in detail here. User interface 101m could comprise a touch screen or screen display with keyboard and mouse, if server 101 has sophisticated interaction with a user, such as a network administrator. Server 101 can optionally omit a user interface 101m, if no user input or display is required for establishing communications within a network 105 and/or IP network 107.

Although not depicted in FIG. 1b, server 101 can include other components to support operation, such as a clock, power source or connection, antennas, etc. Other possibilities exist as well for hardware and electrical components operating in a server 101 without departing from the scope of the present disclosure. Using the electrical components depicted in FIG. 1b, a server 101 could send and receive the data 106 in FIG. 1a in an encrypted and secure manner after conducting the authenticated ECDHE key exchange as contemplated herein, in order to derive a symmetric ciphering key to encrypt and decrypt messages within data 106 with a plurality of devices 103.

Although not depicted in FIG. 1b, devices 103 such as the device 103 depicted in FIG. 1a above can include (a) equivalent internal electrical components depicted for a server 101 in order to (b) operate as devices 103. A device 103 in FIG. 1a could include a processor similar to CPU 101e, with primary differences for the processor in a device being reduced speed, a smaller memory cache, a smaller number and size of registers, with an exemplary use of 32 or 16 bits for datapath widths, integer sizes, and memory address widths, etc., for a device 103. In contrast, an exemplary 64 bit datapaths could be used for CPU 101e in server 101 (although device 103 could also use 64 bit wide datapath widths if device 103 comprises a mobile phone such as a smart phone). For embodiments where device 103 comprises a transducer device for sending and receiving transducer data with a network 105, then a CPU in device 103 could comprise an exemplary 32 bit processor, although other possibilities exist as well.

Similarly, RAM in a device 103 could be a RAM similar to RAM 101f in server 101, except the RAM in a device 103 could have fewer memory cells such as supporting exemplary values less than or equal to an exemplary 4 gigabytes, while RAM 103f in server 101 could support more memory cells such as greater than or equal to an exemplary 8 gigabytes. In exemplary embodiments, the electrical and physical components of a key server 102 can be equivalent to the electrical components for a server 101 in FIG. 1b, with different data recorded in RAM 101f for a key server 102, as well as different data recorded in memory 101h for a key server 102. For example, a key server 102 could record the network static private key sn 102b in memory 101h, which could comprise secure disk storage using disk or file encryption.

FIG. 1c

FIG. 1c is an illustration of exemplary network static public keys and server static public keys recorded by a plurality of devices, in accordance with exemplary embodiments. FIG. 1c depicts PKI keys recorded for an exemplary three different devices 103, although a system 100 and other systems herein could operate with potentially millions or more devices 103. The data depicted for each device in FIG. 1c can comprise exemplary data for a network public key table 103t for a device 103, which is also depicted and described in connection with FIG. 1a above.

The exemplary values recorded for network static public keys depicts different embodiments where both (i) a device 103 can record a network static public key Sn 102a and/or a server static public key Ss 101a that is shared with other devices 103, and (ii) the network static public key Sn 102a and/or a server static public key Ss 101a recorded by device 103 could be unique for device 103 (e.g. not shared with other devices 103 in a system 100 above or a system 200 below, as well as other systems herein). Although not depicted for a network public key table 103t, the network public key table 103t could also store or record (i) secure hash values for each public key stored, and (ii) the parameters 104a associated with the public keys.

A network public key table 103t for device 103 can record values of a key identity, a network name for network 105, an identity for server 101 comprising ID.server 101i, and also a value for the network static public key Sn 102a and also a server static public key Ss 101a. As depicted in FIG. 1c, a device 103 can record multiple different values for use with multiple different networks 105 and/or servers 101. As depicted in FIG. 1c, a device 103 can also record multiple different values for use with a single network 105, such as a primary set of PKI keys (e.g. row 1), and a backup set of PKI keys (e.g. row 2).

The first two entries for network static public keys Sn 102a for a first device 103 (1) and a second device 103 (2) in FIG. 1c (e.g. row 1 for each device 103) depicts the same alphanumeric values for basE91 binary to text encoding for an exemplary network static public keys Sn 102a-1 in a first device 103 (1) and Sn 102a-2 for a second device 103 (2), where the key value is depicted for a network 105 of "Network A". In other words, a value Sn 102a-1 and Sn 102a-2 can be equal. Likewise, the second two entries for network static public keys Sn 102a for a first device 103 (1) and a second device 103 (2) in FIG. 1c (e.g. row 2 for each device 103) depicts the same alphanumeric values for basE91 binary to text encoding for an exemplary network static public key Sn 102a in a first device 103 (1) and a second device 103 (2).

Note that although a single value is depicted for PKI keys in a network public key table 103t, the values or numbers for keys recorded could comprise a point on an ECC curve with both an X coordinate and a Y coordinate. For illustration purposes in FIG. 1c, only the X coordinate are displayed and the Y coordinate could be calculated from the X coordinate using the equation for an ECC curve in a set of cryptographic parameters 104a for the PKI keys.

The depiction of these exemplary keys Sn 102a illustrates the use of shared network public keys 102z for a plurality of different devices 103. Although only three devices are depicted with shared network public keys 102z, many more devices could also record the same shared network public keys for Sn 102a. Each of the shared network public keys 102z is associated with the same network 105, identified with an exemplary same network name "A", although row 1 and row 2 for device 103-1 and device 103-2 could be for different networks as well (e.g. "network A" for row 1 and a "network X" for row 2). In this manner, a plurality of different devices 103 can record and use the same value for a network static public key Sn 102a. As described above, the value in a table 103t including network static public key Sn 102a could be written in device before the device sends the first message 299 in FIG. 2a below. The data could be recorded by a device manufacturer, a device distributor, or a device owner, and other possibilities exist as well for the source of Sn 102a without departing from the scope of the present disclosure.

The same values for shared network public keys 102z across different devices 103 could be recorded in device 103 during manufacturing or before distribution to end users of device 103. In this manner, devices 103 could be received by end users in a "partially configured" yet secure state, such that a device 103 could use the recorded keys Sn 102a with a server 101 and/or network 105, where a server 101 does not operate or record the corresponding network static private key sn 102b.

As depicted and described in connection with FIGS. 2a, 4, etc. below, a key server 102 could record and operate with the corresponding network static private key sn 102b and thus the key sn 102b can remain secured and not distributed out or sent to a server 101. In this manner, encrypted communications for data 106 in FIG. 1a can be transferred between device 103 and server 101 without server 101 recording the key sn 102b. This increases the security of a system 100 and other systems herein, because server 101 may be exposed to an IP network 107 while key server 102 recording the sn 102b can be connected to a private network 107a. Recording key sn 102b in a separate key server 102 also increases the operational and commercial flexibility for running a network 105, such that server 101 could be controlled and operated by a first entity and key server 102 could be controlled or operated by a second entity, and other potential benefits exist as well.

The first two entries for server static public keys Ss 101a for a first device 103 (1) and a second device 103 (2) in FIG. 1c (e.g. row 1 for each device 103) depicts the same alphanumeric values for basE91 binary to text encoding for an exemplary server static public keys Ss 101a-1 in a first device 103 (1) and Ss 101a-2 for a second device 103 (2), where the key value is depicted for a network 105 of "Network A". In other words, a value Ss 101a-1 and Ss 101a-2 can be equal. However, the third two entries for server static public keys Ss 101a-1 for a first device 103 (1) and a second device 103 (2) in FIG. 1c (e.g. row 3 for each device 103) depicts different alphanumeric values for basE91 binary to text encoding for an exemplary server static public key Ss 101a in a first device 103 (1) and a second device 103 (2). Thus, a first server static public key Ss 101a for device 103-1 and device 103-2 can comprise the same number or key (e.g. "shared server public keys" 101z) and a different set of server static public keys Ss 101a for device 103-1 and device 103-2 can comprise different values (e.g. unique server public keys 101v).

The depiction of the first row for Ss 101a for device 103-1 and device 103-2 illustrates the use of shared server public keys 101z for a plurality of different devices 103. Although only two devices are depicted with shared server public keys 101z, many more devices could also record the same shared keys for Ss 101a. Each of the shared keys 101z is associated with the same server 101 (or group of servers sharing key ss 101b) within a network 105, identified with an exemplary same network name "A". In this manner, a plurality of different devices 103 can record and use the same value for a server static public key Ss 101a. As described above, the value in a table 103t for server static public key Ss 101a could be written in device before the device sends the first message 299 in FIG. 2a below. The data could be recorded by a device manufacturer, a device distributor, or a device owner, and other possibilities exist as well for the source of Ss 101a without departing from the scope of the present disclosure.

The same values for shared server public keys 101z across different devices 103 could be recorded in device 103 during manufacturing or before distribution to end users of device 103. In this manner, devices 103 could be received by end users in a "partially configured" yet secure state, such that a device 103 could use the recorded keys Ss 101a with a server 101 and/or network 105, where a at least one server 101 operates or records the corresponding server static private key ss 101b. Note that in some exemplary embodiments, such as those depicted and described in connection with FIG. 4 below, then server static private key ss 101b can also be recorded by a second key server 102, such that server 101 does not operate or record server static private key ss 101b which corresponds to a server static public key Ss 101a recorded by at least one device 103.

By using a set of shared keys 102z or shared keys 101z or across a plurality of devices 103, a key server 102, server 101, or a network 105 can control access of the devices 103 as a group. For example, a network 105 could deny transactions requiring access to the private key corresponding to the public key for the first depicted value of Sn 102a in a first device 103 (1). That action by network 105 would also deny a second device 103 (2) transactions requiring access to the private key corresponding to the public key for the first depicted value of Sn 102a in the second device 103 (2). In this manner, network 105 could control access to a plurality of different devices 103 by controlling access to a single value of sn 102b, where (i) the plurality of different devices 103 record the corresponding Sn 102a as shared keys 102z. Or, key server 102 could deny access to transactions requiring network static private key sn 102b to server 101 or a collection of servers 101 (where Ss 101a is associated with Sn 102a in a set of devices 103).

Other benefits for using shared keys 102z or shared keys 101z can be available as well, such as simplifying manufacturing or distribution, since the same key value for Sn 102a or Ss 101a could be recorded with multiple different devices 103. In other words, a device manufacturer or device distributor would not need to keep track of which values for Sn 102a or Ss 101a belongs with which device 103 for embodiments where shared keys 102z or 101z are utilized. However, the use of shared keys 102z or 101z for multiple different devices 103 is not required for some exemplary embodiments.

In exemplary embodiments, network static public keys Sn 102a can also comprise a unique key for each device 103 in a system 100 and other systems herein. Thus, some exemplary embodiments also support the use of a network static public key Sn 102a that is not shared across multiple different devices 103. For these exemplary embodiments, and as depicted in FIG. 1c, a device 103 can record a unique key 102v (depicted as "Unique Network Static Public Key" 102v in FIG. 1c). For example, the depicted value for the third key Sn 102a for device 103 (1), (2), and (3) in FIG. 1c is shown as unique for each device. A key server 102 could also record the corresponding network static private key sn 102b that is unique for each device in a key server database 102d as depicted for unique keys 102v in FIG. 1a. In this manner, a network 105 can control access to server 101 and/or network 105 on a per-device basis using the unique key 102v.

In exemplary embodiments where devices 103 record unique keys 102v for network static public keys Sn 102a, key server 102 could deny access to device 103 (3) (while continuing to allow service for device 103 (1) and 103 (2)), by denying access or cryptographic operations with the secret key sn 102b in a key server 102 corresponding to the public key Sn 102a recorded by device 103 (3). Other benefits for recording network static public keys Sn 102a as unique keys 102v for devices 103 exist as well without departing from the scope of the present disclosure, such as increased security.

If (a) a single network static secret key sn 102b is compromised, then (b) communication with the device recording the corresponding public key Sn 102a could be compromised, while (c) devices recording other, different values for network static public key Sn 102a would not be compromised. Cryptographic analysis or leakage of information pertaining to network static secret keys sn 102b, such as via side channel attacks, timing attacks, malformed ephemeral public keys, etc., risk the compromise of a single key for a single device (when using unique keys 102v), which has less impact than compromise of a network static secret key sn 102b supporting shared keys 102z across a plurality of devices 103.

In exemplary embodiments, server static public keys Ss 101a can also comprise a unique key for each device 103 in a system 100 and other systems herein. Thus, some exemplary embodiments also support the use of a server static public key Ss 101a that is not shared across multiple different devices 103. For these exemplary embodiments, and as depicted in FIG. 1c, a device 103 can record a unique key 101v (depicted as "Unique Server Static Public Key" 101v in FIG. 1c). For example, the depicted value for the third key Ss 101a for device 103 (1), (2), and (3) in FIG. 1c is shown as unique for each device. A server 101 or key server 102x (e.g. FIG. 4) could also record the corresponding server static private key ss 101b that is unique for each device in a server database 101d or key server database 102d'. In this manner, a network 105 can control access to server 101 and/or network 105 on a per-device basis using the unique key 101v. For example, server 101 could deny access to device 103 (3) (while continuing to allow service for device 103 (1) and 103 (2)), by denying access or cryptographic operations requiring the secret key ss 101b in a server 101 corresponding to the public key Ss 101a recorded by device 103 (3).

Other benefits for recording server static public keys Ss 101a as unique keys 101v for devices 103 exist as well without departing from the scope of the present disclosure, such as increased security. If (a) a single server static secret key ss 101b is compromised, then (b) communication with the device recording the corresponding public key Ss 101a could be compromised, while (c) devices recording other, different values for server static public key Ss 101a would not be compromised. Cryptographic analysis or leakage of information pertaining to server static secret keys ss 101b, such as via side channel attacks, timing attacks, malformed ephemeral public keys, etc., risk the compromise of a single key for a single device (when using unique keys 101v), which has less impact than compromise of a server static secret key ss 101b supporting share keys 101z across a plurality of devices 103. The use of unique keys 101v and/or unique keys 102v supports the revocation or deprecation of a server PKI key pair (101a/101b) and/or network PKI pair (102a/102b), respectively, and thus can increase the security and flexibility of a system 100, system 200, and other systems herein.

FIG. 2a

FIG. 2a is a simplified message flow diagram illustrating an exemplary system with exemplary data sent and received by a device, a server, and a key server, in accordance with exemplary embodiments. System 200 can include a device 103, server 101, and a key server 102. Device 103 was depicted and described in connection with FIG. 1a and FIG. 1c above. Server 101 and key server 102 were depicted and described in connection with FIG. 1a above, and server 101 was depicted and described in connection with FIG. 1b above. Server 101 can record and operate a server database 101d, and key server 102 can record and operate a database 102d.

Individual steps and components used in system 200 in FIG. 2a are also additionally depicted and described in subsequent FIGS. 2b, 2c, and 2d, etc. Before starting the steps and message flows depicted in FIG. 2a, device 103 can securely receive and record a network public key Sn 102a and a server static public key Ss 101a, which was also depicted and described in connection with FIG. 1a and FIG. 1c. The corresponding private key for Sn 102a can be securely recorded in key server 102 within network 105 as sn 102b. The corresponding private key for Ss 101a can be securely recorded in (i) server 101 within network 105 as ss 101b for the embodiment depicted in FIG. 2a, or (ii) a second key server 102x for the embodiment as depicted in FIG. 4 below.

For system 200, server 101 and key server 102 may establish a secure session 201a, which could comprise establishing a secure communications link between the two servers using protocols such as TLS, IPSec, a virtual private network (VPN), a secure shell (SSH), or similar networking, transport, or application layer technologies in order to establish secure communications between key server 102 and server 101. Secure session 201a can utilize certificates for the two servers in order to provide mutual authentication and mutual key derivation for a symmetric encryption key in secure session 201a. Secure session 201a can also be conducted over private network 107a, although the secure session 201a could also be established or conducted through an IP network 107 such as the globally routable Public Internet. Other possibilities exist as well for establishing a secure session 201a between server 101 and key server 102 without departing from the scope of the present disclosure.

Although not depicted in FIG. 2a, firewalls between server 101 and key server 102 could also be utilized in order to establish or conduct secure session 201a. At step 201b, server 101 can begin listening for incoming messages from a device 103 using a physical network interface that provides connectivity to the IP network 107 and server 101 can use a specific port number such as TCP port 443 to listen for incoming data 106 from a device 103.

At step 201c, device 103 can be "pre-configured" with operating data such as an operating system similar to OS 101g in FIG. 1b (but for device 103), a set of cryptographic algorithms 104 or a subset of cryptographic algorithms 104a, a DNS name for network 105 or server 101, and at least one for each of a device static private key sd 103d, a network static public key Sn 102a, and a server static public key Ss 101a. At a step 201c, a plurality of different keys for at least one network 105 could be recorded in a network public key table 103t as depicted in FIG. 1b. Other configuration data for device 103 could be recorded in a step 201c as well, such as timers, drivers for transducers, user information, etc. A step 201c could be performed by a device manufacturer, a device distributor, or a device owner, and other possibilities exist as well without departing from the scope of the present disclosure. A step 201c could be performed in parts, such that a first part is conducted by a device manufacturer, a second part conducted by a device owner, etc.

At step 202, device 103 can be powered on and begin operating, in order to establish connectivity with an IP network 107. At step 202, device 103 can read an address for server 101 from memory or a network public key table 103t, and the address can comprise a DNS name or an IP address for server 101, and can also comprise a server identity 101i. The DNS name or IP address for server 101 could be recorded or received along with the key Ss 102a, or device 103 could conduct a DNS query to obtain the address. As step 202, device 103 can also collect data from transducers to send to a network 105, and the data from transducers could comprise data 202b. Other data besides transducer data could be included in data 202b, such as a device identity ID.device 103i, registration information for device 103 with network 105, and other data as well. Device 103 can also read a device static secret key sd 103d recorded in nonvolatile memory in a step 202.

At step 202, device 103 can also read the set of cryptographic parameters 104 and select a subset of the cryptographic parameters 104a in order to establish communications with server 101. An exemplary subset of cryptographic parameters 104a in a step 202 can comprise a member of the set the cryptographic parameters 104 depicted and described in connection with FIG. 3 below (e.g. one line of values in cryptographic parameters 104 in FIG. 2d below). In step 202, device 103 can select a subset of cryptographic parameters 104a that is compatible with all of device static secret key sd 103d and network static public key 102a and server static public key 101a. The subset of cryptographic parameters 104a that are compatible with network public keys could also be recorded in nonvolatile memory in device 103 along with network public keys 102a and 101a at the time the network public keys were recorded or received by device 103, which could include during a step 201c above.

A step 203 can also comprise device 103 also using a random number generator in order to output a random number 203a for use in subsequent communications with server 101. Although the term "random number" is described herein, a random number could comprise a pseudo random number processed by device 103 using information entropy available to device 103. In exemplary embodiments, a device 103 can use data from transducers in order to obtain information entropy and generate random numbers in a step 203. The random number 203a processed in a step 203 could contain the number of bits specified by a selected subset of cryptographic parameters 104 from a step 202. Random number 203a generated or derived by a device 103 in a step 203 could also comprise a "number used once" (nonce).

Device 103 can then conduct a key pair generation step 103x as depicted and described in connection with FIG. 1a above using the selected subset of cryptographic parameters 104a. The parameters 104 could specify a named curve and parameters to derive a device ephemeral private key ed 103b and a device ephemeral public key Ed 103a. The device ephemeral private key ed 103b can comprise a random number generated using a random number generator, including a second random number generated in a step 203 above. The device ephemeral public key Ed 103a could be derived using (i) ECC point multiplication from a base point G for a named curve within cryptographic parameters 104a and (ii) the device ephemeral private key ed 103b. Other possibilities exist as well for the steps a device 103 can use in a key pair generation step 103x without departing from the scope of the present disclosure.

Device 103 can then conduct a step 204 to calculate a value for use with an ECDH key exchange algorithm 207, where the calculation of the value for a step 204 is depicted and described in connection with a step 204 in FIG. 2c below. In summary, device 103 can calculate the sum of device static private key sd 103d and the derived device ephemeral private key ed 103b, and then calculate the modulus of the sum using the value n, where the value n can be defined or determined based upon the selected set of cryptographic parameters 104a. As contemplated herein a "secret key" for use with a PKI key pair can also be referred to as a "private key". As one exemplary embodiment, when using the named elliptic curve secp128r1, the value of n can comprise the decimal number:

340282366762482138443322565580356624661

Device 103 can then conduct a step 205 to perform an ECC point addition operation on the server static public key Ss 101a and the network static public key Sn 102a in order to obtain a point on the elliptic curve defined by the selected subset of cryptographic parameters 104a. The calculation for a step 205 is depicted and described in connection with a step 205 in FIG. 2c below. Device 103 can then conduct an ECDH key exchange step 206 using the value from a step 204 and a point from step 205 in order to calculate a symmetric ciphering key K1 206a. The calculation of a symmetric ciphering key K1 206a using a key exchange step 206 is depicted and described in connection with FIG. 2c below. Note that a MAC key 206b can also be calculated using a key exchange step 206 as well by device 103. Device 103 can then conduct an encryption step 209 using (i) the symmetric ciphering key 206a and (ii) data to encrypt comprising the data 202b and the random number 203a. The use of an encryption step 209 by device 103 is depicted and described in connection with FIG. 2c below. The output of an encryption step 209 can comprise ciphertext 209b.

Device 103 can then use (i) the recorded address for server 101 (possibly from a table 103t) and (ii) connectivity to IP network 107 from step 202 to send a message 299 to server 101. Message 299 and other messages contemplated herein can be sent as either TCP or UDP messages, and other possibilities exist as well for the formatting and transfer of messages without departing from the scope of the present disclosure. In exemplary embodiments, device 103 both uses an IP address and port number to send message 299 to server 101 and then also the same IP address and port number to listen for responses or messages from server 101. In this manner, device 103 can send a message 299 and receive a response message 225 below through an IP network 107, where intermediate nodes on the IP network 107 may conduct network address translation (NAT) routing.

In exemplary embodiments, message 299 from device 103 can include ciphertext 209b and the device ephemeral public key Ed 103a. Although not depicted in FIG. 2a, message 299 can also include the selected subset of cryptographic parameters 104a associated with key Ed 103a (and also related keys such as keys 101a, 102a, 103c, and 103d). Message 299 may also include identity information for device 103 or PKI keys recorded by device 103, which could comprise any of (i) a device identity of ID.device 103i as plaintext, (ii) an obfuscated device identity comprising ID.device-obfuscated 103o, or (iii) a secure hash value over device static public key Sd 101d, which could be H(Sd) 250. Message 299 could be with different information for network 105 and/or server 101 to identify device 103 or process message 299, and different embodiments for message 299 are depicted and described in connection with FIG. 2b below. The selection of identifying information for device 103 to use with message 299 could be written to device during a step 201c above.

In a message 299, device identity of ID.device 103i can be omitted from plaintext in a message 299, and rather device identity of ID.device 103i could be included within the ciphertext 209b. For embodiments where message 299 optionally excluded device identity ID.device 103i in plaintext, then an identity for device 103i can optionally be transmitted in later messages. Omitting ID.device 103i as plaintext from message 299 can increase security for message 299 since an identity for device 103 would not be sent as plaintext in a message 299. Or, the obfuscated identity for device 103i comprising ID.device-obfuscated 103o could be sent as plaintext in message 299 instead of ID.device 103i. The use of an obfuscated identity of ID-device-obfuscated 103o by a server 101 to map to an ID.device 103i is depicted and described in connection with FIG. 2f below. An obfuscated identity for device 103i comprising ID.device-obfuscated 103o could be an apparently random string or number that is uniquely associated with device 103, and the obfuscated identity 103o for device 103 could periodically rotate or change over time.

Although not depicted in FIG. 2a, message 299 could also optionally include an identity for key server 102 comprising ID.key-server 102i, such that server 101 can determine which key server 102i should be associated with message 299. Note that an identity for key server 102 of ID.key-server 102i can be omitted from a message 299, and server 101 can select a key server 102 from other means in a step 212 below.

As depicted in FIG. 2a, message 299 could also optionally include a secure hash value 250 such as, but not limited to, SHA-256 of the device static public key Sd 103c. Device 103 can send the hash value 250 of key 103c to server 101, in order for server 101 to identify both (i) which device static public key Sd 103c server 101 should utilize for subsequent operations (such as steps 216 and 218 below) and (ii) which of a plurality of possible key servers 102 could be used to process data within message 299, which is further described for a server 101 below.

For embodiments where a secure hash value 250 of key 103c is included in a message 299 (or other identifying information for device 103 such as ID.device 103i or ID.device-obfuscated 103o), then the message 299 could optionally exclude the selected subset of cryptographic parameters 104a. Server 101 receiving the message 299 with the hash value 250 (or device identity information) could determine the set of parameters 104a to use for key Ed 103a based on the hash value 250 (or device identity information) and a server database 101d. Server 101 can use device identity information in a message 299 to select the set of cryptographic parameters 104a from a server database 103 in order to obtain the set of cryptographic parameters 104a to process message 299.

As one exemplary embodiment, and as depicted in FIG. 2f below, a server database 101d could maintain mapping of hash values 250 and parameters 104a, and server 101 could conduct a query of database 101d using the received hash value 250 in order to select the parameters 104a for further processing and cryptographic operations with key Ed 103a. Or, in an exemplary embodiment cryptographic parameters 104a as transmitted via an IP network 107 or private network 107a could include the secure hash 250 of key 103c, where the secure hash 250 of key 103c can specify which subset of a set of cryptographic parameters 104 to utilize for subsequent ECC cryptographic operations.

Although not depicted in FIG. 2a, but depicted for a message 299a in FIG. 2b below, a message 299 could also include the selected set of cryptographic parameters 104a.

Server 101 can receive message 299 and begin conducting steps in order to process the message. At step 210a, server 101 can determine the subset of cryptographic parameters 104a to use with received device ephemeral public key Ed 103a. Parameters 104a could be determined in a step 210a in several different ways. If parameters 104a are included in message 299, then parameters 104a could be read from message 299. Or, server 101 could use identifying information for device 103 from message 299 in order to select parameters 104a, such as any of (i) ID.device 103i, (ii) ID.device-obfuscated 103o, or (iii) a secure hash value for a public key unique to device 103 such as H(Sd) 250.

Note that for embodiments where device 103 uses a unique key 101v or a unique key 102v, then the hash value for the unique key could be sent in message 299, and server 101 could query a server database 101d in order to look up the cryptographic parameters 104a (and PKI public keys for device 103) associated with the hash value of the unique key 101v or unique key 102v. In another exemplary embodiment, a server 101 with a server DNS name or listening to a server IP:port number could use a selected subset of cryptographic parameters 104a, and the receipt of a key Ed 103a in a message 299 could specify the use of parameters 104a with the received key Ed 103a.

At step 210b, server 101 can conduct a public key validation step on received device ephemeral public key Ed 103a in order to ensure the key is valid and on the selected curve in parameters 104a. Step 210b by server 101 can comprise conducting the steps for an ECC Full Public-Key Validation Routine in section 5.6.2.3.2 of FIPS publication SP 800-56A (revision 2) for the received device ephemeral public key Ed 103a. Alternatively, step 210b can comprise server 101 performing the steps ECC Partial Public-Key Validation Routine in section 5.6.2.3.3 of the same FIPS publication.

Other example steps within a public key validation step 210b can comprise (i) verifying the public key is not at the "point of infinity", and (ii) verifying the coordinates of the point for the public key are in the range [0, p−1], where p is the prime defining the finite field. Other possibilities exist as well for evaluating and validating a received public key is cryptographically secure in a public key validation step 210b, without departing from the scope of the present disclosure.

In exemplary embodiments, a public key validation step 210b can include verifying that a point or public key received in a message such as message 299 is not reused, and in this manner a step 210b can be used to reject messages 299 that could comprise a "replay attack". Server 101 could record in a server database 101d a list of received device ephemeral public keys Ed 103a for an extended period of time, and if any key Ed 103a is reused then message 299 could be rejected. The period of time could be suitable for the application used by device 103 and server 101, including potentially a period of years. As contemplated in the present disclosure a device 103, server 101, and key server 102 can conduct a public key validation step 210b each time a public key or a point on an elliptic curve is received.

At step 211 and after a key validation step 210b, server 101 can query a server database 101d using identifying information for device 101 from message 299 in order to select a device static public key Sd 103c. As mentioned above, message 299 can include identifying information for device 103, such as, but not limited to (i) device identity ID.device 103*i*, (ii) obfuscated device identity ID.device-obfuscated 103*o*, or (iii) a secure hash value over the device static public key comprising H(Sd) 250. Server database 101*d* can record the depicted information for device 103, as well as other information required for conducting the steps contemplated herein, before server 101 receives message 299.

The data for device 103 in a server database 101*d* could be received from any of a device manufacturer, a device distributor, or a device owner, and other possibilities exist as well. In exemplary embodiments, a step 201*b* could include a device registration process, where the data for a device 103 in a server database 101*d* could be recorded in a secure and authenticated manner. Exemplary values and data for a server database 101*d* recording data for a plurality of devices 103 are depicted and described in connection with FIG. 2*f* below. At step 211, server 101 can record in server database 101*d* the values device ephemeral public key Ed 103*a*, and other data received in a message 299, including information to identity device 103.

At step 211, server 101 can also record the originating source IP address and port number 299*p* (depicted in FIG. 2*f* below) for message 299, in order to subsequently transmit a message 225 below back to the same IP address and port number 299*p*. In this manner, message 225 below can be routed by intermediate nodes on IP network 107 back to the source IP address and port number used by device 103 to transmit message 299. In other words, (i) the destination IP address and port number of a subsequent message 225 from server 101 to device 103 can comprise the source IP address and port number 299*p* (depicted in FIG. 2*f* below) received in message 299, and (ii) the source IP address and port number 299*p* (depicted in FIG. 2*d* below) from message 299 can be recorded in a server database 101*d*. In this manner, communications with device 103 can be tracked or identified by server 101 during the brief period of time of the message flows in FIG. 2*a* using the source IP address and port number from message 299. A step 211 can also comprise server 101 generating a random number 211*a* using parameters 104*a* (e.g. using random length 104*g* from FIG. 3 below) for use in subsequent messages with device 103.

At step 212, server 101 can use identifying information in message 299 for device 103 to select a server static private key ss 101*b* from a server database 101*d*, which can correspond to the server static public key Ss 101*a* recorded and used by device 103. For embodiments where server 101 does not record or operate with server static private key ss 101*b*, such as embodiments depicted and described in connection with FIG. 4 below, then a step 212 by server 101 could comprise server 101 selecting (a) a key server 102*x* that records or operates with server static private key ss 101*b* using (b) identifying information for device 103 in message 299. At step 212, server 101 can also select key server 102 for subsequent communications and processing of the received device ephemeral public key Ed 103*a*.

Note that a system 100 could comprise both a plurality of devices 103 and a plurality of key servers 102. In exemplary embodiments server 101 could select in step 212 the proper key server 102 for conducting subsequent steps in FIG. 2*a*. In other words, without data or values from a message 299, server 101 may know which of a possible plurality of key server 102 may record the network static private key sn 102*b* for use with or associated with device ephemeral public key Ed 103*a*. Server 101 could use one of several possible methods for selecting key server 102 in a step 212, including a combination of the following embodiments.

A first embodiment for selecting key server 102 in a step 212 could comprise server 101 selecting the same key server 102 for all keys Ed 103*a* from all devices 103. For example, for this first method, server 101 could listen or operate on (i) a specific IP address and port number or (ii) with a specific DNS name or URL in step 201*b*, where the use if (i) or (ii) could be specified or associated with network static public key Sn 102*a*. As mentioned above for a step 203, device 103 can select the address of server 101 using the server address or name of server 101 recorded with Sn 102*a* (possibly from a table 103*t* in FIG. 1*c*). Server 101 could determine that all messages 299 received using (i) or (ii) are associated with a specific key server 102, where the key server 102 records the network static private key sn 102*b* corresponding to the network static public key Sn 102*a* recorded by the device 103.

A second embodiment of a step 212 for selecting key server 102 of received message 299 could comprise using an identity of key server 102 in a message 299 from device 103. As described above for a message 299, the message 299 can optionally include an identity for key server 102 comprising ID.key-server 102*i*. For these embodiments, server 101 can select the key server 102 using the ID.key-server 102*i* in message 299. A third embodiment for a step 212 of selecting key server 102 for received device ephemeral public key Ed 103*a* could comprise using an identity of device 103 in a message 299 comprising (i) ID.device 103*i*, (ii) ID.device-obfuscated 101*o*, or (iii) a secure hash value H(Sd) 250.

A secure hash value over a unique key 102*v* or unique key 101*v* could be used as well to determine a key server 102, where a server database 101*d* could include tables that map the unique secure hash value to a key server 102. As described above for a message 299, the message 299 can optionally include unique identifying information for device 103, and server 101 using database 101*d* could include a table to map any of (i), (ii), and (iii) in this paragraph to key server 102. For this third embodiment of a step 212, server 101 could conduct a query of server database 101*d* to select the key server 102 for device 103 using ID.device 103*i*.

A fourth embodiment for a step 212 to select a key server 102 for received message 299 could comprise using the subset of cryptographic parameters 104*a* from a step 210*a*. Server 101 could record that a first subset of cryptographic parameters 104*a* are associated with a first key server 102, and a second subset of cryptographic parameters 104*a* are associated with a second key server 102, etc. Other possibilities exist as well for server 101 to conduct a step 212 to select a key server 102 using data in a message 299 without departing from the scope of the present disclosure. For embodiments depicted and described in connection with FIG. 4 below, where a second key server 102*x* also records server static private key ss 101*b*, then server 101 could use a step 212 as well for selecting the second key server 102*x* in order to obtain point X2 218*a* (as depicted and described in FIG. 4*a*).

After selecting key server 102 in a step 212, server 101 can then conduct an EC point addition step 213. ECC point addition 213 can use (i) the recorded device static public key Sd 103*c* selected by server 101 in a step 211 and (ii) the received device ephemeral public key Ed 103*a* from a message 299. The output from an ECC point addition step 213 can comprise a point X0 213*a*. Exemplary details for conducting an ECC point addition step 213 are depicted and described for a server 101 in FIG. 2*d* below.

Server 101 can then send key server 102 a message 214 through the secure session 201*a*. Message 214 can include an identity for server 101 comprising ID.server 101*i*, the point X0 213*a* from a step 213 above, a device identity 103*i*, and the subset of cryptographic parameters 104*a*. Note that although the use of a step 213 and point X0 213*a* are depicted in FIG. 2*a*, a message 214 could include separately both (i) the received device ephemeral public key Ed 103*a* and (ii) the device static public key Sd 103*c*, and in this embodiment point X0 213*a* could be omitted from a message 214. The use of a point X0 213*a* for a message 214 may be preferred for some embodiments, since it would provide additional security by not exposing key server 102 to the separate values for keys 103*a* and 103*c*.

For embodiments where device 103 records network static public key Sn 102*a* as shared keys 102*z*, then a device identity 103*i* in message 214 could be omitted, and key server 102 could use the same network static private key sn 102*b* for multiple communications representing multiple devices 103 with server 101. In other words, key server 102 could use the server 101 identity 101*i* in a message 214 for some embodiments to determine the proper server static private key sn 102*b* for conducting subsequent steps, where server identity 101*i* is associated with shared keys 102*z* as depicted in FIG. 1*c*.

For embodiments depicted in FIG. 1*c* where a device 103 records and operates with a unique key 102*v*, then a message 214 can preferably include identification information for device 103 such as device identity ID.device 103*i* in order for key server 102 to select the appropriate network static private key sn 102*b* from database 102*d* for subsequent calculations. With use of either (i) unique keys 102*v* or (ii) shared keys 102*z*, messages 299 and 214 could include a secure hash value over the network static public key Sn 102*a*. Key server 102 could select the key sn 102*b* based on the secure hash value of the corresponding public key (e.g. H(Sn 102*a*)). Or, messages 299 and 214 could include the network static public key Sn 102*a* used by device 103. Server identity ID.server 103*i* also can be useful for communications between key server 102 and server 101 for a system 100 and system 200 and other systems herein, since either (i) server 101 may communicate with a plurality of different key servers 102, and/or (ii) key server 102 may communicate with a plurality of different servers 101.

Key server 102 can receive the message 214 via the secure session 201*a* and conduct a series of steps to process the message and respond. A first step conducted by key server 102 can comprise a key validation step 210*b*, where the key validation step 210*b* conducted by key server 102 can be equivalent or compatible with the key validation step 210*b* conducted by a server 101 as described above. Key server 102 could use the set of cryptographic parameters 104*a* in message 214 in order to conduct a key validation step 210*b*.

For a key validation step 210*b*, a node can reply with a failure or reject message if the key validation step 210*a* fails, such as if a received ECC public key fails to fall on the named elliptic curve. As mentioned above for a step 210*b* for server 101, a key validation step 201*b* for key server 102 could be conducted to verify that point X0 213*a* is not reused, in order to deny replay attacks. Key server 102 could record all values X0 213*a* received in a key server database 102*d* for an extended period of time, which could comprise years, and reuse of a value X0 213*a* could be rejected. Or, in other exemplary embodiments, the verification that value or point X0 213*a* is not reused could be omitted by key server 102 in a step 210*b*, and key server 102 could rely on server 101 to deny replay attacks. Or, in other exemplary embodiments, a server 101 could omit the verification that key Ed 103*a* is not reused, and server 101 could rely on key server 102 verifying that point X0 213*a* is not reused.

Key server 102 can then conduct a step 215 in order to select a network static private key sn 102*b* to use with the received point X0 213*a* from message 214. For a step 215, key server 102 could use (i) device identity 103*i* received in message 214 to query a key server database 102*d* to select key sn 102*b* associated with device identity 103*i*, or (ii) other identification information for device 103 from a message 299. The other identification information can include a secure hash value over a public key recorded by device 103 or a public key recorded by device 103.

As depicted in FIG. 1*a*, a key server database 102*d* could record a plurality of different network static private keys sn 102*b* for use with different devices 103. Or, a step 215 could use other data from a message 214 to select key sn 102*b*, such as parameters 104*a* or server identity 101*i*. In an exemplary embodiment, multiple different devices could record network static public key Sn 102*a* as shared keys 102*a*, where the shared keys 102*z* are associated with a particular set of cryptographic parameters 104*a* (such as a particular named ECC curve 104*c*). Key server 102 could select a key sn 102*b* to use with the shared keys 102*z* based on the parameters 104*a* from message 214. Other possibilities exist as well for key server 102 to conduct a step 215 to select a network static private key sn 102*b* using data from a message 214 without departing from the scope of the present disclosure.

Key server 102 can then conduct an ECDH key exchange step 216 using (i) the selected network static private key sn 102*b* and (ii) the received point X0 213*a* from message 214. Or, for some embodiments the values of device ephemeral public key Ed 103*a* and device static public key Sd 103*c* could be received separately (and not as one point X0 213) in message 214. Exemplary details for an ECDH key exchange step 216 are depicted and described in connection with FIG. 2*d* below. The output of an ECDH key exchange step 216 can comprise point X1 216*a*.

For embodiments where message 214 includes either (i) an identity for device 103 such as ID.device 103*i*, or (ii) identifying information for sn 102*b* for key server 102 to utilize (such as a secure hash over Sn 102*a*, where Sn 102*a* comprises a unique key 101*v*), then key server 102 could use the identifying information in message 214 to select the network static private key sn 102*b* from a key server database 102*d* for ECHD key exchange step 216, where a key server database 102*d* is depicted in FIG. 1*a* above.

Key server 102 can then send server 101 a message 217, where the message 217 includes point X1 216*a* from step 216 above, as well as an identity for key server 102 comprising ID.key-server 102*i* and cryptographic parameters 104*a* associated with point X1 216*a*. Message 217 can be transmitted through secure session 201*a*. If device identity 103*i* or other identifying information such as a secure hash value over a unique key 102*v* was included in message 214, then message 217 could also include device identity 103*i* or the other identifying information for a device 103. Or, both message 214 and message 217 can include a transaction identity or session identity, such that server 101 can associate the received value X1 216*a* with a received device ephemeral public key Ed 103*a* and associated device 103.

Server 101 can receive message 217 with point X1 216*a* and conduct a series of steps in order to derive a mutually shared and authenticated key exchange with device 103. As contemplated herein, the authentication performed between server 101 and device 103 can comprise a "two-way" authentication or mutual authentication between the nodes. Authentication of server 101 or network 105 with device 103 can be provided by a key exchange, since network 105 from system 100 with both server 101 and key server 102 conducts an ECDH key exchange using at least, in part, the network static private key sn 102b, the server static private key ss 101b, and device static public key Sd 103c. Authentication of device 103 with server 101 or network 105 can be provided by the equivalent key exchange conducted by device 103, since device 103 conducts an ECDH key exchange using at least, in part, the device static private key sd 103d.

The "two-way" authentication or mutual authentication from the ECDH key exchange is also not completed until both sides have successfully used a symmetric ciphering key derived from the ECDH key exchange by each side. In other words, a device 103 that successfully mutually derives a symmetric ciphering key with a server 101 can authenticate that server 101 has access to the network static private key sn 102b and the server static private key ss 101b. A server 101 that successfully mutually derives a symmetric ciphering key with device 103 can authenticate that device 103 records or operates with device static private key sd 103d.

One benefit of the system depicted in FIG. 2a is that the network static private key sn 102b does not need to be recorded by or operated with server 101. Another benefit is that mutual authentication is derived with forward secrecy, since the symmetric ciphering key is derived with an ephemeral key. A third benefit is that mutual authentication is provided without requiring the use of additional, significant cryptographic steps for a complete PKI-based ECDSA scheme, where a certificate may need to be authenticated to a root certificate or certificate authority public key by a device, and the multiple layers of authentication can require significant processing time, such as an exemplary 10 seconds for a device with a constrained processing resources such as 16 bits data widths running at 50 MHz, while the ECDH key exchanges contemplated herein could require less than 1 second for the same processor.

After receiving message 217, server 101 can conduct a point validation step 210c for received value or point X1 216a. Note that point validation step 210c is related to a key validation step 210b and can use several of the same sub-steps depicted and described for a key validation step 210b for server 101 above. A point validation step 210c is different than a key validation step 210b since (i) the value X1 216a is preferably not used as a public key to be shared with other parties outside network 105 from FIG. 1a, but rather (ii) represents a point on the ECC curve from parameters 104a that will subsequently undergo a point addition operation in order to mutually derive a shared secret with device 103.

Further, point X1 216a can be received through a secure session 201a with a trusted party comprising key server 102, and thus the point X1 216a can have a higher level of confidence or trust as being correct and properly formatted than a device ephemeral public key Ed 103a received potentially via the Public Internet. A point validation step 210c for server 101 can comprise verifying that received point X1 211a is on the ECC curve as specified in parameters 104a and that the point is not the "point at infinity". Other possibilities exist as well for conducting a point validation step 210c on the received point X1 216a without departing from the scope of the present disclosure.

After conducting a point validation step 210c, server 101 can then conduct an ECDH key exchange step 218, where a key exchange step 218 is depicted and described in connection with FIG. 2d below. In summary, server 101 can input (i) the point X0 213a from a step 213 in FIG. 2d and (ii) the server static private key ss 101b into an ECDH key exchange algorithm 207 (in FIG. 2d) in order to calculate a point X2 218a. Server 101 can then conduct a key derivation step 219 as depicted and described in connection with FIG. 2d below. In summary, server 101 can conduct an EC point addition step 220 (in FIG. 2d) using both (i) point X1 216a from message 217 from key server 102 and (ii) point X2 218a from step 218 in order to mutually derive a shared secret X3 207a. Shared secret X3 207a can be input into a key derivation function in order to output a symmetric ciphering key K1 206a and also optionally a MAC key.

Server 101 can then conduct a decryption step 221 (i) using the key K1 206a output from key derivation step 219 in order to (ii) convert ciphertext 209b from message 299 into plaintext. Exemplary details for a decryption step 221 for server 101 are depicted and described in connection with FIG. 2e below. Server 101 can then record, operate with, and store data read from the decrypted plaintext in message 299. The decrypted plaintext data could include the random number 203a generated by device 103 in a step 203, and device data 202b, which could include transducer data or other data for device 103. In exemplary embodiments, device data 202b can include device identity 103i and device identity 103i is not transmitted as plaintext in message 299 (but other identifying information could be sent in message 299 such as a hash value for a unique key 101v or 102v, or an obfuscated device identity 103o, etc.). In exemplary embodiments, server 101 stores the plaintext random number 203a in a server database 101d, along with the device identity 101i, as depicted for server database 101d in FIG. 2f below.

Server 101 can then conduct a step 222 to create a response 222a. Response 222a could be processed or determined by server 101 applying programmatic steps to plaintext device data 202b from a step 221 above. Response 222a could be an "OK" message that the data from device 103 in message 299 has been properly processed. Response 222a could be an instruction or command for device 103 to take particular actions, such as operating an actuator, taking a sensor measurement, requesting user input for device 103, etc.

Server 101 can then conduct an encryption step 223 in order to create a ciphertext2 223b for transmission of data back to device 103. Exemplary details for an encryption step 223 are depicted and described in connection with FIG. 2e below, and an encryption step 223 can use a symmetric ciphering algorithm. The symmetric ciphering algorithm and encryption key for a step 223 can comprise the same or equivalent symmetric ciphering algorithm and encryption key used for a decryption step 221 above. Note that the symmetric ciphering key K1 206a can comprise two portions, where a first portion is used by server 101 to decrypt ciphertext1 209b and a second portion is used by server 101 to encrypt ciphertext2 223b.

The plaintext within ciphertext2 223b can comprise at least, in part, the random number 203a and random number 211a. Other data could be included in plaintext for ciphertext2 223b such as, but not limited to the response 222a from a step 222 above as well as parameters 104a, without departing from the scope of the present disclosure. As depicted in FIG. 2a, the collection of steps beginning with step 201a through step 222 can comprise a step 224. A step 224 is depicted in other figures below as a condensed or consolidated summary of the individual steps.

Server 101 can then send device 103 a message 225, where the destination IP address and port number of message 225 can comprise the source IP address and port number 299*p* received with message 299 and recorded in server database 101*d*. Message 225 can include the device ephemeral public key Ed 103*a* and the ciphertext2 223*b*, as depicted in FIG. 2*a*. Message 225 can include identifying information for device 103, such as ID.device 103*i* or ID.device-obfuscated 103*o*, or a hash value of a unique key 101*v* or 102*v* received in a message 299. The value "K1 206*a*" depicted in FIG. 2*a* is shown to illustrated that the derived symmetric ciphering key 206*a* from a key derivation step 219 is used to encrypt ciphertext 223*b* (indicated by the brackets shown in FIG. 2*a* for message 225), and the value K1 206*a* is not transmitted in message 225.

Note that key Ed 103*a* can be omitted from message 225 since device 103 records the data. However, key Ed 103*a* can be useful to confirm that server 101 is sending message 225 to the correct device 103, and other benefits exist as well. Although not depicted in FIG. 2*a*, message 225 can include a server ephemeral public key Es 101*p* from FIG. 1*a* and a third ciphertext, where the third ciphertext is encrypted using the server ephemeral private key es 101*s*. Ciphertext2 223*c* can be internal or external to the third ciphertext.

As contemplated in the present disclosure, a message such as message 225 and also other messages such as message 299, message 214, etc. can be transmitted or sent in parts, where the data for the message can be transmitted and received in separate datagrams or portions over time. For these embodiments, the message can comprise the collection of separate datagrams or portions transmitted or sent separately. For example, with separate datagrams or portions for a message 299 in FIG. 2*a*, a first datagram or portion for message 299 could comprise device ephemeral public key Ed 103*a*, which could be sent (i) after a key pair generation step 103*x*, and (ii) before device 103 conducts steps 204 through 209 in a step 231. A second datagram or portion for message 299 could comprise ciphertext 209*b*, which could be sent after device 103 sends key Ed 103*a*.

In this manner, by sending message 299 as a first portion and a second portion, the overall speed of (i) conducting a step 231 for device 103 and (ii) steps 210*a* through 213 for server 101 could be increased. For example, by receiving the first portion of message 299 comprising key Ed 103*a*, server 101 could then (a) begin conducting steps below of 210*a*, 210*b*, etc., while (b) waiting for the second portion of message 299 comprising ciphertext 209*b* to be sent separately and after the first portion. By increasing the overall speed for conducting a step 224 for device 103 (and server 101), then electrical power consumption or battery usage for device 103 can be reduced. Other possibilities and benefits from sending a message in the present disclosure as a first portion and a second portion, without departing from the scope of the present disclosure.

Device 103 can then receive message 225 and conduct a series of steps in order to process the message. Device 103 can perform a decryption step 221*a* in order to decrypt ciphertext2 223*b* from message 225 using the derived symmetric ciphering key K1 206*a* from the key exchange step 206 for device 103. The symmetric ciphering key K1 206*a* derived by device 103 could include two portions, where a first portion is for encryption and a second, different portion is for decryption. A decryption step 221*a* for device 103 can be equivalent to a decryption step 221 for server 101, except (i) the ciphertext2 223*b* is input into decryption step 221*a* for device 103, and (ii) ciphertext 209*b* is input into decryption step 221 for server 103. A decryption step 221 is also depicted and described in connection with FIG. 2*e* below.

Device 103 can then read the plaintext within ciphertext2 223*b*, as well as verifying message integrity of ciphertext2 223*b* using a MAC key derived in a step 206. Note that for all ciphertext values transmitted in FIG. 2*a*, the ciphertext can include a MAC code and an initialization vector. Or, the MAC code and the initialization vector could be omitted from being transmitted with the ciphertext from some symmetric ciphering algorithms such as AES-SIV (e.g. IETF RFC 5297). Device 103 in a decryption step 221*a* can read the plaintext values of random number 203*a*, random number 211*a*, and response 222*a* from server 101. The plaintext data could include other data from server 101 or network 105 as well.

At step 226, device 103 can determine if decryption step 221*a* was successful, such as the ability to read plaintext data including the random number 203*a* send by device 103 in a message 299. If decryption step 221*a* fails, such as not being able to read plaintext data, then device 103 could determine that server 101 and/or network 105 did not properly record and operate with the private keys corresponding to the selected public keys from a network public key table 103*t*. For example, decryption step 221*a* could fail if either (a) server 101 did not record the private key ss 101*b* corresponding to the public key Ss 101*a* recorded by device 101, or (b) server 101 did not have access to a key server 102 for calculating values with private key sn 102*b* corresponding to the public key Sn 102*a* recorded by device 103.

As one example for failure of a decryption step 221*a*, the entity controlling key server 102 may deny server 101 access to computations with key sn 102*b* for reasons that could be equivalent to a key revocation for a traditional PKI key using certificates. Or, the entity controlling key server 102 may consider server 101 or key ss 101*b* to be compromised, and thus device 103 should stop using the corresponding public key. Other reasons could exist as well for the failure of a decryption step 221*a*, but a network 105 could intentionally cause decryption step 221*a* to fail by denying calculations with private keys sn 102*b* and/or ss 101*b*.

Upon determining that decryption step 221*a* failed in a step 226, device 103 could then select another server and corresponding keys from a network public key table 103*t*. For example, and as depicted in FIG. 1*c*, a device 103-1 could use the first row as a primary communications path and method for communicating with network 105. If decryption step 221*a* fails, then at a step 226 then device 103 could select a second row or "backup" to the primary, such as selecting the keys and data for row 2 in FIG. 1*c* for device 103-*a*. Device 103 could then return to the top of a step 224 and conduct a step 231 again using the data from the second row of a network public key table 103*t*. In this manner, a network 105 could deprecate a row of keys in a network public key table 103*t*, while device 103 could continue to communicate with new or different keys by using a step 231 and 228 with the new or different keys from table 103*t* (where network 105 caused a decryption step 221*a* to intentionally fail). Other reasons could exist for device 103 to use a different row of keys in a network public key table 103*t* as well, such as an instruction in a response 222*a*.

At step 227, device 103 can process the plaintext data from message 225, which was decrypted by step 221*a*. Device 103 can determine if random number 203*a* received in message 225 equals random number 203*a* previously sent in a message 299 above. Device 103 can record random number 211*a* from server 101 and use the random number 211*a* for subsequent messages to server 101 after receiving message 225. Device 103 in a step 227 could also process response 222*a* from server 101, where response 222*a* could include an instruction for device 103, such as an actuator setting, a command to change state of device 103, a setting or value or parameter for device 103 to begin using, and other possibilities exist as well for the data in a response 222a. The data for a response 222a could depend on the application used by device 103, and exemplary different applications are depicted and described in connection with FIGS. 5a through 5d below. As depicted in FIG. 2a, the collection of steps comprising message 225 and steps 221a, 226, and 227 could collectively comprise a step 228 for device 103 and server 101.

Although not depicted in FIG. 2a, device 103 could then send server 101 a subsequent message such as an encrypted signal of "OK" or other data using symmetric ciphering key K1 206a. Device 103 could send server 101 the "OK" message (or any message) with at least the random number 211a from server 101 in a ciphertext. Receipt by the server 101 of the random number 211a can authenticate the device 103 with the server 101. The ciphertext of a message from device 103 to server 101 after a message 225 could be encrypted with either the symmetric ciphering key K1 206a or a subsequently derived, different second symmetric ciphering key where the second symmetric ciphering key could be derived using the data from message 225.

Message 225 could include a server ephemeral public key Es 101p, then for a step 228, device 103 could use the key Es 101p with other keys such as keys Ss 101a, sd 103c, ed 103b, etc. in order to derive the second symmetric ciphering key. For some embodiments, message 225 could include a third ciphertext encrypted with the second symmetric ciphering key. In exemplary embodiments, device 103 sends server 101 a message with ciphertext after message 225, where (i) the ciphertext includes the random number 211a and (ii) the symmetric ciphering key for the ciphertext is derived using mutual authentication.

FIG. 2b

FIG. 2b is a simplified message flow diagram illustrating an exemplary messages transmitted from a device to a server, in accordance with exemplary embodiments. System 200 in FIG. 2b can be equivalent to system 200 in FIG. 2a. System 200 in FIG. 2b can include a device 103 and a server 101. As depicted and described in connection with FIG. 2a, a message 299 transmitted from device 103 to server 101 can comprise several different embodiments, including the use of different possible values for identification information for a device 103 in a message 299. FIG. 2b depicts different embodiments for a message 299 from a device. Although the message 299 may comprise different possible embodiments, a server 101 and a key server 102 can conduct the same or equivalent steps as depicted and described in connection with FIG. 2a in order to conduct a step 224 and a step 228.

A first exemplary embodiment for a message 299 could comprise a message 299a for a step 224a. For message 299a, the message can include the depicted values of device ephemeral public key Ed 103a, ciphertext 209b, a digital signature 103s, and a selected set of cryptographic parameters 104a. Note that identifying information for device 103 is omitted from plaintext a message 299a, but device identity comprise ID.device 103i is included in ciphertext 209b within message 299a. In this manner, device identity 103i can remain secured and not transmitted over IP network 107 in an insecure manner.

For embodiments with message 299a and without identity information for device 103, then server static public key Ss 101a recorded by device 103 could comprise a shared key 101z as depicted and described in connection with FIG. 1c. Or, in some embodiments a device 103 could omit recording Ss 101a (as discussed in FIG. 2c and FIG. 2d below), and authentication of a network 105 could be performed for device 103 with network static public key Sn 102a.

Server 101 could receive message 299a and conduct subsequent operations in a common manner for all devices 103 transmitting the same set of cryptographic parameters 104a. For a message 299a, server 101 could conduct a step 212a, where a step 212a could select the same key server 102 for sending message 214 in FIG. 2a for each message 299a received (e.g. key Ed 103a is forwarded by server 101 to key server 102 in a message 214). Note that in a step 224a that a modified step 213 is utilized, comprising a step 213x. For a step 213x, a device static public key Sd 103c cannot normally be selected by server 101 since no identifying information for device 103 is received as plaintext in a message 299a.

Consequently, a step 213x can comprise server 101 omitting a key Sd 103c from a point addition operation 213x and in this embodiment point X0 213a can comprise the point Ed 103a. All subsequent operations by server 101 and key server 102 in a step 224a with point X0 213a could use point Ed 103a as the point X0 213a. Key server 102 can still receive point X0 213a and reply with point X1 216a, where key server 102 uses the same value or number for key sn 102b for all points X0 213a received. Server 101 can derive key K1 206a using a key derivation step 219. Server 101 can then decrypt ciphertext 209a using key K1 206a with a decryption step 221. Server 101 can subsequently read the device identity ID.device 103i from the plaintext in ciphertext 209a.

Server 101 could conduct a key exchange step 218 using the same key ss 101b for all messages 299a received with a given set of cryptographic parameters 104a. Note that for embodiments depicted in FIG. 2b with a step 224a, that decryption of ciphertext 209a does not provide authentication for device 103, since device 103 has not demonstrated use and cryptographic operations with device static private key sd 103d. For a system 224a, other steps could be conducted in order to establish authentication for device 103 with server 101 or network 105. As one example, device 103 could include a digital signature 103s with message 299a, and digital signature 103s could be over at least the key Ed 103a.

After reading device identity 103i from ciphertext 209b in a message 299a, server 101 could select a device static public key Sd 103c from a database 101d and conduct a signature verification step 233 for the digital signature 103s in a message 299a using the selected device static public key Sd 103c. Upon successful verification of a digital signature 103s from a message 299a in a signature verification step 233, then device 103 could be considered authenticated with server 101 and/or network 105. In this manner of including a digital signature 103s with message 299a, a device 103' can be authenticated with a server 101 and/or a network 105 using a single message 299a. Note that the other steps and messages from FIG. 2a would be utilized as well, such as a step 210b to confirm that key Ed 103 a is not retransmitted, and thus preventing replay attacks.

A second exemplary embodiment for a message 299 could comprise a message 299b for a step 224b. For message 299b, the message can include the depicted values of device ephemeral public key Ed 103a, a secure hash value over server static public key Ss 101a comprising H(Ss) 252, and ciphertext 209b. For a step 224b, a device 103 could record server static public key Ss 101a in a network public key table 103t as a unique key 101v. Recording record server static public key Ss 101a in a network public key table 103t as a unique key 101v is depicted and described in connection with FIG. 1c above. Although H(Ss) 252 is depicted for a message 299b in FIG. 2b, a hash value for a different unique public key recorded by device 103 in table 103t could be utilized as well or instead, such as a secure hash value over network static public key Sn 102a, which could be equivalent to H(Sd) 250 as depicted for a message 299 in FIG. 2a. For embodiments using H(Sn), then the network static public key Sn 102a recorded by device 103 could also comprise a unique key 102v as depicted and described in connection with FIG. 1c.

Server 101 could receive message 299b and conduct steps to process the message. Server 101 could conduct a step 210a to select a set of cryptographic parameters 104a for use with PKI keys such as Ed 103a from message 299b. Server 101 could conduct a step 210b to validate public key Ed 103a and also confirm that key Ed 103a is not reused. A step 212b in FIG. 2b can be equivalent to a step 212 in FIG. 2a, but with modifications for server 101 to identify device 103. A step 212b could comprise server 101 reading H(Ss) 252 and querying server database 101d as depicted in FIG. 2f below in order to obtain PKI keys for device 103 in order to conduct subsequent steps.

Since Ss 101a can comprise a unique key 101v, the hash value of H(Ss) 252 would also reasonably be a unique number or value for querying database 101d to obtain keys Sd 101c, Ss 101a, and also a key server 102 that would record network static private key sn 102b corresponding to the network static public key Sn 102a recorded by device 103. As contemplated herein, a hash value over a public key, such as H(Ss) 252 or H(Sd) 250 can reasonably be considered a unique number to identify a device 103, where unique public keys 101v and/or 102v are recorded in a device 103, as depicted and described in connection with FIG. 1c. After selecting keys Sd 101c, Ss 101a, and also a key server 102 that would record network static private key sn 102b in a step 212b, server 101 could then conduct the subsequent series of steps for server 101 as depicted and described in connection with FIG. 2a with key server 102 and also device 103.

A third exemplary embodiment for a message 299 could comprise a message 299c for a step 224c. For message 299c, the message can include the depicted values of device ephemeral public key Ed 103a, device static public key Sd 103c, and ciphertext 209b. Before processing message 299c, a server 101 could separately record the same value for device static public key Sd 103c, in a server database 101d as depicted and described in connection with FIG. 2f below. As depicted in FIG. 2b, the value for device static public key Sd 103c, potentially along with a device identity 103i, could be received and recorded in a step 201b, although other possibilities exist as well for a server 101 to receive key Sd 103c before receiving a message 299c. In other words, server 101 could obtain key Sd 103c separately and in a secure manner before receiving the same value for a key Sd 103c from a message 299c.

Note that the separate receipt and recording of Sd 103c, such as in a step 201b, can be important for security of a system 100, system 200, and other systems herein, since authentication of device 103 using Sd 103c can rely on the security and trust of the method used to receive and record key Sd 103c. In other words, without the separate secure recording of key Sd 103c by server 101 before receiving a message 299c, an imposter device 103 or a hacker could simply derive and send both key Ed 103a and key Sd 103c in a message 299c.

A step 212c could comprise server 101 reading Sd 103c and querying server database 101d as depicted in FIG. 2f below in order to confirm that key Sd 103c received in message 299c matches a previously securely received and recorded same value or number for a key Sd 103c in a database 101d. Server 101 could then also query server database 101d in a step 212c for other PKI keys for device 103 in order to conduct subsequent steps. Server 101 could use key Sd 103c to obtain (i) key ss 101b and (ii) the identity for a key server 102 which could record network static private key sn 102b corresponding to the network static public key Sn 102a used by device 103 in a key derivation step 206 in step 230.

Server 101, key server 102, and device 103 could then conduct the series of steps and messages depicted in FIG. 2a in order to conduct a mutual authentication and securely and confidentially transmit data 106 between the nodes. Other possibilities exist as well for a message 299 to include identifying information for device 103 in order for server 101 to conduct a step 212 without departing from the scope of the present disclosure.

FIG. 2c

FIG. 2c is a flow chart illustrating exemplary steps for conducting a key exchange using PKI keys in order to derive a shared secret key, and for using the derived shared secret key to encrypt and decrypt data, in accordance with exemplary embodiments. Exemplary steps for a device 103 to mutually derive a shared secret X3 207a and symmetric key 206b with server 101 can comprise a key exchange step 206. Exemplary steps in FIG. 2c for a device 103 to encrypt plaintext data using the mutually derived symmetric key 206b can comprise an encryption step 209. The use of the steps for a key exchange 206 and encryption 209 were also depicted and described in connection with FIG. 2a above.

Note that steps in FIG. 2c and the steps in FIG. 2d below can share some algorithms and values, and the descriptions for the algorithms and values in FIG. 2c can be applicable for FIG. 2d. For example, the key exchange algorithm 207 in FIG. 2c can comprise an ECDH key exchange equivalent to key exchange algorithm 207 in FIG. 2d (but with different numbers input for the algorithm in the two different Figures). The set of parameters 104a depicted and described in FIG. 2c can also be used in FIG. 2d.

The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present disclosure may comprise a computer program or hardware or a combination thereof which embodies the functions described herein and illustrated in the appended flow charts. However, it should be apparent that there could be many different ways of implementing the disclosure in computer programming or hardware design, and the disclosure should not be construed as limited to any one set of computer program instructions.

Further, a skilled programmer would be able to write such a computer program or identify the appropriate hardware circuits to implement the disclosure without difficulty based on the flow charts and associated description in the application text, for example Therefore, disclosure of a particular set of program code instructions or detailed hardware devices is not considered necessary for an adequate understanding of how to make and use the disclosure. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present disclosure to function as described. However, the present disclosure is not limited to the order of the steps described if such order or sequence does not alter the functionality of the present disclosure. That is, it is recognized that some steps may be performed before, after, or in parallel other steps without departing from the scope and spirit of the present disclosure.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

A device 103 can conduct a key exchange step 206. At step 206, device 103 can use a step 204 to calculate the sum of device static private key sd 103d and the derived device ephemeral private key ed 103b, and then calculate the modulus of the sum using the value n, where the value n can be defined or determined based upon the selected set of cryptographic parameters 104a. Exemplary data for a step 204 will be shown below. Device 103 can then conduct a step 205 to perform an EC point addition operation on the server static public key Ss 101a and the network static public key Sn 102a in order to obtain a point on the elliptic curve defined by the selected subset of cryptographic parameters 104a. Exemplary data for a step 205 will also be shown below.

The combination of output from step 204 and step 205 can be input can be input into an ECDH key exchange algorithm 207 using parameters 104a in order to calculate the shared secret X3 207a. Note that in some exemplary embodiments, the use of a server static PKI key pair comprising Ss 101a and ss 101b could be omitted, and for these embodiments then ECC point addition for step 205 can be omitted and the public key input into an ECDH key exchange algorithm 207 can comprise the single value for network static public key Sn 102a. In other words, a key X3 207a can be calculated without requiring a server static public key Ss 101a for these embodiments (where private key ss 101b would also be omitted from key exchange calculations by network 105), although the use of a server static public key Ss 101a can be preferred for a step 205 in other embodiments.

A summary of ECDH as a key exchange algorithm 207 is included in the Wikipedia article titled "Elliptic Curve Diffie-Hellman" from Mar. 9, 2018, which is herein incorporated by reference. An exemplary embodiment of key exchange algorithm 207 could comprise a "One-Pass Diffie-Hellman, C(1, 1, ECC CDH)" algorithm as described in section 6.2.2.2 on page 81 of the National Institute of Standards and Technology (NIST) document "NIST SP 800-56A, Recommendation for Pair-Wise Key Establishment Schemes Using Discrete Logarithm Cryptography" from March, 2007 which is hereby incorporated by reference its entirety.

Other key exchange algorithms in NIST SP 800-56A could be utilized as well for a key exchange algorithm 207 in FIG. 2a and FIG. 2d without departing from the scope of the present disclosure. Example calculations for an ECDH key exchange for a key exchange algorithm 207 are shown below. In exemplary embodiments, the key exchange algorithm 207 used by server 101 and key server 102 can comprise the equivalent key exchange algorithm 207 used by device 103 in a key exchange step 206 above in FIG. 2c.

Other algorithms to derive a secret keys using public keys and private keys may also be utilized in a key exchange algorithm 207, such as, but not limited to, the American National Standards Institute (ANSI) standard X-9.63. Cryptographic parameters 104a can also include information, values, or settings for conducting (i) a key exchange algorithm 207 in step 206 (and steps 216 and 218 in FIG. 2d below) and (ii) a key derivation function 208 in order to derive a commonly shared symmetric encryption key K1 206a. As contemplated herein, the terms "selected set of cryptographic parameters 104a" and "cryptographic parameters 104a", and "parameters 104a" can be equivalent, and can also comprise a subset of exemplary cryptographic parameters depicted and described in connection with FIG. 1a and FIG. 2g below.

Parameters 104a input into a key exchange algorithm 207 can include a time-to-live for a key K1 206a that is derived, a supported point formats extension, where the supported point formats extension could comprise uncompressed, compressed prime, or "compressed char2" formats, as specified in ANSI X-9.62 and related IETF standards. In other words, (i) an ECC keys input into a key exchange algorithm 207 and (ii) secret keys output from key exchange algorithm 207 may have several different formats and a set of parameters 104a can be useful to specify the format.

Exemplary data and numbers can be provided to demonstrate the calculations for (i) EC point addition step 205, (ii) step 204 to combine private keys, and (iii) key exchange step 206. Parameters 104a can comprise the elliptic of "secp128r1" with key lengths of 128 bit long keys. Although the exemplary numbers for keys, points, and a named curve are provided, other values for keys, points, and named ECC curves could be utilized as well. Other example named curves and parameters 104a could comprise curve from IETF RFC 5480.

The device ephemeral private key ed 103b can comprise the exemplary following number, and can be recorded in device 103 after a key pair generation step 103x from FIG. 1a and FIG. 2a above:

330225223315954763304200471137380016969

The device static private key sd 103d can comprise the exemplary following number, and can be recorded in device 103 before key pair generation step 103x, such as during device manufacturing or device distribution:

209122135174501513062984245101620420255

Note that the private keys ed 103b and sd 103d above correspond to the public keys Ed 103a and Sd 103c recorded by a network 105, as depicted in FIG. 1a and also with exemplary numeric values below in FIG. 2d below for the example numbers given above. The network static public key Sn 102a can comprise the exemplary values with X and Y numbers (or "coordinates") of:
X: 94171534984237685678256585618241417039
Y: 203945269464835729838690547089813292056

Note that the public key Sn 102a corresponds to the private key sn 102b from FIG. 2d below. The server static public key Ss 101a can comprise the following exemplary values with X and Y numbers (or "coordinates") of:
X: 319423829544285733939020505180109110187
Y: 242179187598040154943588326777101424083

An ECC point addition 205 for a step 206 with the above two keys Ss 101a and Sn 102a will result in the following exemplary point for input into an ECDH key exchange algorithm 207 in step 206:
X: 15725052432774382840929761440274832589
Y: 217317805140710190286653933543727803288

The above combination of both Ss 101a and Sn 102a for a key exchange step 206 via an EC point addition 205 is depicted in FIG. 2c with the "+" symbol between the public keys.

Device 103 can conduct step 204 to calculate the sum of device static private key sd 103d and the derived device ephemeral private key ed 103b, and then calculate the modulus of the sum using the value n, where the value n can be defined or determined based upon the selected set of cryptographic parameters 104a. For the exemplary values for keys above, when using the named elliptic curve secp128r1, the value of n can comprise the decimal number:

340282366762482138443322565580356624661

Consequently, the modulus of (i) the sum of private keys sd 103d and ed 103b and (ii) the value n above will equal the following number for a step 204:

199064991727974137923862150658643812563

The output of the above ECC point addition 205 for public keys Ss 101a and Sn 102a can be input into ECDH key exchange algorithm 207 using parameters 104a. An ECDH key exchange algorithm 207 in key exchange step 206 can input (i) the point calculated above from the EC point addition 205 on the public keys 101a and 102a and (ii) the value calculated from a step 204 (e.g. (sd 103d+ed 103b) mod n). The output of ECDH key exchange algorithm 207 in key exchange step 206 can be the secret value or point X3 207a. Note that the secret X3 207a as derived by device 103 in a key exchange step 206 equals or is the same numeric value as the secret X3 207a derived by server 101 in a key derivation step 219 below. An exemplary number or value for secret X3 207a calculated by device 103 using a key exchange step 206 using the above exemplary numeric values for ed 101b, sd 103d, Sn 102a, and Ss 101a would be:
X: 192457465648897421085529769283600671459
Y: 12614498480690967741828130967599964269

Although the use of two public keys (Sn 102a and Ss 101a) and two private keys (ed 101b and sd 103d) are depicted for device 103, an ECDH key exchange step 206 could include more keys than those depicted. Additional public keys, such as a server ephemeral public key Es 101p could be input into the EC point addition step 205 by device 103, and a server 101 could input the corresponding server ephemeral private key es 101s into a step 218 below in FIG. 2d (via modular addition with key ss 101b). The present disclosure contemplates that additional or different public and private keys could be used with a key exchange step 206 for device 103 and key exchange steps 216 and 218 by a network 105.

For a key exchange step 206, derived shared secret key X3 207a can be input into a key derivation function 208 where the key derivation function 208 can be equivalent to the key derivation function 208 depicted and described in connection with FIG. 2d below for a key derivation step 208. Note that for key derivation steps in the present disclosure, the X coordinate of a derived shared secret can be taken or used as input into the key derivation function 208. The output of a key derivation function 208 can comprise both (i) a symmetric ciphering key K1 206a and (ii) a MAC key 206b. MAC key 206b can be used with a symmetric ciphering algorithm in order to generate a MAC code, such that the other party using the same key K1 206a and MAC key 206b can process the ciphertext and calculate the same MAC code in order to verify message integrity. The use of key K1 206a and MAC key 206b are described in connection with encryption step 209 and decryption step 221.

Key derivation function 208 can use a secure hash algorithm such as, but not limited to, SHA-256, SHA-384, SHA-3, etc. and additional values such as a text string with secret X3 207a. The specification of a secure hash algorithm and the text string for use with a key derivation function 208 could be commonly shared between server 101 and device 103 by commonly shared 5 parameters 104a. The output of a secure hash algorithm within a key derivation function 208 could have a subset of bits selected or possibly a secure hash expanded in order to obtain the number of bits required for a symmetric key with a symmetric ciphering algorithm, such as key K1 206a.

A key derivation function (KDF) 208 could comprise a KDF compatible with or specified by ANSI standards for "X9.63 Key Derivation Function". Other possibilities exist for a key derivation function 207 to convert a secret X3 207a into a symmetric ciphering key K1 206a and a MAC key 206b without departing from the scope of the present disclosure. As contemplated in the present disclosure, although an ECC public key such as secret X3 207a can comprise a coordinate with an X value and a Y value, in exemplary embodiments a single number comprising the X value can be selected and input into a key derivation function 208. Symmetric ciphering key K1 206a can comprise two portions, where a first portion is used for encryption and a second portion is used for decryption.

Device 103 can conduct an encryption step 209, where the use for an encryption step 209 is depicted and described in connection with FIG. 2a above. Plaintext 209a in a step 209 can comprise the random number 203a from device 103 and data 202b, where data 202b for device 103 was depicted and described in FIG. 2a in connection with a step 202. Other or different exemplary data could be included as plaintext 209a in an encryption step 209. The symmetric ciphering key for encryption step 209 can comprise symmetric key K1 206a from a key derivation step 208 in step 206 above and a MAC key 206b can be input into a symmetric ciphering algorithm 230 as well. Encryption step 209 in FIG. 2c and decryption step 221 in FIG. 2e can use a common symmetric ciphering algorithm 230, which could comprise the Advanced Encryption Standard with Synthetic Initialization Vectors (AES-SIV) (and deciphering algorithm) also with a common set of symmetric ciphering parameters 104f from a set of cryptographic parameters 104. Note that MAC key 206b can also be input into symmetric ciphering algorithm 230 along with an initialization vector 209i.

Other or different symmetric ciphering algorithms 230 could be utilized as well, such as, but not limited to such as AES, Triple Data Encryption Standard (3DES), Blowfish, or related algorithms. Symmetric ciphering parameters 104f can also specify the use of a block chaining mode such as cipher block chaining (CBC), counter mode (CTR), or Galois/Counter mode (GCM) and other possibilities exist as well. In addition, symmetric ciphering parameters 104f could specify a mode for message authentication, which could comprise a CMAC mode as specified in NIST publication SP-800-38B. In some exemplary embodiments, a symmetric ciphering algorithm 230 can comprise the AES-SIV algorithm as specified in IETF RFC 5297. The output from an encryption step 209 using a symmetric ciphering algorithm 230 and the depicted values input can be ciphertext 209b, as depicted in FIG. 2c. The output from an encryption step 209 using a symmetric ciphering algorithm 230 and the depicted values input can also include MAC code 209m, where MAC code 209m can be used by the receiving party with the MAC key 206b to verify message integrity. The initialization vector 209i can be sent along with the ciphertext 209b in order for both sides to commonly initiate block chaining.

In addition, although a key exchange step 206 for device 103 in FIG. 2c depicts (i) the point addition of the public keys Ss 101a and Sn 102a, and (ii) the addition of private keys ed 103b and sd 103d, other sequences of EC point addition and EC point multiplication are possible as well without departing from the scope of the present disclosure in order to derive the same value for X3 207a. In summary, X3 207a can be calculated by device 103 through any of the following combinations in addition to those described above, and other possibilities may exist as well:

X3 207a=[(Ss 101a*{(ed 103b+sd 103d)mod n}]+
 [(Ss 101a*{(ed 103b+sd 103d)mod n}]   1.

X3 207a=[(Ss 101a+Sn 102a)*ed 103b]+[(Ss 101a+
 Sn 102a)*sd 103d]   2.

X3 207a=[(Ss 101a+Sn 102a)*ed 103b]+[(Ss
 101a*sd 103d)+(Sn 102a*sd 103d)]   3.

X3 207a=[(Ss 101a*ed 103b)+(Sn 102a*ed 103b)]+
 [(Ss 101a+Sn 102a)*sd 103d]   4.

X3 207a=[(Ss 101a*ed 103b)+(Sn 102a*ed 103b)]+
 [(Ss 101a*sd 103d)+(Sn 102a*sd 103d)]   5.

In summary, the present disclosure contemplates that and ECDH key exchange by device 103 in order to derive a point X3 207a can include at least one point addition using the server static public key Ss 101a and the network static public key Sn 102a. For example, combinations above multiply the keys Ss 101a and Sn 102a individually by a scalar value via EC point multiplication before EC point addition operations. However, the calculation of point X3 207a uses at least one EC point addition of (i) a first value calculated with the server static public key Ss 101a and (ii) a second value calculated with the network static public key Sn 102a.

FIG. 2d

FIG. 2d is a flow chart illustrating exemplary steps for conducting an elliptic curve (EC) point addition operation to combine public keys, for conducting a key exchange using PKI keys in order to derive shared secrets, and for conducting a key derivation function using the derived shared secrets, in accordance with exemplary embodiments. Server 101 can conduct an EC point addition operation 213 to derive secret key X0 213a. Key server 102 can conduct a key exchange step 216 in order to derive a secret key X1 216a. Server 101 can conduct a key exchange step 218 in order to derive a secret key X2 218a. Server 101 can receive the secret key X1 216a in a message 214 from key server 102 in FIG. 2a above through a secure connection 201a. Server 101 can then conduct a key derivation function 219 using secret keys X1 216a and X2 218a in order to derive a symmetric ciphering key K1 206a.

Using the methods and ECC PKI keys described in the present disclosure, a device 103 can also derive the same symmetric ciphering key K1 216a as depicted and described below for a key exchange step 206 in FIG. 2c above. In other words, for exemplary embodiments (i) the corresponding key exchange step 206 (in FIG. 2c above) for a device 103 by network 105 can be (ii) shared or distributed between a server 101 and key server 102 in order to secure or isolate network static private key sn 102b.

Server 101 can conduct an EC point addition step 213 in order to combine (i) device static public key Sd 103c recorded in a server database 101d with (ii) device ephemeral public key Ed 103a received in a message 299. Exemplary calculations for an ECC point addition 213 can comprise the calculations shown for point addition in the Wikipedia article for "Elliptic Curve Point Multiplication" dated May 15, 2018, which is herein incorporated by reference in its entirety. The output of an EC point addition step 213 can comprise the point or value X0 213a. An EC point addition step 213 can be performed with a named elliptic curve from a selected set of parameters 104a, where server 101 selects parameters 104a in a step 210a.

A key exchange step 216 for key server 102 to derive a secret key X1 216a can utilize a selected set of cryptographic parameters 104a as depicted and described in connection with FIG. 1a and FIG. 2a above. Parameters 104a could be received by key server 102 along with the point X0 213a in a message 214 from server 101. As depicted in FIG. 2d, a key exchange algorithm 207 in step 216 for key server 102 can receive input both of point X0 213a and network static private key sn 102b. The key exchange algorithm 207 could comprise a Diffie Hellman key exchange (DH), an Elliptic Curve Diffie Hellman key exchange (ECDH), and other possibilities exist as well without departing from the scope of the present disclosure.

Although the use of a point X0 213a is depicted in FIG. 2d for a step 216, the value of X1 216a could also be calculated as X1 216a=[(Sd 103c*sn 102b)+(Ed 103a*sn 102b)]. A key exchange algorithm 207 can support either PKI keys based on elliptic curves or RSA algorithms, although support of elliptic curves may be preferred in some exemplary embodiments due to their shorter key lengths and lower computational processing requirements. In some exemplary embodiments, the value X1 216a can comprise two points of (i) (Sd 103c*sn 102b) and (ii) (Ed 103a*sn 102*b*) and key server 102 can send the two separate points for the value X1 216*a* to a server 101 in a message 217 in FIG. 2*a*.

As depicted in FIG. 2*d*, the output of a key exchange algorithm 207 in a step 216, such as an ECDH key exchange, can comprise a secret value X1 216*a*. In exemplary embodiments, secret value X1 216*a* can comprise a point on an elliptic curve, where the equation and values for the elliptic curve can be specified in parameters 104*a*. As contemplated herein, the secret value X1 216*a* (as well as X2 218*a* below) comprises both an X coordinate and a Y coordinate, in order to support subsequent ECC point addition operations. After conducting key exchange step 216, key server 102 can send the secret value X1 216*a* to server 101 in a message 217, as depicted in FIG. 2*a* above.

Key exchange step 218 for a sever 101 depicted in FIG. 2*a* can correspond to key exchange 218 in FIG. 2*d*. Key exchange step 218 can comprise inputting or using the point X0 213*a* from a step 213 and the server static private key ss 101*b* into an ECDH key exchange algorithm 207, which can comprise the same or equivalent key exchange algorithm 207 depicted and described in connection with key exchange step 216 described above. Other elements or algorithms within a key exchange step 218 can be equivalent to a key exchange step 216 above, including the use of shared parameters 104*a*. The output of a key exchange algorithm 207 in a step 218 can comprise a secret key or value X2 218*a*. Although the use of a point X0 213*a* is depicted in FIG. 2*d* for a step 218, the value of X2 218*a* could also be calculated as X2 218*a*=[(Sd 103*c**ss 101*b*)+(Ed 103*a**ss 101*b*)]. In other words, the value of X2 218*a* could comprise two separate points, where the points can be (i) (Sd 103*c**ss 101*b*) and (ii) (Ed 103*a**ss 101*b*).

In exemplary embodiments, secret value X2 218*a* can comprise a point on an elliptic curve, where the equation and values for the elliptic curve can be specified in parameters 104*a*. Exemplary numeric values for using a key exchange algorithm 207 using a set of parameters 104*a* are depicted and described below. In exemplary embodiments, a server 101 can record the value X2 218*a* derived from a step 218 and also the value X1 216*a* received in a message 217 in a server database 101*d*. The time the values are stored in a server database 101*d* can be minimized in order to increase security, and, for example, the recording of the values can be deleted after server 101 both (i) receives a message from device 103 using key K1 206*a* and (ii) server 101 sends message 225 in FIG. 2*a* above. Note that in some exemplary embodiments, the use of a server static PKI key pair comprising Ss 101*a* and ss 101*b* could be omitted, and for these embodiments then a step 218 can be omitted and the calculation and use of a value X2 218*a* can be omitted from FIG. 2*d*, including omitting X2 218*a* from a key derivation step 219 below.

A key derivation step 219 for server 101 can (i) combine the output of key exchange steps 216 and 218 in order to calculate or derived the shared secret X3 207*a* and then (ii) perform a key derivation function step 208 on the derived or calculated shared secret X3 207*a* in order to determine or calculate shared symmetric ciphering key K1 206*a*. Note that shared secret symmetric 5 ciphering key K1 206*a* can be also mutually derived by device 103, where device 103 uses the key exchange step 206 depicted and described in connection with FIG. 2*c* above.

In exemplary embodiments, a server 101 can conduct the key derivation step 219 using (i) the value X1 216*a* received from key server 102 (where receipt of X1 216*a* by server 101 can be in a message 217 as shown in FIG. 2*a* above), and (ii) the value or key X2 218*a* output from a key exchange step 218 for server 101 in the paragraph above. As contemplated herein, the values of X0 213*a*, X1 216*a*, X2 218*a*, and X3 207*a* may be described as "shared secrets" or "shared secret keys" or simply points. Although the values may not be used as a key directly with a symmetric ciphering algorithm in exemplary embodiments, these values and the output of an ECDH key exchange algorithm 207 can comprise a secret or a key or point.

Key derivation step 219 for server 101 can comprise two primary steps. A first step in key derivation 219 can comprise an EC point addition 220 on the value X1 216*a* and the value X2 218*a*. The result of the ECC point addition will be equal to the value X3 207*a*. Note that device 103 can also derive the same value for value X3 207*a* (in step 206 above in FIG. 2*c*) without EC point addition 220 using a step 219. In other words, although (a) the related key exchange step 206 for device 103 may include a point addition for public keys, (b) the key exchange step 206 for device 103 will not use EC point addition for points derived from two separate private keys in two separate servers (e.g. X1 216*a* uses private key sn 102*b* and X2 218*a* uses private key ss 101*b*).

Exemplary calculations for an EC point addition 220 can comprise the calculations shown for point addition in the Wikipedia article for "Elliptic Curve Point Multiplication" dated May 15, 2018, which is herein incorporated by reference in its entirety. ECC point addition 220 can be equivalent to ECC point addition 213, but with different values. As depicted in FIG. 2*d*, (a) the calculation of X3 207*a* by server 101 using an ECC point addition 220 over X1 216*a* and X2 218*a* will equal (b) the value for X3 207*a* calculated by device 103 using a key exchange algorithm 207 in a step 206 from FIG. 2*c* above. A second step in key derivation step 219 as depicted in FIG. 2*d* can comprise a key derivation function step 208 using (a) input from ECC point addition step 220 (e.g. value X3 207*a* output from step 220), where (b) the output of key derivation function step 208 can comprise key K1 206*a* and also an associated MAC key 206*b*. In exemplary embodiments, the X coordinate from shared secret X3 207*a* can be used with key derivation function 208.

By server 101 conducting a key derivation step 219 as depicted in FIG. 2*b* (where key server 102 conducts the calculations for step 216 using the network static private key sn 102*b*), (*i*) sever 101 can calculate symmetric ciphering key K1 206*a* without recording or operating on the network static private key sn 102*b*. In this manner, the security of a system 100 or system 200 can be significantly enhanced, since the network static private key sn 102*b* does not need to be recorded or operated by server 101, which can communicate with a plurality of devices 103 over an IP network 107.

In other words, by server 101 (*i*) using the EC point addition over key X1 216*a* instead of (ii) conducting a key exchange 207 directly with sn 102*b*, then server 101 does not need to record or operate with the network static private key sn 102*b*, thereby increasing security and flexibility of a system 100 and system 200 and other systems herein. Also, since (i) key X1 216*a* can be the equivalent of an ECC public key as a point on an elliptic curve, and (ii) it is not computationally feasible to determine network static private key sn 102*b* from key X1 216*a*, then key X1 216*a* does not reveal meaningful information about network static private key sn 102*b*.

Many benefits can be achieved by server 101 conducting a key derivation step 219 using key X1 216*a* instead of recording and operating with network static private key sn 102b. As one example, the corresponding network static public key Sn 102a could potentially be both (i) recorded in millions of distributed devices connecting to server 101 through many different physical locations and networks, and (ii) used for a decade or longer. Keeping network static private key sn 102b secure for this embodiment could be economically essential, since a compromise of network static private key sn 102b may (i) render the devices 103 insecure (or unable to authenticate network 105 using an ECDHE key exchange), and (ii) require the secure distribution or re-installation of a new, different network static public key Sn 102a in the devices, which may not be economically feasible due to the prior distribution of devices.

Exemplary data and numbers can be provided to demonstrate the calculations for (i) ECC point addition step 213, (ii) key exchange step 216, (iii) key exchange step 218, and (iv) key derivation step 219 using an ECC point addition 220. Parameters 104a can comprise the elliptic of "secp128r1" with key lengths of 128 bit long keys. Although the exemplary numbers for keys, points, and a named curve are provided, other values for keys, points, and named ECC curves could be utilized as well.

The network static private key sn 102b can comprise the exemplary following number, and can be recorded in key server 102:
221902394438765368991155818063875293908

The server static private key ss 101b can comprise the exemplary following number, and can be recorded by server 101:
246768250079261690512638148137618184294

Note that the corresponding public keys Ss 101a and Sn 102a are recorded by device 103 and used in step 206 above in FIG. 2c. The device ephemeral public key Ed 103a can comprise the following exemplary values with X and Y numbers (or "coordinates") of:
X: 239356896551017663412726672579682627094
Y: 209570745539973929739512070961905802250

Note that the above device ephemeral public key Ed 103a corresponds to the device ephemeral private key ed 103b above from FIG. 2c. The device static public key Sd 103c can comprise the following exemplary values with X and Y numbers (or "coordinates") of:
X: 203473426612520506812902270038827201196
Y: 64318327833120582836973711848343026891

ECC point addition step 213 by server 101 can combine the device static public key Sd 103c and the device ephemeral public key Ed 103a in order to output the following value for point X0 213a:
X: 59121922812458579600446751790662160796
Y: 304934509235778268978955867170200917057

Key exchange step 216 for an ECDH algorithm key exchange 207 by key server 102 can input the point X0 213a in the paragraph above and the network static private key sn 102b (both with numbers above) in order to calculate a secret X1 216a. An exemplary number or value for secret X1 216a from the values above using parameters 104a can be:
X: 116816232651214939512035210922980929925
Y: 266578617588050771886642464870165918127

Key exchange step 218 for an ECDH algorithm key exchange 207 by server 101 can input the point X0 213a from a step 213 above and the server static private key ss 101b (both with numbers above) in order to calculate a secret X2 218a. An exemplary number or value for key X2 218a from the values above using parameters 104a can be:
X: 283470377637256529257925581999478035172
Y: 117395441238388206677723127104680679540

An ECC point addition 219 for the above two derived points (or "keys") X1 216a (from point X0 213a and sn 102b) and X2 218a (from point X0 213a and ss 101b) will result in the following point that also equals X3 207a.
X: 192457465648897421085529769283600671459
Y: 126144984806909677418281309675999964269

Note that the same numeric value for key X3 207a can also be derived by device 103 from a key exchange step 206 above using ECDH key exchange algorithm 207. For exemplary embodiments, although private key sn 102b and private key ss 101b can be recorded and operated by physically separated devices, device 103 can record and operate on the corresponding public keys Sn 102a and public key SS 101a (at the same physical location as device 103).

After an EC point addition 220, for a key derivation step 219 in FIG. 2d, server 101 can input the shared secret key X3 207a, where key X3 207a was output from the EC point addition 220, into a key derivation function 208. The key derivation function 208 can comprise the same key derivation function 208 used by a device 103 in a step 206 above. The output of a key derivation function 208 can comprise both (i) a symmetric ciphering key K1 206a and (ii) a MAC key 206b. MAC key 206b can be used with a symmetric ciphering algorithm in order to generate a MAC code 209m, such that the other party using the same key K1 206a and MAC key 206b can process the ciphertext and calculate the same MAC code 209m in order to verify message integrity.

In summary, X3 207a can be calculated by network 105 through any of the following combinations in addition to those described above, and other possibilities may exist as well:

X3 207a=[(Sd 103c*{(ss 101b+sn 102b)mod n}]+
[(Ed 103a*{(ss 101b+sn 102b)mod n}]     1.

X3 207a=[(Sd 103c+Ed 103a)*ss 101b]+[(Ed 103a+
Sd 103c)*sn 102b]     2.

X3 207a=[(Sd 103c+Ed 103a)*ss 101b]+[(Sd
103c*sn 102b)+(Ed 103a*sn 102b)]     3.

X3 207a=[(Sd 103c*ss 101b)+(Ed 103a*ss 101b)]+
[(Sd 103c+Ed 103a)*sn 102b]     4.

X3 207a=[(Sd 103c*ss 101b)+(Ed 103a*ss 101b)]+
[(Sd 103c*sn 102b)+(Ed 103a*sn 102b)]     5.

In summary, the present disclosure contemplates that an ECDH key exchange by network 105 can include at least one EC point addition using the device ephemeral public key Ed 103a and the device static public key Sd 103c, in order to mutually derive point X3 207a with a device 103. For example, combinations above multiply the keys Ed 103a and Sd 103c individually by a scalar value via EC point multiplication before EC point addition operations. However, the calculation of point X3 207a uses at least one EC point addition of (i) a first value calculated with the device static public key Sd 103c and (ii) a second value calculated with the device ephemeral public key Ed 103a.

FIG. 2e

Figure 2E:
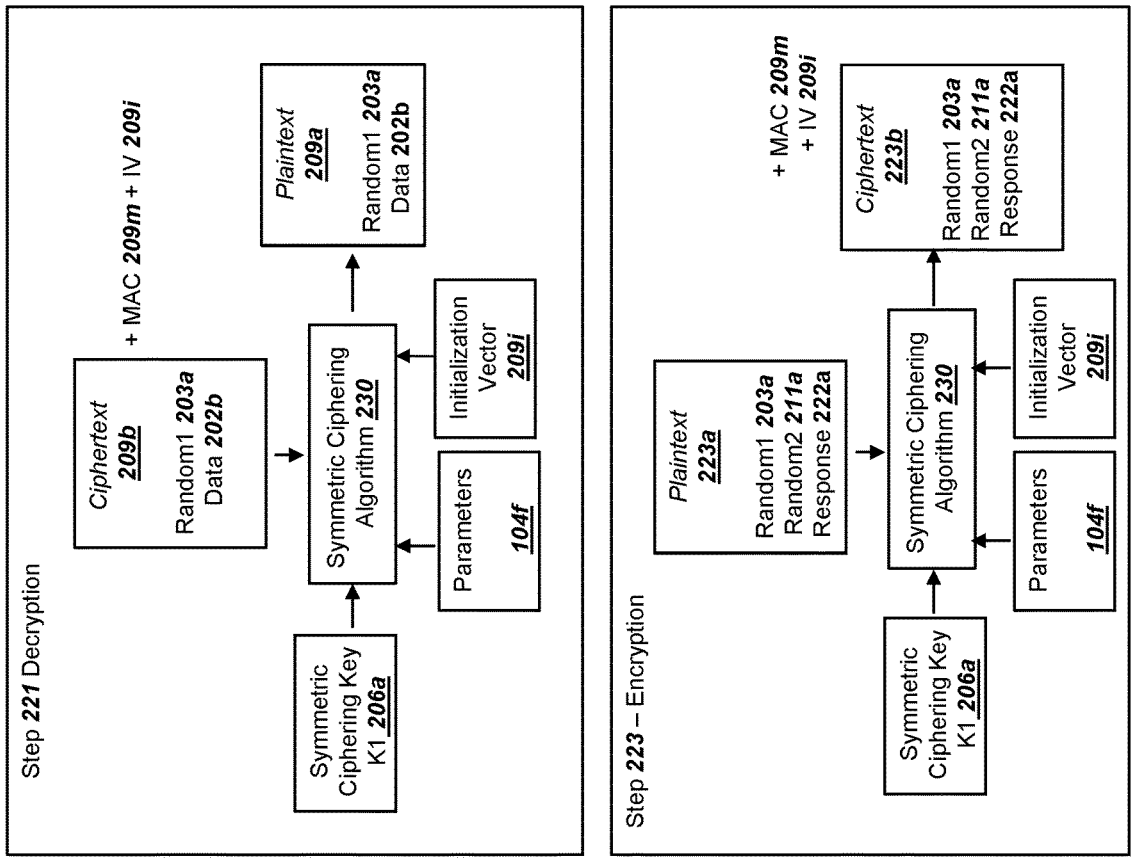
FIG. 2e is a flow chart illustrating exemplary steps for using a derived shared secret key to encrypt and decrypt data, in accordance with exemplary embodiments.

FIG. 2e is a flow chart illustrating exemplary steps for using a derived shared secret key to encrypt and decrypt data, in accordance with exemplary embodiments. A decryption step 221 can be performed by server 101, and an encryption step 223 can be performed by server 101. The use of a decryption step by server 101 and an encryption step 223 by server 101 was depicted and described in connection with FIG. 2a above, and additional exemplary details are provided herein in FIG. 2e. A decryption 221 step converts the ciphertext 209b received in a message 299 from FIG. 2a into plaintext 209a. Decryption step 221 can utilize a symmetric ciphering algorithm 230 for decryption, which could comprise the same algorithm used in symmetric ciphering algorithm 230 in a step 209 from FIG. 2c, except the algorithm being used for decryption in step 221 instead of encryption.

Note that the same values are input into symmetric ciphering algorithm 230 for decryption in step 221 as symmetric encryption algorithm 230 above for encryption in step 209, such as symmetric ciphering key K1 206a and parameters 104f in order to convert ciphertext 209b back into plaintext 209a. Additional data input into symmetric ciphering algorithm 230 in step 221 or step 229 can comprise an initialization vector 209i and MAC code 206m. Initialization vector 209i and MAC code 206m which could be sent along with ciphertext 209b in message 209. MAC key 206b could be input into symmetric ciphering algorithm 230 as well, in order to calculate the MAC code 209m. The calculated MAC code 209m could be compared to the received MAC code 209m, where equal values to the calculated MAC code 209m and the received MAC code 209m can indicate that ciphertext 209b was received with message integrity (e.g. no bit errors or modifications to ciphertext 209b).

Server 103 can read and process plaintext 209a after a decryption step 221. The plaintext 209a as written by device 103 can comprise random number 203a generated by device 103 in a step 203 and device data 202b. Device data 202b could comprise data or information from device 103 for server 101 and/or network 105 for use with an application managing the communications between device 103 and server 101. Exemplary data for device data 202b was described above for a step 202 by device 103 in FIG. 2a. In exemplary embodiments, the successful decryption of a ciphertext into a plaintext using decryption algorithm 230 in decryption step 221 can comprise an authentication of the device 103, since successful decryption by server 101 can only take place when the device 103 has access to device static private key sd 103d.

A successful decryption of ciphertext 209b can also include the use of MAC key 206b to calculate MAC code 209m, as described in the paragraph above. In other words, only the nodes could mutually derive key K1 206a and MAC key 206b in FIG. 2c and FIG. 2d by (i) device 103 recording private key sd 103d and (ii) server 101 and/or network 105 securely receiving and recording the corresponding device static public key Sd 103c. Thus, data that is successfully encrypted by the device 103 and decrypted by the server 101 using key K1 206a would confirm the device 103 is authenticated with server 101.

Server 101 can conduct an encryption step 223, where the use for an encryption step 223 is depicted and described in connection with FIG. 2a above. Plaintext 223a in a step 223 can comprise the (i) random number 203a from device 103 from message 299 decrypted from ciphertext 209a by decryption step 221 above, (ii) random number 211a from server 101 using step 211, and (iii) response 222a from a step 222 by server 101. The plaintext response 222a could comprise data for device 103 from server 101 in response to device data 202a received in message 299. Other or different exemplary data could be included as plaintext 223a in an encryption step 223. The keys for encryption step 223 can comprise symmetric key K1 206a and MAC key 206b from a key derivation step 208 in step 219 by server 101 in FIG. 2d. The keys can be input into a symmetric ciphering algorithm 230 with parameters 104f.

Encryption step 209 in FIG. 2c and decryption step 221 in FIG. 2e and encryption step 223 in FIG. 2e can use a common symmetric ciphering algorithm 230. Note that MAC key 206b can also be input into symmetric ciphering algorithm 230 along with an initialization vector 209i. The output from a symmetric ciphering algorithm 230 in an encryption step 223 can comprise ciphertext 223b and MAC code 209m. MAC code 209m and initialization vector 209i can be sent along with ciphertext 223b in a message 225 in FIG. 2a. Note that an initialization vector 209i for encryption step 223 can comprise a different number than initialization vector 209i for encryption step 209 and decryption step 221.

As depicted and described in connection with FIG. 2a, device 103 can also conduct a decryption step 221a, which can comprise the exemplary decryption step 221 for server 101 but with different plaintext and ciphertext data. A decryption step 221a by device 103 can use ciphertext 223b received in a message 225. Thus, when device 103 conducts decryption step 221a using symmetric encryption key K1 206a and/or MAC key 206b, the ciphertext and plaintext will comprise different values than those depicted for a decryption step 221 depicted in FIG. 2d.

In exemplary embodiments, the successful decryption of a ciphertext 223b into a plaintext 223a by device 103 using decryption algorithm 230 in decryption step 221a can comprise an authentication of the server 101, since successful decryption by device 103 can only take place when the server 101 and/or network 105 has access to both (i) server static private key ss 101b and (ii) network static private key sn 102b. A successful decryption of ciphertext 223b by device 103 can also include the use of MAC key 206b to calculate MAC code 209m, as described for a decryption step 221 by server 101.

In other words, only the nodes could mutually derive key K1 206a and MAC key 206b in FIG. 2c and FIG. 2d by (i) server 101 and/or network 105 recording and using private keys ss 101b and sn 102b and (ii) device 103 recording the corresponding server static public key Ss 101a and network static public key Sn 102a. Thus, data that is successfully encrypted by the server 101 in step 223 and decrypted by the device 103 in a decryption step 221a using key K1 206a would confirm the server 101 is authenticated with device 103. Note that the use of two private keys comprising ss 101b and sn 102b provides device 103 two layers of authentication, where a decryption step 221a is only successful for device 103 by network 105 in FIG. 1a recording and using private keys ss 101b and sn 102b.

For some exemplary embodiments, the use of a server static PKI keys of Ss 101a and ss 101b could be omitted as discussed above in FIG. 2c and FIG. 2d. For these embodiments, symmetric ciphering key 206a can still be mutually calculated by device 103 and server 101 using the other PKI keys for device 103 and network 105 described herein. As described in FIG. 2c, device 103 could mutually calculate symmetric ciphering key K1 206a without using a server static public key Ss 101a. As described in FIG. 2d, server 101 could mutually calculate symmetric ciphering key K1 206a without using server static private key ss 101b. For these embodiments, a device 103 can still authenticate network 105 by successful decryption of ciphertext 223b in a step 221a, since ciphertext 223b could only be processed by network 105 recording network static private key sn 102b.

In other words, instead of (a) device 103 obtaining two layers of authentication for network 105 from a successful decryption step 221a (from network 105 recording private keys ss 101b and sn 102b for the public keys Ss 101a and Sn 102a recorded by device 103), (b) device 103 could obtain a single layer of authentication for network 105 from a successful decryption step 221a (from network 105 recording private key sn 102b for the public key Sn 102a recorded by device 103).

FIG. 2f

FIG. 2f is an illustration of an exemplary server database, in accordance with exemplary embodiments. A server database 101d depicted and described above in connection with system 100 and system 200 can record data for server 101 to work with a plurality of devices 103 and at least one key server 102. A server database 101d could record at least one set of values, keys, and/or numbers for each device 103 in a plurality of devices 103. Other possibilities exist as well for the organization, tables, and recorded data within a server database 101d as depicted in FIG. 2f without departing from the scope of the present disclosure. Data within server database 101d could be encrypted using a symmetric key.

Although system 100 and system 200 depict a server database 101d as operating or recorded within a server 101, a server database 101d could comprise a separate server within a network 105 and communicating with server 101 via a secure session 201a or a private network 107a. Further, a server database 101d, when operating or recorded in a separate server than server 101, then server database 101d could contain electrical components equivalent to a server 101 depicted and described in connection with FIG. 1b.

Server database 101d can record values for devices 103 in multiple tables or a single table. FIG. 2f depicts two exemplary tables comprising a PKI key table 101da and a device table 101db. Exemplary data for a PKI key table 101da could comprise an obfuscated device identity 103o, a device identity 103i, a secure hash value for the device static public key Sd 103c comprising H(Sd) 250, a secure hash value for the network static public key Sn 102a used by a device 103, which could comprise H(Sn) 251, a device static public key Sd 103c, a device ephemeral public key Ed 103a, a server static public key Ss 101a, a server static private key ss 101b, a network static public key Sn 102a, an identity of key server 102 for device 103 (or key Ed 103a) which could comprise ID.key-server 102i. Note that the identity of key server 102 could identify which key server 102 records the corresponding network static private key 102b for the depicted network static public key 102a. For embodiments where server 101 derives a server ephemeral PKI key pair using a step 101x, then server 101 could also record in a PKI key table 101da in a server database 101d the values for a server static public key Es 101p and server static private key es 101s.

Exemplary data for a device tables 101db in a server database 101d can include a device identity 103i, random number 203a (depicted as "Random 1"), a selected set of cryptographic parameters 104a, a source IP address and port number 299p received in message 299, a random number 211a (depicted as "Random 2"), ECC point values or secrets for X0 213a, X1 216a, X2 218a, X3 207a, and derived symmetric ciphering key K1 216a. In exemplary embodiments, the values depicted in (a) the first row of both PKI key table 101da and device table 101db in a server database 101d could comprise (b) data recorded by a server 101 for a device 103 while conducting the series of steps for a step 224 and step 228 depicted and described in connection with FIG. 2a above with a first device 103. The values depicted in the second row of both PKI key table 101da and device table 101db in a server database 101d could comprise data recorded by a server 101 while conducting the series of steps for a step 224 and step 228 depicted and described in connection with FIG. 2a above with a second device 103, etc.

In exemplary embodiments for a server database 101d, a first device 103 could send server 101 a first value for device ephemeral public key Ed 103a, and the first value is depicted in FIG. 2f as "103a-1" in table 101da. Since server 101 could communicate with a plurality of devices 103, the second row in the depicted table 101da could comprise data for the equivalent steps conducted with a second device 103, such as recording a second value for device ephemeral public key Ed 103a for the second device. The second value for device ephemeral public key Ed 103a with the second device 103 is depicted in FIG. 2d as "103a-2".

Equivalent notations for other keys or values are applicable as well, such as table 101db in server database 101d recording a first secret X1 216a depicted as "216a-1" for a first device 103, and then recording a second secret X1 216a depicted as "216a-2" for a second device. Thus, as depicted a server database 101d can record and operate with a plurality of different values for a key, where each are utilized by a different device. Server 101 could keep track of TCP IP addresses and port numbers associated with different devices 103 for conducting the steps in FIG. 2a by the source IP:port number 299p, such as recording IP:port number 299p as a source IP:port number from a message 299 from a device 103, and then using the same IP:port number 299p as a destination IP:port number for a message 225 in FIG. 2a In some exemplary embodiments, a message 299 can include a secure hash value H(Sd) 250, as described for a message 299 in FIG. 2a above. The receipt of a secure hash value H(Sd) 250 could be mapped to or associated with a key server 102 via a key server identity ID.key-server 102i, where the mapping of H(Sd) 250 to ID.key-server 102i could be recorded in a server database 101d. For these embodiments, server 101 could conduct a query in a step 212 of server database 101d using the received H(Sd) 250 in a message 299 in order to select a key server 102 with ID.key-server 102i in order to send the message 214 to key server 102. In this manner, server 101 can communicate with a plurality of different key servers 102, and the destination of a message 214 (or key server 102) can be selected by the value H(Sd) 250 received in a message 299. Other values could be used for a query step 212 from FIG. 2a as well in order to determine a key server 102 to use for sending message 214.

In other words, for a plurality of different devices 103 communicating with a server 101, a first subset of devices 103 could record and use a first network static public key Sn 102a, and a second subset of devices 103 could record and use a second network static public key Sn 102a. By receiving a value or identifier of device 103 in message 299 (which could comprise ID.device 103i, or ID.device-obfuscated 103o or a hash value for a unique key 101v or 102v as depicted in FIG. 1c), server 101 could use the identifying information or identifying value for device 103 depicted for a server database 101d to select or identify the correct key server 102 from a step 212 in order to (i) send a message 214 and (ii) receive the correct secret X1 216a for the device 103, where the device 103 uses a particular network static public key Sn 102a.

In an exemplary embodiment, server 101 could receive the plaintext Sn 102a in a message 299 and (i) match the network static public key Sn 102a in a server database 101d and (ii) use the value Sn 102a to select key server 102 with key server identity ID.key-server 102i. In another exemplary embodiment, an identity for key server 102 (such as ID.key-server 102i) could be selected or determined by server 101 using the selected set of cryptographic parameters 104a received in message 299a from FIG. 2b and recorded in a database 101d. For these embodiments, a first selected set of cryptographic parameters 104a could be associated with a first key server 102 (and first ID.key-server 102i) and a second set of cryptographic parameters 104a could be associated with a second key server 102 (and second ID.key-server 102i). Other possibilities exist as well for a server database 101d to record data in order to select a key server 102 for sending message 210 with point X0 213a based on data received in message 299, without departing from the scope of the present disclosure. As one example, an identity for key server 102 of ID.key-server 102i could be included in message 299 and the value for ID.key-server 102i could be recorded in a server database 101d by server 101.

In a server database 101d, although separate values are depicted for some data, such as values "102i-1" and "102i-2" for identities of key servers 102, some of the exemplary values can comprise identical strings or numbers. For example, data for two different devices 103 in a server database 101d could record the same name or value of "102i-2" for a single key server 102 to be associated with the two different devices 103. Likewise, two different devices 103 could share the same server static public key Ss 101a, and thus Ss 101a for two different devices 103 can be the same value of an exemplary "101a-1" for two different devices 103, which could also comprise shared server public keys 101z as depicted in FIG. 1c above.

Similarly, two different devices 103 could use different server static public keys Ss 101a, and thus Ss 101a for two different devices could comprise a first value of "101a-3" for the third device or row in a PKI key table 101da and second, different value of "101a-4" for the fourth device or row. The use of different values for server static public keys Ss 101a for different devices 103 could comprise unique server public keys 101v as depicted in FIG. 1c above. Note that server database 101d as depicted in FIG. 2f also shows the use of shared network public keys 102z for Sn 102a (e.g. rows 1-3 in table 101da) and unique network public keys 102v for Sn 102a (e.g. rows 4-5 in table 101da). Further, a key server 102 could use more than one network static private key sn 102b, as shown by the use of two different network static public keys Sn 102a for two different devices in row 3 and row 4 of table 101da.

A server database 101d could also record additional data and values than those depicted in FIG. 2d for some exemplary embodiments. For example, server database 101d could record timestamps for when messages are transmitted or received, such that stale or data older than a specified range could be purged. Server database 101d could also record plaintext data received from device 103 in a message 299, which could include device data 202b. Device data 202b could comprise transducer data or data input by a user of device 103.

Some data within a server database 101d could be recorded and operated on separately by server 101, such as server 101 not recording secrets such as X1 216a or X2 218a, etc. in a database 101d, but rather server 101 could record the values in volatile memory 101f of server 101. In exemplary embodiments, server database 101d could also operate in a distributed or "cloud" configurations such that multiple different servers 101 could query and record data in server database 101d, where data for server database 101d is recorded in multiple, physically separated servers.

As depicted for a server database 101d, some data could be optionally omitted. For devices 103 that do not use an obfuscated device identity ID.device-obfuscated 103o, then the fields in a server database could be left blank or empty. Likewise, if a hash value is not received in a message 299 then the corresponding hash values in a server database 101d could also be left blank or empty. For embodiments discussed in FIG. 2c and FIG. 2d where the use of server static PKI keys could be omitted from a step 224, then values or data for keys Ss 101a and ss 101b could be omitted, empty, or left blank within a server database 101d. As discussed above with a decryption step 221a in FIG. 2e, device 103 could authenticate network 105 using network static public key Sn 102a for embodiments that omit server static PKI keys.

FIG. 3

FIG. 3 is an illustration of an exemplary set of cryptographic parameters, in accordance with exemplary embodiments. Cryptographic parameters 104 can specify sets of cryptographic parameters that are supported by server 101, device 103, and key server 102 in order to process message 299 and process a response message 225 from FIG. 2a. Cryptographic parameters 104 can be recorded in nonvolatile memory in each of server 101, device 103, and key server 102. As depicted in FIG. 1a, each of device 103, server 101, and key server 102 can record and operate with a set of cryptographic parameters 104. Cryptographic parameters 104 can record a collection of cryptographic algorithms or specifications such as a set identifier 104a, a key length 104b, an ECC curve name 104c, a hash algorithm 104d, symmetric ciphering key length 104e, settings for a symmetric ciphering algorithm 104f, and a random number length 104g.

As contemplated herein, when a selected set of cryptographic parameters such as using the words or description "parameters 104a" or "cryptographic parameters 104a" can specify a row of parameters or values in a set of cryptographic parameters 104, such that the collection of values in the row can be used with key pair generation functions 101x, ECDH key exchange 207, EC point addition operations 213 and 220, key derivation function 208, and other cryptographic operations and steps as contemplated herein. Set identifier 104a can be an identity for a row or set of values for cryptographic parameters 104. For example, set "A" can comprise cryptographic suite 1 as specified in section 3.2.3 of DPP specification version 1.0. Key length 104b can be the length of keys in bits for PKI keys used in system 100 and system 200. ECC Curve name 104c can be a name for an ECC curve used with PKI keys and key exchange algorithms in system 100, system 200, and other systems herein.

Hash algorithm 104d in cryptographic parameters 104 can be the name of a secure hash algorithm, such as the exemplary SHA-256 algorithm depicted, which may also be referred to as "SHA-2". Hash algorithm 104d can also be used in a key derivation function (e.g. KDF 208 above in FIG. 2c and FIG. 2d) and also with digital signature step 233 from FIG. 2b. Settings for a symmetric ciphering algorithm 104f can specify the identity or name of a symmetric ciphering algorithm 225 such as "AES", "AES-SIV", 3DES, Blowfish, etc. Random length 104g can specify the length in bits for random numbers or "nonces" generated by both device 103 and server 101, where the nonces can be used to prevent replay attacks and require messages transmitted and received to be unique. Other possibilities exist as well for data within cryptographic parameters 104, such as the specification of point compression, encoding rules such as distinguished encoding rules (DER), ASN or CSN syntax notation, padding rules, byte or bit orders such as big endian, little endian, etc.

FIG. 4

Figure 4:
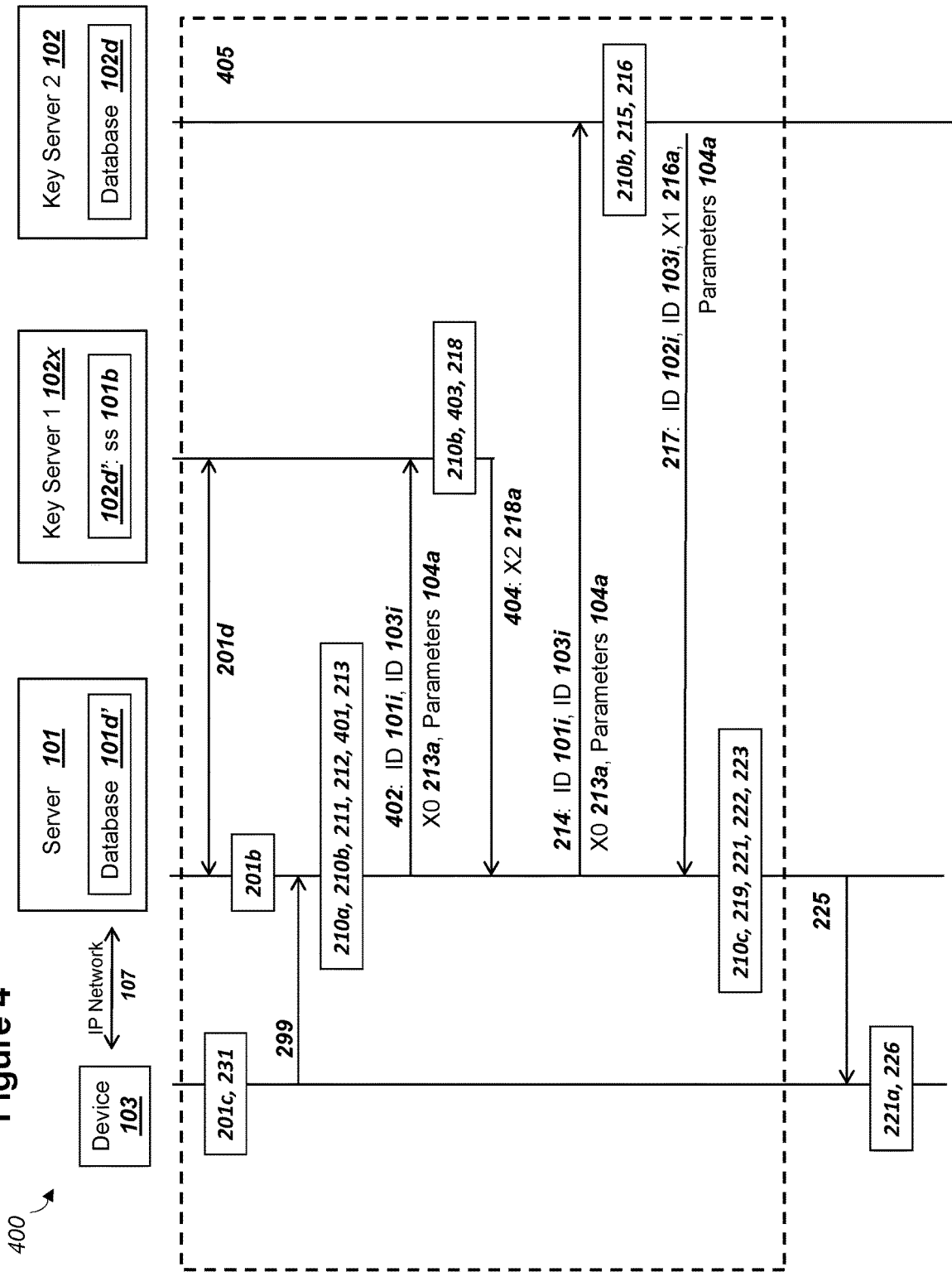
FIG. 4 is a simplified message flow diagram illustrating an exemplary system with exemplary data sent and received by a device, a server, a first key server, and a second key server, in accordance with exemplary embodiments.

FIG. 4 is a simplified message flow diagram illustrating an exemplary system with exemplary data sent and received by a device, a server, a first key server, and a second key server, in accordance with exemplary embodiments. System 400 can include a device 103, server 101, a first key server 102x a second key server 102. Device 103 was depicted and described in connection with FIG. 1a, FIG. 1c, and FIG. 2a above. Server 101 was depicted and described in connection with FIG. 1a, FIG. 1b, FIG. 2a, and other Figures above. The second key server 102 in FIG. 4 can comprise a key server 102 as depicted in FIG. 1a and FIG. 2a above. The first key server 102x in FIG. 4 can operate in a similar manner as key server 102, except with the difference being (i) the first key server 102x records and operates with a server static private key ss 101b in a key server database 102d' and (ii) the second key server 102 records and operates with a network static private key sn 102b in a key server database 102d. Server 101 can record and operate a server database 101d'. Individual steps and components used in system 400 in FIG. 4 are also additionally depicted and described in above FIGS. 2b, 2c, and 2d, etc.

Before starting the steps and message flows depicted in FIG. 2a, device 103 can securely receive and record a network public key Sn 102a and a server static public key Ss 101a, which was also depicted and described in connection with FIG. 1a and FIG. 1c. The corresponding private key for Ss 101a can be securely recorded in a first key server 102. The corresponding private key for public key Sn 102a can be securely recorded in the second key server 102 within network 105 as sn 102b. Steps and messages for system 400 in FIG. 4 that are equivalent to steps and messages for system 200 in FIG. 2a will be described in summary form herein, where differences between system 400 in FIG. 4 and system 200 in FIG. 2a will be highlighted and described with additional details. In exemplary embodiments, a server database 101d' can comprise a server database 101d as depicted and described in connection with FIG. 2f, but with the differences of (i) server database 101d' does not record server static private key ss 101b and (ii) server database 102d' records data for the first key server 102x such as, but not limited to, a first key server 102x identity in addition to private key ss 101b.

A server 101 can establish a secure connection 201d with the first key server 102x in addition to a secure connection 201a with the second key server 102 from FIG. 2a above. Device 103 can conduct a step 201c as depicted and described in connection with FIG. 2a to record data for conducting a step 224, such as, but not limited to, device static private key sd 101c, public keys Sn 102a and Ss 101a, etc. Device 103 can conduct a step 231 in order to process data for a message 299, where the individual steps in a step 231 for device 103 were depicted and described in connection with FIG. 2a above. Device 103 can send server 101 a message 299. Before receiving message 299, server 101 could conduct a step 201b, where step 201b is also depicted and described above in connection with FIG. 2a.

Server 101 can receive message 299 and conduct a series of steps to process the message. Server 101 could perform steps 210a, 210b, 211, and 212 as depicted and described above in connection with FIG. 2a. A step 212 in FIG. 4 can comprise server 101 conducting steps to select the second key server 102 which records and operates with network static private key sn 102b. Server 101 can then conduct a step 401 in FIG. 4 in order to select the first key server 102x that records and operates with server static private key ss 101b. Server 101 can use the equivalent steps in (a) a step 401 to select the first key server 102x as (b) a step 212 to select the second key server 102. In summary, server 101 can use information or data received in message 299 in conjunction with a server database 101d' in order to select the first key server 102x in a step 401. Server 101 could use one of several possible methods for selecting a first key server 102x in a step 401, including a combination of the following embodiments.

A first embodiment for selecting a first key server 102x in a step 401 could comprise server 101 selecting the same first key server 102x for all keys Ed 103a received from all devices 103. For example, for this first method, server 101 could listen or operate on (i) a specific IP address and port number or (ii) with a specific DNS name or URL in step 201b, where the use of (i) or (ii) could be specified or associated with a server static public key Ss 101a. As mentioned above for a step 203 in step 231 in FIG. 2a, device 103 can select the address of server 101 using the server address of server 101 recorded with Ss 102a (possibly from a table 103t in FIG. 1c). Server 101 could determine that all messages 299 received using (i) or (ii) are associated with a specific first key server 102x.

A second embodiment of a step 401 for selecting key server 102x of received device ephemeral public key Ed 103a could comprise using an identity of key server 102 in a message 299 from device 103. The message 299 can optionally include an identity for key server 102x comprising ID.key-server2 102xi. For these embodiments, server 101 can select the first key server 102x using the ID.key-server2 102xi in message 299. A third embodiment for a step 401 of selecting key server 102x for received device ephemeral public key Ed 103a could comprise using an identity of device 103 in a message 299 comprising (i) ID.device 103i, (ii) ID.device-obfuscated 101o, or a secure hash value H(Sd) 250. A secure hash value over a unique key 102v or unique key 101v could be used as well to determine a first key server 102x, where a server database 101d' could include tables that map the unique secure hash value to a first key server 102x. As described above for a message 299, the message 299 can optionally include unique identifying information for device 103, and server 101 using database 101d' in FIG. 2f above could include a table to map any of (i), (ii), and (iii) in this paragraph to a first key server 102x. For this third embodiment of a step 401, server 101 could conduct a query of server database 101d' to select the first key server 102x for device 103 using ID.device 103i.

A fourth embodiment for a step 401 to select a first key server 102x for received device ephemeral public key Ed 103a could comprise using the subset of cryptographic parameters 104a from a step 210a. Server 101 could record that a first subset of cryptographic parameters 104a are associated with a key server 102x, and a second subset of cryptographic parameters 104a are associated with a different key server 102x, etc. Other possibilities exist as well for server 101 to conduct a step 401 to select a first key server 102x using data in a message 299 without departing from the scope of the present disclosure. After conducting a step 401 to select a first key server 102x, server 101 can conduct an ECDH point addition operation 213 over device public keys Sd 103c and Ed 103a to calculate point X0 213a, as depicted and described in connection with FIG. 2d above.

Server 101 can then send the first key server 102x a message 402 through the secure session 201a. Message 402 can include an identity for server 101 comprising ID.server 101i, the point X0 213a from a step 213 above, a device identity 103i, and the subset of cryptographic parameters 104a. Note that although the use of a step 213 and point X0

213a are depicted in FIG. 4, a message 402 could include separately both the received device ephemeral public key Ed 103a and the device static public key Sd 103c, and in this embodiment point X0 213a could be omitted from a message 402. The use of a point X0 213a for a message 402 may be preferred for some embodiments, since it would provide additional security by not exposing the first key server 102x to the separate values for keys 103a and 103c.

For embodiments where device 103 records server static public key Ss 101a as shared keys 101z, then a device identity 103i in message 402 could be omitted, and the first key server 102x could use the same server static private key ss 101b for multiple communications representing multiple devices 103 with server 101. In other words, the first key server 102x could use the server 101 identity 101i in a message 402 for some embodiments to determine the proper server static private key ss 101b for conducting subsequent steps, where server identity 101i is associated with shared keys 101z as depicted in FIG. 1c. For embodiments depicted in FIG. 1c where a device 103 records and operates with a unique key 101v, then a message 402 can preferably include device identity ID.device 103i in order for the first key server 102x to select the appropriate server static private key ss 101b for subsequent calculations. Server identity ID.server 103i also can be useful for communications between the first key server 102x and server 101 for a system 400, since either (i) server 101 may communicate with a plurality of different first key servers 102x, and/or (ii) the first key server 102x may communicate with a plurality of different servers 101.

Key server 102x can receive the message 402 via the secure session 201d and conduct a series of steps to process the message and respond. A first step conducted by first key server 102x can comprise a key validation step 210b, where the key validation step 210b conducted by first key server 102x can be equivalent or compatible with the key validation step 210b conducted by a server 101 as described in FIG. 2a above. Key server 102x could use the set of cryptographic parameters 104a in message 402 in order to conduct a key validation step 210b. As mentioned above for a step 210b for server 101, a key validation step 210b for first key server 102x could be conducted to verify that point X0 213a is not reused, in order to deny replay attacks. First key server 102x could record all values X0 213 a received in a key server database 102d' for an extended period of time, which could comprise years, and reuse of a value X0 213a could be rejected. Or, in other exemplary embodiments, the verification that value or point X0 213a is not reused could be omitted by key server 102x in a step 210b, and key server 102 could rely on server 101 to deny replay attacks.

The first key server 102x can then conduct a step 403 in order to select a server static private key ss 101b to use with the received point X0 213a from message 402. For a step 403, key server 102x could use device identity 103i received in message 402 to query a key server database 102d' to select key ss 101b associated with device identity 103i. A key server database 102d' could record a plurality of different server static private keys ss 101b for use with different devices 103. Or, a step 403 could use other data from a message 402 to select key ss 101b, such as parameters 104a or server identity 101i. In an exemplary embodiment, multiple different devices could record server static public key Ss 101a as shared keys 101z, where the shared keys 101z are associated with a particular set of cryptographic parameters 104a (such as a particular named ECC curve 104c). The first key server 102x could select a key ss 101b to use with the shared keys 101z based on the parameters 104a from message 402. Other possibilities exist as well for a first key server 102x to conduct a step 403 to select a server static private key ss 101b using data from a message 402 without departing from the scope of the present disclosure.

The first key server 102 can then conduct an ECDH key exchange step 218 using (i) the recorded server static private key ss 101b and (ii) the received point X0 213a from message 402. Exemplary details for an ECDH key exchange step 218 are depicted and described in connection with FIG. 2d above. The output of an ECDH key exchange step 218 can comprise point X2 218a. For embodiments where message 402 includes either (i) an identity for device 103 such as ID.device 103i, or (ii) identifying information for ss 101b for a first key server 102x to utilize (such as a secure hash over Ss 101a), then key server 102x could use the identifying information in message 402 to select the server static private key ss 101b from a key server database 102d' for ECHD key exchange step 219.

The first key server 102x can then send server 101 a message 404, where the message 404 includes point X2 218a from step 218 above, as well as an identity for key server 102x comprising ID.key-server 102xi and cryptographic parameters 104a associated with point X2 218a. Message 404 can be transmitted through secure session 201d. If device identity 103i or other identifying information such as a secure hash value over a unique key 101v was included in message 402, then message 404 could also include device identity 103i or the other identifying information for a device 103. Or, both message 402 and message 404 can include a transaction identity or session identity, such that server 101 can associate the received value X2 218a with a received device ephemeral public key Ed 103a and associated device 103.

Server 101 can receive message 404 with point X2 218a and conduct a series of steps in order to derive a mutually shared and authenticated key exchange with device 103. Server 101 can send the second key server 102 a message 214, where a message 214 is depicted and described in connection with FIG. 2a above. The second key server 102 can receive message 214 and conduct the steps 210b, 215, and 216 as depicted and described in connection with FIG. 2a above. The second key server 102 can send server 101 a message 217, where message 217 includes point X1 216a. Point X1 216a could be calculated using (i) the network static private key sn 102b recorded in a key server database 102d, and (ii) the point X0 213a from message 214.

Server 101 can receive message 217 with point X1 216a and conduct a series of depicted steps 210c though 223, where the series of depicted steps 210c through 223 were depicted and described in connection with FIG. 2a above. Note that a difference in steps 210c through 223 from FIG. 4 and FIG. 2a is that step 218 is omitted from FIG. 4 and performed by the first key server 102x, while FIG. 2a has server 101 conducting step 218. In other words, server 101 conducts step 218 with server static private key ss 101b for system 200 in FIG. 2a, while the first key server 102x conducts step 218 with the server static private key ss 101b for system 400 in FIG. 4.

Using the system 400 in FIG. 4, additional security can be achieved since server 101 does not record or operate with server static private key ss 101b. The benefits which result from key ss 101b being isolated from IP network 107, where devices 103 may connect with server 101 through insecure networks and server 101 may need to connect with the insecure networks connected to IP network 107. In other words, using the system 400 in FIG. 4, server static private key ss 101b does not need to be recorded in a server 101 that connects with insecure networks. An equivalent benefit for the security of network static private key 102b is achieved from the use of key server 102 as well.

After step 223, server 101 can send device 101 a message 225, where the message 225 was depicted and described in connection with FIG. 2a above. Device 103 can receive the message 225 and conduct a decryption step 221a. As described for a decryption step 221a in FIG. 2e, server 101 and network 105 can be authenticated with device 103 by device 103 successfully conducting a decryption step 221a. Decryption step 221a can use key K1 206a from a key exchange step 206 for device 103 in a step 231. Device 103 can then conduct a step 226 to process the plaintext data from a decryption step 221a, where decryption step 221a decrypts the ciphertext in a message 225.

FIG. 5a

Figure 5A:
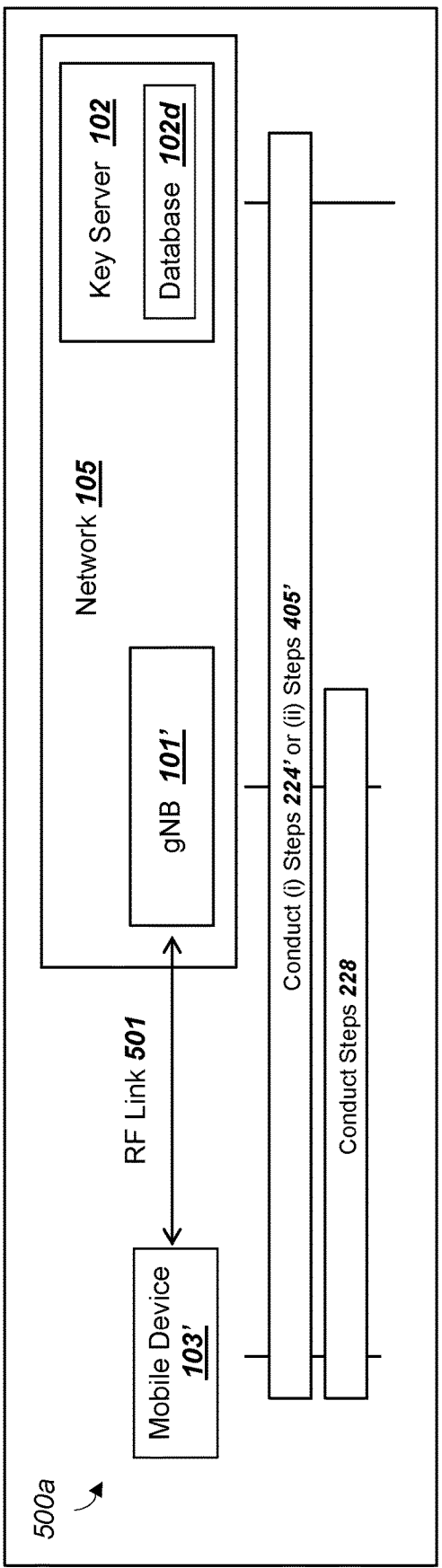
FIG. 5a is a simplified message flow diagram illustrating an exemplary system with exemplary data sent and received by a mobile device, a g node b, and a key server, in accordance with exemplary embodiments.

FIG. 5a is a simplified message flow diagram illustrating an exemplary system with exemplary data sent and received by a mobile device, a g node b, and a key server, in accordance with exemplary embodiments. System 501 can include a mobile device 103', a "next generation 5 node b" 101', and a key server 102. Mobile device 103' can comprise a smart phone, a device for the "Internet of Things" (IoT), a tablet with a modem, or possibly a fixed station device that connects with a 5G or 6G network. Mobile device 103' can operate similar to a device 103, with the additional functionality of connecting to a wireless network, where the wireless network can support 3GPP standards and can also comprise a wide area network such as a public land mobile network. A "next generation node b" 101' (depicted as gNb 101') can contain the equivalent electrical components as those depicted for a server 101 in FIG. 1b, except gNb 101' can also operate as a base transceiver station to send and receive data wirelessly with mobile device 103'. The key server 102 could operate as part of an Authentication Server Function (AUSF) or equivalent functionality.

Note that the distributed nature of the ECDH key exchanges as depicted with system 200 in FIG. 2a and system 400 in FIG. 4 have benefits for the wireless WAN architecture in FIG. 5a. One benefit is that sn 102b for a mobile device 103' does not need to be recorded or operated by a gNb 101'. A second potential benefit using the embodiment of system 400 in FIG. 4, a gNb 101' does not need to record or operate with the server static private key ss 101b. These two benefits increase security, since a gNb 101' may be operated in insecure locations.

In exemplary embodiments, a mobile device 103', a gNb 101', and a key server 102 can conduct a step 224' or a step 405'. A system 500a can use the same or equivalent components, steps, and messages as a system 200, with some differences between the systems. Note that before the steps 224' depicted in FIG. 5a, a mobile device 103' and a gNb 101' could conduct steps to establish communications between the nodes, such as recording parameters for RF communications by the mobile device 103' in a SIM card or eUICC. A mobile device 103' could also conduct steps to authenticate the network 105 operating a gNb 101', such as obtaining keys for accessing network 105 through a different gNb 101'. Step 224' can comprise primarily the step 224 as depicted and described in FIG. 2a. Step 405' can comprise primarily the step 405 as depicted and described in FIG. 4

For a step 224' or step 405', a mobile device 103' can send message 299 through RF link 501. Message 299 can include the device ephemeral public key Ed 103a and also an obfuscated identity ID.device-obfuscated for device 103', where the obfuscated identity can also comprise a temporary identity for device 103. A gNb 101' can use the obfuscated identity to track the device 103 from a potential plurality of devices 103 communicating over a wireless network.

The gNb 101' can forward the device identity and the point X0 213a from a step 224 to the key server 102. The key server 102 can look up a unique key 102v for device 103 for the network static private key sn 102b corresponding to the network static public key 102a recorded by the device 103. The key server 102 can calculate value X1 216a as depicted in FIG. 2d, and send the gNb 101' the value X1 216a over a secure session. For a step 224', the gNb 101' can conduct an ECDH key exchange step 218 and calculate value X2 218a, using the received device ephemeral public key Ed 103a and the server static private key ss 101b. For a step 405', the gNb 101' can send the device ephemeral public key Ed 101a and identifying information for device 103 to a key server 102x, and key server 102x could conduct the ECHD key exchange step 218 and send the resulting value X2 218a to gNb 101'

The gNb 101' can calculate the value X3 207a via ECC point addition over X1 216a and X2 218a. The gNb 101' can calculate a symmetric ciphering key K1 206a using the value X3 207s and a KDF 208. KDF 208 could derive multiple different keys in addition to the symmetric ciphering key K1 206a. In exemplary embodiments for a system 500a, the device identity ID.device 103i, which could comprise an IMSI value for 4G LTE networks, or a SUPI value for 5G and 6G networks, can be included in ciphertext 209b in message 299. The gNb 101' can use the derived key K1 206a to decrypt the ciphertext 209a and read the plaintext ID.device 103i. Using a system 500a, a mobile device can securely send a permanent or long-term subscription identity to a network in a single message comprising message 299. The security of a message 299 in a system 500a can be enhanced compared to conventional technology, because the static private keys for network 105 do not need to be recorded on gNb 101'.

In exemplary embodiments for a system 500a, either the static server public key Ss 101a or the static network public key Sn 102a recorded in mobile device 103' can comprise a unique key for mobile device 103. In other words, key Ss 101a can comprise a unique key 101v as depicted and described in connection with FIG. 1c, and key Sn 102a can comprise a unique key 102v as depicted and described in connection with FIG. 1c. Or, for other embodiments, keys Ss 101a and Sn 102a recorded by device 103 could comprise shared keys 101z and 102z. The mobile device 103' can then conduct a step 228 to receive a ciphertext 223b from gNb 101'. The successful decryption of ciphertext 223b by mobile device 103' can confirm that gNb 101' is authenticated as operating for network 105, where network 105 can record the private keys corresponding to the public keys recorded in mobile device 103'.

FIG. 5b

Figure 5B:
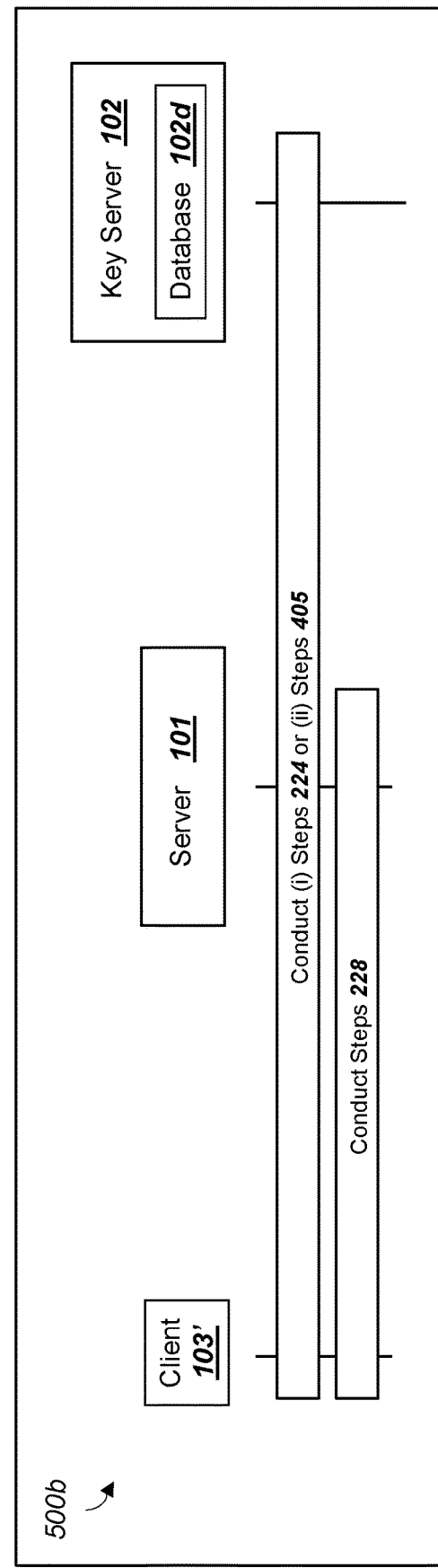
FIG. 5b is a simplified message flow diagram illustrating an exemplary system with exemplary data sent and received by a client, a server, and a key server, in accordance with exemplary embodiments.

FIG. 5b is a simplified message flow diagram illustrating an exemplary system with exemplary data sent and received by a client, a server, and a key server, in accordance with exemplary embodiments. System 500b can include a client 103', a server comprising server 101, and a key server 102. In exemplary embodiments, client 103' can comprise a client using security steps as described in by transport layer security (TLS) sessions version 1.3 and also subsequent and related versions of IETF RFC standards. Client 103' can also comprise a client using security steps as described in datagram transport layer security (DTLS) RFC 6347 and subsequent versions that incorporate ECDH key exchanges. Although depicted in FIG. 3b as a client 103', the client 103' could also comprise a device 103, where the device 103 can conduct the steps of a client 103' at the networking, transport, and application layer of the traditional Open Systems Interconnection (OSI) model.

Client 103' can comprise a computing device such as a personal computer, a laptop computer, or another server that records a network static public key Sn 102a and a server static public key Ss 101a. As discussed in FIG. 2c and FIG. 2d, a server static public key Ss 101a could optionally be omitted. Note that TLS version 1.3 and DTLS version 1.3 contemplate that the client and a server can use ephemeral ECDH key exchanges (one on the client and one on the server) in order to establish a mutually derived secret shared key for a symmetric ciphering algorithm. The difference between (i) a client 103' (which can comprise a device 103 supporting TLS or DTLS standards) and (ii) a client for TLS or DTLS standards can be that client 103' can record a network static public key Sn 102a and server static public key Ss 101a.

As depicted in FIG. 1c, the network static public keys could comprise either (i) a shared keys 102z or shared keys 101z across a plurality of different devices 103 (or clients 103'), or (ii) a unique key 102v or unique key 101v, where the network static public key Sn 102a and server static public key Ss 101a is a unique number or string or point specifically for client 103'. The public keys could be received by client 103' in a secure manner before a client 103' conducts a step 224 with server 101. In exemplary embodiments, Ss 101a and Sn 101a could be received in the form of a certificates from a prior TLS or DTLS session (or other secure manners) before client 103' begins the TLS or DTLS session depicted in FIG. 5b. Or, network static public key Sn 102a could be recorded with a set of certificate authority certificates stored with installation of an operating system for device 103 operating a client 103'.

The use of a network static public key Sn 102a and/or server static public key Ss 101a by client 103' in a step 224 to conduct an ECDHE key exchange with server 101 can have many benefits. The standard handshake as currently proposed for TLS version 1.3 as of June 2018 assumes that a client 103' and a server 101 have no prior relationship. However, for many instances of communication between a client 103' and a server 101, the client 103' may have previously communicated with another server on a network 105 other than server 101. For example, with web browsing a web browser client such as a client 103' will often revisit the same web sites over time, such as a first web site for social networking, a second web site for a search engine, a third web site for news, etc.

A TLS or a DTLS session could utilize the fact that the same sites are often re-visited in order to increase security, using the depicted steps of 224 or step 405 and 228 for a client 103', server 101, and key server 102. Steps 224 in FIG. 5b can comprise the set of steps 224 depicted and described in connection with FIG. 2a, and steps 405 in FIG. 5b can comprise the set of steps 405 depicted and described in connection with FIG. 4, and steps 228 in FIG. 5b can also comprise the set of steps 228 depicted and described in connection with FIG. 2a.

Before conducting step 224 in FIG. 5b, a client 103' could receive keys Sn 102a and/or Ss 101a from another server in network 105, such as a different web server providing functionality equivalent to server 101. The client 103' could record the network static public key Sn 102a and server static public key Ss 101a in a table 103t from FIG. 1c. Each public key could also be recorded with a URL or domain name, such that the client 103' would use the public keys when establishing a subsequent TLS or DTLS session with server 101, where server 101 uses the recorded URL or domain name. Further, server 101 could be configured so that any key Ed 103a received from IP network 107 on an IP address and/or port number used by server 101 would be forwarded to key server 102, where key server 102 could record and operate with the sn 102b corresponding to the public key for Sn 102a recorded by client 103'.

For a step 224, a client 103' can derive a device ephemeral public key Ed 103a and send server 101 a message 299. The message 203 can include the key Ed 103a and a set of cryptographic parameters 104a. In exemplary embodiments where client 103' implements TLS or DTLS, when message 299 can optionally omit a device identity ID.device 103i. Server 101 could operate in a manner such that (i) Ed 103a is forwarded to key server 102. Key server 102 can conduct an ECDHE key exchange as depicted for a step 224 in FIG. 2a using a step 216 in order to calculate the secret value X1 216a. Key server 102 can send server 101 the value X1 216a.

Server 101 can use the value X1 216a, along with the derivation of a second secret X2 218a in order to calculate a symmetric ciphering key K1 206a, using the key derivation step 219 with ECC point addition 220 over X1 216a and X2 218a. Thus, by using the embodiment depicted in FIG. 5b, a transport layer security session can have security increased, where (a) the ECDHE key exchange contemplated by TLS v1.3 can also add (b) the additional key exchange step 216 by a key server 102 and the additional key exchange step 218 by server 101. Note that the mutual derivation of symmetric ciphering key K1 206a by client 103' and server 101 can comprise a mutual authentication of server 101 and device 103, since server 101 and device 103 can only derive the key K1 206a if (a) server 101 operates in a network 105 that also records and operates with key sn 102b and (b) device 103 records and operates with device static private key sd 103d.

Message 225 could comprise a "Server Hello" according to TLS v1.3 in the document "draft-ietf-tls-tls13-28". The ciphertext in the Server Hello can be ciphertext 223b as depicted in FIG. 2a, where the ciphertext 223b is encrypted with the mutually derived symmetric ciphering key K1 206a. Note that a step 224 for FIG. 5b increases security for a TLS session, since an active attacker could operate as a "man in the middle" between a real client or "true client" and the server 101, where the "man in the middle" could derive its own key Ed 103a and substitute that for the real key Ed 103a from the real client or "true client".

Without use of public keys Sn 102a and/or Ss 101a in a key exchange step 206 by device 103, a "man in the middle" (deriving and substituting a key Ed 103a) could (a) mutually derive a symmetric ciphering key similar to K1 206a with server 101 and then (b) receive and decrypt the ciphertext 223b. However, the use of Sn 102a and/or Ss 101a for deriving encryption key K1 206a can stop a "man in the middle" attack since a "man in the middle" cannot derive key K1 206a without also recording the sn 102b and/or ss 101b, which can remain secret and not available to the "man in the middle". In this manner, the communications for a TLS session or DTLS session can remain secured using a step 224 or step 405 and step 228, while recording and using (i) sn 102b with network 105 and ss 101b with a server 101 or key server 102x and (ii) Ss 101a and Sn 102a with client 103'.

Note that the technology depicted in FIG. 5b supports mutual authentication without requiring either client 103' or server 101 to send static public keys in the form of certificates. In other words, communication can be secured without transfer of static public keys between the nodes in data 106 over an insecure network such as the public Internet 107. Over approximately the next decade, quantum computers may feasibly break common certificates and algorithms used with TLS and DLTS as of 2018, and thus the technology depicted in FIG. 5b can be used to secure a system 500b (and other systems herein) against attacks using quantum computers. Other possibilities exist for the use of a step 224 or step 405 and a step 228 between a client 103' and server 101 without departing from the scope of the present disclosure.

FIG. 5c

FIG. 5c is a simplified message flow diagram illustrating an exemplary system with exemplary data sent and received by an initiator, a responder, and a key server, in accordance with exemplary embodiments. System 500c can include an initiator 103', a responder 101' and a key server 102. Initiator 103' can comprise a computing device 103, with the specific additional functionality of an initiator according to the DPP Specification Versions 1.0 from the WiFi Alliance. Responder 101' can comprise a device with (i) electrical components similar or equivalent to a server 101 depicted in FIG. 1b above, and (ii) the specific additional functionality of a responder according to the DPP Specification Version 1.0 of the WiFi Alliance. For example, initiator 103' and responder 101' can communicate via a WiFi network on a wireless LAN 502 between the two devices, which could also comprise a specific implementation of an IP network 107. Responder 101' can operate in a networked configuration to communicate with key server 102 via a private network 107a or a secure session 201a as depicted in FIG. 2a. In some embodiments, responder 101' can communicate with key server 102 via an IP network 107, where the use of secure session 201a can create a private network 107a between responder 101' and key server 102.

An initiator 103', responder 101' and a key server 102 can conduct a step 224, where a step 224 is depicted and described in connection with FIG. 2a above. Or, an initiator 103', responder 101' and a key server 102 can conduct a step 405, where a step 405 is depicted and described in connection with FIG. 4 above. An initiator 103', responder 101' and a key server 102 can then conduct a step 228, where a step 228 is depicted and described in connection with FIG. 2a above. Note that additional steps in addition to those depicted in FIG. 5c can be conducted by an initiator 103' and a responder 101', such as responder 101' deriving PKI keys in a step 101x from FIG. 1a and also conducting additional ECDH key exchanges in order to derive a symmetric ciphering key K1 206a, which can comprise key ke in the DPP standard. In other words, initiator 103' and responder 101' could perform additional ciphering that that depicted for a step 224 in FIG. 2a, but for exemplary embodiments such as that depicted in FIG. 5c the initiator 103' and responder 101' could conduct at least the steps depicted in order to mutually derive a symmetric ciphering key K1 206a and use the key to create a ciphertext 223b by responder 101' and decrypt the ciphertext 223b by initiator 101'.

As depicted in FIG. 5c, several PKI keys within a DPP specification version 1.0 can have corresponding keys for a step 224 or step 405 and a step 228. As depicted in FIG. 5c, the device ephemeral public key Ed 103a can comprise the initiator protocol public key Pi 503a. The device ephemeral private key ed 103b can comprise the initiator protocol private key pi 503b. The device static public key Sd 103c can comprise the initiator bootstrap public key Bi 504a. The device static private key sd 103d can comprise the initiator bootstrap private key bi 504b. The server static public key Ss 101a can comprise the responder protocol public key Pr 505a. The server static private key ss 101b can comprise the responder protocol private key pr 505b. The network static public key Sn 102a can comprise the responder bootstrap public key 506a. The network static private key sn 102b can comprise the responder bootstrap private key 506b. As described below, other steps from FIG. 2a can be equivalent to those depicted in FIG. 5c. One difference for the key described above and FIG. 2a is that (i) server static public key Ss 101a (e.g. key Pr 505a) could be not recorded in device 103 before sending message 299, and (ii) device 103 receives key Ss 101a with message 225 in a step 228. Also, the key K1 206a as contemplated herein can comprise the key ke 511 from the DPP specification version 1.0

Before sending a message 299, initiator 103' can conduct a series of steps to process data and keys for the message 299. Initiator 103' can conduct a key derivation step 103x to generate keys Ed 103a and ed 103b using parameters 104a. Initiator 103' can conduct an ECDH key exchange step 507 using (i) public key Br 506a (e.g. Sn 102a) and private key ed 103b to derive a symmetric ciphering key. Note the symmetric ciphering key from a step 507 can be different than key K1 206a, which can equal ke 511. Initiator 103' can then conduct a step 508, which can comprise the steps for an initiator to generate a "DPP authentication request" message in DPP specification version 1.0. Initiator 103' can process a ciphertext 209b' using the symmetric ciphering key from a step 507. Initiator 103' can then send responder 101' a message 299, which could comprise a "DPP authentication request" message per the DPP specification version 1.0. The message 299 can include a hash value over the initiator bootstrap public key Bi 504a, which is depicted as H(Sd) 250, the derived initiator protocol public key Ed 101a, and the ciphertext 209b'. Ciphertext 209b' can use the symmetric ciphering key from step 507.

Responder 101' can receive message 299 and conduct steps to process the message. Responder 101' can conduct a step 509, which can comprise the steps for a responder to process a "DPP authentication request" message from an initiator in the DPP specification version 1.0. Responder 101' can take the additional step 213 to conduct an ECC point addition operation over the initiator bootstrap public key Bi 504a (e.g. Sd 103c) and the received initiator protocol public key Pi 503a (e.g. Ed 101a). Responder 101' can send key server the resulting point X0 213a in a message 214, along with identifying information for device 103 such as the secure hash H(Sd) 250, which could comprise a secure hash over the initiator bootstrap public key Bi 504a.

Key server 102 can receive message 214 and take steps to process the message. Key server 102 can conduct a step 215 in order to select from database 102d the responder bootstrap private key br 506b (e.g. sn 102b) using the identifying information for device 103 from message 214 (e.g. H(Sd) 250). Key server 102 can conduct an ECDH key exchange step 216 using point X0 213a and the selected responder bootstrap private key br 506b (e.g. sn 102b) in order to output point X1 216a. Key server 102 can then send responder 101' a message 217 with the point X1 216a. Other identifying information for device 103 could be included in a message 217 in order for responder 101' to determine which device 103 message 217 is associated with, such as H(Sd) 250.

Responder 101' can then conduct an ECDH key exchange step 218 using point X0 213a and responder protocol private key pr 504b (e.g. ss 101b), where point X0 213a comprises an ECC point addition 213 for Bi 504a (e.g. Sd 103c) and Pi 503a (e.g. Ed 103a). The output of step 218a can be point X2 218*a*. Responder 101' can then conduct a key derivation step 219 as depicted in FIG. 2*d* above in order to calculate a shared secret X3 207*a*. Shared secret X3 207*a* can comprise the output from an ECC point addition step 220 over shared secret X1 216*a* from message 217 and shared secret X2 218*a* from a step 218. A key derivation step 219 can use a KDF 208 to convert shared secret X3 207*a* into a symmetric ciphering key K1 206*a*. Note that for the exemplary embodiment depicted in FIG. 5*c*, symmetric ciphering key K1 206*a* can comprise key ke 511 for an initiator and a responder according to DPP specification version 1.0.

Responder 101' can then conduct an encryption step 223 in order to generate a ciphertext 223*b*. Note that ciphertext 223*b* can be encrypted using the derived symmetric ciphering key K1 201*a* which can also comprise key ke 511. The plaintext for an encryption step 223 in FIG. 5*c* can comprise the plaintext data for a responder to use for a responder authentication value "r-auth" according to DPP specification version 1.0. Although not depicted in FIG. 4, a responder 101' could take other steps to perform additional encryption of ciphertext 223*b*, such as using the symmetric ciphering key from a step 507.

Responder 101' can then send initiator 103' a message 225', where message 225' could comprise a "DPP authentication response" message according to DPP specification version 1.0. Message 225' can be similar to message 225 depicted in FIG. 2*a* above, but with the addition of message 225' including the responder protocol public key Pr 505*a*, which is depicted in FIG. 5*c* as key Ss 101*a*. Message 225' can also include ciphertext 223*b*, which is encrypted using the mutually derived key K1 206*a* which can comprise key ke 511 according to the DPP specification version 1.0. Initiator 103' can then conduct a step 510 in order to process the message 225' which can comprise a "DPP authentication response" message according to DPP specification version 1.0. For a step 510, initiator 101' can take the steps specified in DPP specification version 1.0 in order to process a "DPP authentication response" message. In this manner and as depicted in FIG. 5*c*, an initiator 103' and a responder 101' can be mutually authenticated. Initiator 103' and responder 101' can then conduct additional steps contemplated in DPP specification version 1.0.

A benefit for the use of the steps and messages for an initiator 103', a responder 101', and a key server 102 in FIG. 5*c* is that the responder bootstrap private key br 506*b* (e.g. sn 102*b*) can remain securely recorded in a network 105 and does not need to be recorded and operated by responder 101. In this manner, the responder bootstrap public key Br 302*a* can be freely shared with multiple different initiators 103', including recording the key Br 302*a* in a plurality of initiators 103' in the form of a shared key 102*z* as depicted in FIG. 1*c*.

The use of a shared key 102*z* with multiple different initiators 103' (while keeping sn 102*b* or key br 506*b* securely recorded in a key server 102) simplifies the distribution of key Br 506*a* to multiple different initiators 103'. Authentication of responder 101' is secured, because the responder 101' can only derive key K1 206*a* (as key ke 511) when the responder 101' also records the initiator bootstrap public key Bi 504*a* (Sd 103*c*). In other words, the authentication of responder 101' by initiator 103' depends on the security of the method responder 101' used to obtain the initiator bootstrap public key Bi 504*a*, which could be via an "out of band" transfer of the initiator bootstrap public key Bi 504*a* before initiator 103' sends a message 299'.

For exemplary embodiments, the initiators 103' could have a key Br 506*a* recorded during manufacturing or distribution of the computing device operating initiator 103'. In other words, a device manufacturer upon device distribution for an initiator 103' may not know which responder 101' may communicate with initiator 103' during a subsequent DPP session. However, a manufacturer of device with initiator 103' could record a plurality of different keys Br 506*a* for different networks 105 (similar to different keys Sn 102*a* in for a table 103*t* FIG. 1*c*), and in this manner initiator 103' can have a higher probability of successfully using a pre-recorded key Br 506*a* (or key Sn 102*a*) in order to conduct a DPP session without requiring a separate or different additional step of acquiring the key Br 506*a* "out of band". Thus, the use of the embodiment for an initiator 103' and a responder 101' can simplify the use and deployment of DPP sessions, while simultaneously increasing the securing of the session, since the responder bootstrap private key br 506*b* (in the form of sn 102*b*) can remain securely recorded within a network 105 on a key server 102.

FIG. 5*d*

FIG. 5*d* is a simplified message flow diagram illustrating an exemplary system with exemplary data sent and received by a radio-frequency identification (RFID) tag, a RFID reader, and a key server, in accordance with exemplary embodiments. System 500*d* can include an RFID tag 103', a RFID reader 101' and a key server 102. RFID tag 103' (or "tag 103'") could comprise a tag supporting International Standards Organization (ISO) standards such as ISO 15693, and other possibilities exist as well. Tag 103' could comprise an NFC tag such as a tag compatible with the NFC Forum standards for type 1 through type 5 tags (and subsequent or related standards). The NFC technology could also be NFC-A, NFC-B, or NFC-V, or subsequent standards.

RFIC reader 101' could comprise a compatible reader of RFID tag 103' and could support ISO standards 11784 and 11785 and other possibilities exist as well. Key server 102 can comprise a key server 102 as depicted and described above in connection with FIG. 1*a*, FIG. 1*c*, FIG. 2*a*, and other figures herein. RFID tag 103' can comprise a device 103 with the specific functionality to communicate using near field communications (NFC) such as supporting a NFC session setup 512. RFID reader 101' can comprise the functionality and component of a server 101 depicted and described in connection with FIG. 1*a*, FIG. 1*b*, FIG. 2*a*, and other figures herein. For the exemplary embodiment depicted in FIG. 5*d*, both RFID tag 103' and RFID reader 101' (or "reader 101") can include a radio for NFC communications.

In exemplary embodiments, tag 103' and reader 101' can conduct an NFC session setup 512. The air interface for NFC session setup 512 could comprise a session using ISO/IEC 18092/ECMA-340, "Near Field Communication Interface and Protocol-1" and ISO/IEC 21481/ECMA-352, "Near Field Communication Interface and Protocol-2 (NFCIP-2)". The air interface for NFC session setup 512 could also comprise subsequent or related versions to these standards. Other possibilities exist as well for the protocol used in an NFC session setup 512 without departing from the scope of the present disclosure. NFC session setup 512 can comprise the establishment of the physical and data-link layers of communications between tag 103' and reader 101'.

Data between tag 103' and reader 101' could be transferred using NFC Data Exchange Format (NDEF) and support a Multipurpose Internet Mail Extensions (MIME) typed object or file transferred between tag 103' and reader 101'. In other words, subsequent messages and files transferred using NFC radios could utilize NDEF and MIME objects, although other possibilities exist as well for the NFC standards utilized without departing from the scope of the present disclosure. NFC session setup 512 could also implement additional air-interface security, such as ECMA-409 2nd edition—NFC-SEC-02: NFC-SEC and related standards, where the air interface is encrypted using AES and Diffie-Hellman key exchanges. In exemplary embodiments, NFC session setup 303 utilizes standard ECMA-352 in order to select ECMA-340, ISO/IEC 14443 and ISO/IEC 15693 as a communication mode between tag 103' and reader 101'

As depicted in FIG. 5, tag 103', reader 101' and key server 102 could conduct a step 224 or a step 405, where a step 224 is depicted in FIG. 2a and a step 405 is depicted in FIG. 4. For a step 224 or step 405, a reader 101' can send a probe or query request as part of NFC session setup 512. A tag 103' can send message 299 to reader 101' through NFC session 512. Message 299 can include the device ephemeral public key Ed 103a and also an obfuscated identity ID.device-obfuscated 103o for tag 103', where the obfuscated identity can also comprise a temporary identity for device 103. Or, message 299 for a step 224 or step 405 in FIG. 4 could comprise a hash value over a public key recorded by tag 101' (such as H(Sd) 250 or H(Ss) 252) and the hash value can be used by reader 101' in order to identify tag 103'. Or, message 299 could include an identity for tag 103' comprising an ID.device 103i. Other possibilities exist as well for a tag 103' to send plaintext identification information or omit plaintext identification information in a message 299 without departing from the scope of the present disclosure.

The reader 101' can use identifying information from message 299 to query a database 101d for additional PKI key information for tag 103' in a database 101d, such as (i) reading a key ss 101b for a key Ss 101a recorded by the tag 103', as well as (ii) selecting a key server 102 recording a key sn 102b for a key Sn 102a recorded by the tag 103', and also (iii) selecting a key Sd 103c for tag 103'. Or, in some exemplary embodiments such with a message 299c described in FIG. 2b, message 299c from tag 103' could include a device static public key Sd 103c as plaintext in a message 299.

Reader 101' can conduct an EC point addition operation 213 over key Sd 103c and key Ed 103a in order to calculate a point X0 213a. Reader 101' can send key server 102 the point X0 213a in a message 214 along with identifying information for tag 103' and/or reader 101'. Key server 102 can use a step 215 to select a key sn 102b for tag 103' using the identifying information from a message 214. Key server 102 can conduct an ECDH key exchange step 216 with point X0 213a and key sn 102b in order to calculate a point X1 216a. Key server 102 can send reader 101' the point X1 216a in a message 217 for a step 224 or step 405.

For a step 405, the reader 101' can send the point X0 213a and identifying information for device 103 to a key server 102x, and key server 102x could conduct the ECHD key exchange step 218 and send the resulting value X2 218a, as depicted and described in connection with a step 405 in FIG. 4. For a step 224, reader 101' can conduct an ECDH key exchange step 218 with point X0 213a and key ss 101b in order to calculate a point X2 218a. Reader 101' can conduct a key derivation step 219 in order to calculate a shared secret X3 207b. Step 219 can use an ECC point addition operation 220 with point X1 216a and X2 218a to calculate X3 207b. Reader 101' can input X3 207b into a KDF 208 in order to calculate or process a resulting symmetric ciphering key K1 206a.

The tag 103' can mutually derive the same symmetric ciphering key K1 206a using a key exchange step 206 as depicted in FIG. 2c. The tag 103' could conduct a step 206 before sending message 299 and after setup of NFC session 512. The tag 103' could encrypt device data 202b in a ciphertext 209b in message 299 using the key K1 206a, as depicted in FIG. 2c. The reader 101' can decrypt the ciphertext 209b in message 299 using the key K1 206a derived by reader 101 in a step 219. The reader 101' can use a decryption step 221 in order to read plaintext from ciphertext 209b. Successful reading of plaintext from a decryption step 221 (plus optionally a correct MAC code 209m received in message 299) can confirm to reader 101' that tag 103' is authenticated and the decrypted plaintext from message 299 can be trusted as from a device 103' that records a device static private key sd 103d. The reader 101' can conduct an encryption step 223 using key K1 206a to create a ciphertext 223b.

The reader 101' can conduct a step 228 with the tag 103' to send the ciphertext 223b to tag 103' in a message 225. The tag 103' can then conduct a step 228 to receive a ciphertext 223b from reader 101'. The successful decryption of ciphertext 223b using key K1 206a from step 206 by tag 103' can confirm that reader 101' is authenticated as operating for network 105, where network 105 can record the private keys corresponding to the public keys recorded in tag 103'.

CONCLUSION

Various exemplary embodiments have been described above. Those skilled in the art will understand, however, that changes and modifications may be made to those examples without departing from the scope of the claims.

The invention claimed is:

1. A method for a network to securely communicate with a wireless device, the method performed by the network, the method comprising:
   a) storing, in a nonvolatile memory of a first server for the network, a server static private key corresponding to a server static public key;
   b) storing, in a nonvolatile memory of a second server for the network, a network static private key corresponding to a network static public key;
   c) receiving, by a low power wide area (LPWA) radio and from the wireless device, a message comprising a device ephemeral public key, cryptographic parameters for the device ephemeral public key, a temporary identifier for the wireless device, and a ciphertext;
   d) receiving, by the first server for the LPWA radio, the message, wherein the first server establishes a secure session with the second server in the network;
   e) receiving, by the second server and from the first server, the device ephemeral public key, the cryptographic parameters, the temporary identifier for the wireless device, and the ciphertext;
   f) generating, by the first server, a first value from a first Elliptic Curve Diffie Hellman (ECDH) key exchange with a device static public key, the device ephemeral public key, the server static private key, and the cryptographic parameters;
   g) generating, by the second server, a second value from a second ECDH key exchange with the device static public key, the device ephemeral public key, the network private key, and the cryptographic parameters;
   h) decrypting the ciphertext into a plaintext using the first value and the second value; and
   i) encrypting a response for the plaintext using the first value and the second value.

2. The method of claim 1, wherein the ciphertext includes a device identity and transducer data for the wireless device.

3. The method of claim 1, wherein the message comprises a series of datagrams.

4. The method of claim 1, wherein the temporary identifier for the wireless device comprises a random number, and wherein the temporary identifier for the wireless device periodically changes.

5. The method of claim 1, further comprising the wireless device configured to (i) receive the encrypted response from the LPWA radio and (ii) decrypt the encrypted response using the first value and the second value, wherein the wireless device mutually derives the first value and the second value with the network.

6. The method of claim 1, wherein the first ECDH key exchange comprises (i) a first point multiplication of the device static public key with the server private key, and (ii) a second point multiplication of the device ephemeral public key with the server private key.

7. The method of claim 1, wherein the second ECDH key exchange comprises (i) a first point multiplication of the device static public key with the network private key, and (ii) a second point multiplication of the device ephemeral public key with the network private key.

8. The method of claim 1, wherein the cryptographic parameters comprise at least one of the following elliptic curve names: NIST P-256, sect283k1, sect283r1, sect409k1, sect409r1, curve22519, curve448, and FourQ.

9. The method of claim 1, wherein the message includes a device certificate for the device static public key.

10. The method of claim 1, wherein the first value comprises a first shared secret and the second value comprises a second shared secret, and wherein the first shared secret comprises a value X2 and the second shared secret comprises a value X1.

11. The method of claim 1, wherein the server static private key comprises a value ss and the network static private key comprises a value sn.

* * * * *